(12) United States Patent
Kawaguchi et al.

(10) Patent No.: US 8,751,191 B2
(45) Date of Patent: Jun. 10, 2014

(54) ACTION ANALYSIS DEVICE AND ACTION ANALYSIS METHOD

(75) Inventors: Kyoko Kawaguchi, Osaka (JP); Masamoto Tanabiki, Osaka (JP)

(73) Assignee: Panasonic Corporation, Osaka (JP)

( * ) Notice: Subject to any disclaimer, the term of this patent is extended or adjusted under 35 U.S.C. 154(b) by 331 days.

(21) Appl. No.: 13/202,463

(22) PCT Filed: Dec. 20, 2010

(86) PCT No.: PCT/JP2010/007375
§ 371 (c)(1),
(2), (4) Date: Aug. 19, 2011

(87) PCT Pub. No.: WO2011/077696
PCT Pub. Date: Jun. 30, 2011

(65) Prior Publication Data
US 2012/0004887 A1    Jan. 5, 2012

(30) Foreign Application Priority Data

Dec. 22, 2009   (JP) .................................. 2009-291018
Mar. 25, 2010   (JP) .................................. 2010-070444
Mar. 25, 2010   (JP) .................................. 2010-070445

(51) Int. Cl.
*G06F 15/00*  (2006.01)

(52) U.S. Cl.
USPC ........... 702/150; 382/104; 382/103; 382/107; 382/236; 382/195; 345/156; 348/150; 348/734

(58) Field of Classification Search
USPC .......... 702/150; 382/104, 103, 107, 236, 195; 345/156; 348/150, 734
See application file for complete search history.

(56) References Cited

U.S. PATENT DOCUMENTS

| | | | | |
|---|---|---|---|---|
| 5,097,328 A | * | 3/1992 | Boyette ..................... | 348/150 |
| 5,111,410 A | * | 5/1992 | Nakayama et al. .......... | 434/258 |
| 5,748,761 A | * | 5/1998 | Chang et al. ................ | 382/107 |
| 6,993,159 B1 | | 1/2006 | Ishii et al. | |

(Continued)

FOREIGN PATENT DOCUMENTS

| | | |
|---|---|---|
| CN | 1373720 | 10/2002 |
| CN | 1652613 | 8/2005 |
| JP | 2006-79272 | 3/2006 |
| JP | 2007-334756 | 12/2007 |

OTHER PUBLICATIONS

International Search Report for corresponding International Patent Application No. PCT/JP2010/007375, mailed Feb. 1, 2011.

(Continued)

*Primary Examiner* — Carol S Tsai
(74) *Attorney, Agent, or Firm* — Greenblum & Bernstein, P.L.C.

(57) ABSTRACT

A motion analysis apparatus is provided that enables an analysis result presentation quantity to be easily adjusted. A motion analysis apparatus is an apparatus that performs analysis of motion subject to comparison (compared motion) by means of comparison with standard motion, and has a motion feature extraction section and motion extraction section that determine a location where a degree of difference between a motion subject to comparison and a standard motion satisfies a predetermined condition, a presentation quantity input section that receives a specification of a presentation quantity of locations that satisfy the predetermined condition, and a motion extraction degree adjustment section that adjusts the predetermined condition so that a quantity of locations satisfying the predetermined condition becomes the specified presentation quantity.

19 Claims, 35 Drawing Sheets

(56) References Cited

U.S. PATENT DOCUMENTS

| | | | |
|---|---|---|---|
| 7,535,515 B2 | 5/2009 | Bacche et al. | |
| 7,587,065 B2 * | 9/2009 | Matsumoto et al. | 382/103 |
| 7,957,560 B2 * | 6/2011 | Otsu et al. | 382/104 |
| 2005/0134745 A1 | 6/2005 | Bacche et al. | |
| 2007/0291991 A1 * | 12/2007 | Otsu et al. | 382/104 |
| 2008/0123975 A1 * | 5/2008 | Otsu et al. | 382/236 |
| 2010/0021067 A1 * | 1/2010 | Otsu et al. | 382/195 |
| 2012/0176305 A1 * | 7/2012 | Ryu et al. | 345/156 |
| 2012/0176552 A1 * | 7/2012 | Ryu et al. | 348/734 |

OTHER PUBLICATIONS

Tada et al., "Measuring Drivers' Behavior Using Wireless 3D-Accelerometers for Anomaly Detection", The Institute of Electronics, Information and Communication Engineers (IEICE), Jun. 2007, pp. 117-122, 2007.

Shinohara et al., "Facial Expression Recognition Using Fisher Weight Maps", The Institute of Electronics Information and Communication Engineers (IEICE), Mar. 2004, pp. 79-84, 2004.

Morishita et al., "A Method of Motion Evaluation Using Time Weights and External Criteria", The Institute of Electronics Information and Communication Engineers (IEICE), Mar. 2008, pp. 47-52, 2008.

Yusuke Shinohara et al., "Facial Expression Recognition Using Fisher Weight Maps", Proceedings of the Sixth IEEE International Conference on Automatic Face and Gesture Recognition, May 19, 2004, pp. 499-504.

* cited by examiner

ACTION ANALYSIS DEVICE AND ACTION ANALYSIS METHOD

TECHNICAL FIELD

The present invention relates to a motion analysis apparatus and motion analysis method that perform analysis of motion subject to comparison by means of comparison with standard motion.

BACKGROUND ART

An apparatus and method that perform analysis of motion subject to comparison by means of comparison with standard motion have previously been proposed (see Non-Patent Literature 1 and Non-Patent Literature 2, for example).

An apparatus described in Non-Patent Literature 1 performs behavior measurement using accelerometers attached to various parts of a driver's body, and performs motion analysis using independent component analysis and a one-class SVM (support vector machine). More specifically, the apparatus described in Non-Patent Literature 1 extracts a feature vector (33 dimensions) from a model driving motion, and uses one-class SVM after applying principal component analysis to an extracted set of feature vectors and implementing non-correlation. That is to say, the apparatus described in Non-Patent Literature 1 extracts a difference between motion subject to comparison and standard motion using an SVM feature amount.

A method described in Non-Patent Literature 2 is a motion evaluation method in which time weights are introduced into video data cubic higher-order local autocorrelation (CHLAC) features. In the method described in Non-Patent Literature 2, time weights are introduced as a continuous function using a Fourier series expansion. More specifically, in the method described in Non-Patent Literature 2, a Fourier series is optimized with an external criterion, then a video feature is calculated using an obtained time weight, and motion evaluation is performed by means of discriminant analysis or multi regression analysis. Also, in the method described in Non-Patent Literature 2, a difference between standard motion and motion subject to comparison is extracted using a video feature time weight.

By using the above apparatus and method, a difference between motion subject to comparison and standard motion can be extracted, and a location that satisfies a predetermined condition, such as that the degree of difference exceeds a threshold value, can be presented. By this means, a user can confirm a presented location efficiently.

CITATION LIST

Patent Literature

PTL 1
Japanese Patent Application Laid-Open No. 2006-79272
PTL 2
Japanese Patent Application Laid-Open No. 2007-334756

Non-Patent Literature

NPL 1
TADA Masahiro et al., "Measuring Drivers' Behavior Using Wireless 3D-Accelerometers for Anomaly Detection," Technical Report of IEICE, Vol. 107, No. 114, pp. 117-122, 2007

NPL 2
MORISHITA Yusuke et al., "A Method of Motion Evaluation using Time Weights and External Criteria," Technical Report of IEICE, Vol. 107, No. 539, pp. 47-52, 2008
NPL 3
SHINOHARA Yusuke, OTSU Nobuyuki, "Facial Expression Recognition Using Fisher Weight Maps," Technical Report of IEICE, Vol. 103, No. 737, pp. 79-84, 2004

SUMMARY OF INVENTION

Technical Problem

An appropriate analysis result presentation quantity differs according to the type and length of time of motion subject to analysis, the circumstances of a user who confirms the analysis results, the accuracy required of the analysis, and so forth. If the number of locations for presentation, or the time period for presentation, is excessive, presentation contents become complicated, and require time and effort for confirmation. On the other hand, if the number of locations for presentation, or the time period for presentation, is insufficient, necessary analysis results cannot be adequately obtained. Also, an appropriate analysis result presentation quantity differs according to circumstances, even when the analysis target and user are the same. Therefore, it is desirable for an analysis result presentation quantity to be easily adjustable by a user.

It is an object of the present invention to provide a motion analysis apparatus and motion analysis method that enable an analysis result presentation quantity to be easily adjusted.

Solution to Problem

A motion analysis apparatus of the present invention performs analysis of motion subject to comparison by means of comparison with standard motion, and has: a motion difference extraction section that determines a location where a degree of difference between the motion subject to comparison and the standard motion satisfies a predetermined condition; a presentation quantity input section that receives a specification of a presentation quantity of locations that satisfy the predetermined condition; and a motion extraction degree adjustment section that adjusts the predetermined condition so that a quantity of locations satisfying the predetermined condition becomes the specified presentation quantity.

A motion analysis method of the present invention performs analysis of motion subject to comparison by means of comparison with standard motion, and has: a step of receiving a specification of a presentation quantity of results of the analysis; a step of determining a location where a degree of difference between the motion subject to comparison and the standard motion satisfies a predetermined condition; and a step of adjusting the predetermined condition when a quantity of locations satisfying the predetermined condition differs from a specified presentation quantity.

Advantageous Effects of Invention

The present invention enables an analysis result presentation quantity to be easily adjusted.

DESCRIPTION OF EMBODIMENTS

Now, embodiments of the present invention will be described in detail with reference to the accompanying drawings. Identical parts in the embodiments are assigned the same reference codes, and corresponding parts are assigned reference codes with different suffixes.

Embodiment 1

Figure 1:
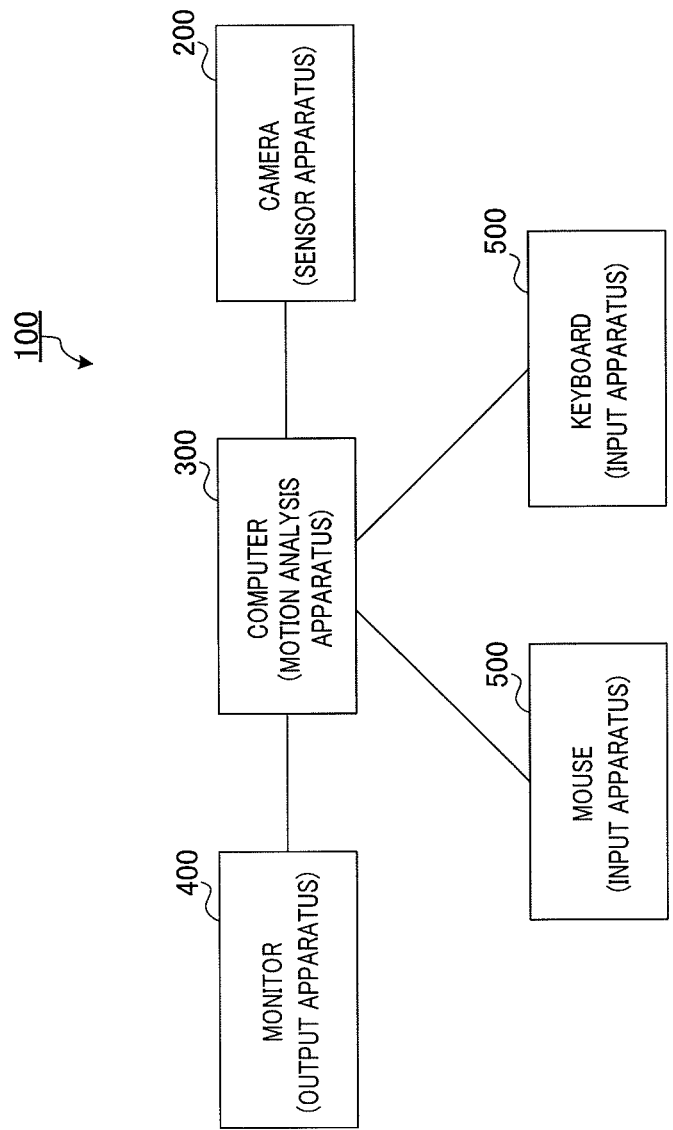
FIG. 1 is a system configuration diagram showing an example of the configuration of a motion analysis system according to Embodiment 1 of the present invention.

FIG. 1 is a system configuration diagram showing an example of the configuration of a motion analysis system according to Embodiment 1 of the present invention.

In this embodiment, a case is described by way of example in which the present invention is applied to a motion analysis system for analyzing motions of each general worker in a factory in which skilled workers and general workers work. Worker motion is, for example, a series of motions comprising a plurality of the unit motions of taking a component in the hand, placing it on an overall product, screwing it in place, and applying a seal. More specifically, a motion analysis system according to this embodiment performs motion analysis for general workers by photographing a posture of a skilled worker engaged in a work process, and photographing postures of general workers when engaged in the same work process from the same angle. Below, an above-described general unit motion and a unit of extraction as one deviating motion by motion analysis system 100, are referred to generically as "motion."

In FIG. 1, motion analysis system 100 has sensor apparatus 200, motion analysis apparatus 300 according to this embodiment, output apparatus 400, and input apparatuses 500.

Sensor apparatus 200 is an apparatus that detects human motion. Sensor apparatus 200 outputs data resulting from measurement of a worker's motion to motion analysis apparatus 300. Here, sensor apparatus 200 is assumed to be a camera that outputs image frame data of a captured image (moving image data) in real time, and to be capable of individually photographing workers working on a factory assembly line.

Below, motion data obtained by photographing a series of standard motions by a skilled worker is referred to as "standard motion data," and motion data obtained by photographing a series of motions subject to comparison by a general worker is referred to as "comparison target motion data." For convenience, standard motion data and data subject to analysis are referred to generically as "motion data."

Motion analysis apparatus 300 is an apparatus that performs analysis of motion subject to comparison by means of comparison with standard motion. Motion analysis apparatus 300 extracts a location where a degree of difference between motion subject to comparison and standard motion satisfies a predetermined condition, generates a screen presenting an extracted location (hereinafter referred to as "result display screen"), and outputs the generated result display screen to output apparatus 400. Motion analysis apparatus 300 of this embodiment presents a location (hereinafter referred to as "deviating motion location") of motion (hereinafter referred to as "deviating motion") that differs greatly from standard motion.

It is assumed here that motion analysis apparatus 300 is a computer having a CPU (central processing unit), a storage medium such as RAM (random access memory), and a video capture circuit for capturing moving image data. That is to say, motion analysis apparatus 300 operates by means of execution of a stored control program by the CPU.

Output apparatus 400 outputs result display screen data input from motion analysis apparatus 300. It is assumed here that output apparatus 400 is a monitor having a liquid crystal display. Output apparatus 400 may also be an apparatus installed at a remote location (such as a remote monitoring apparatus, mobile phone, or the like). In this case, output apparatus 400 is connected to motion analysis apparatus 300 via a network such as the Internet, for example.

Input apparatuses 500 are interfaces used by a user to operate motion analysis apparatus 300. Here, input apparatuses 500 are a mouse as a pointing device and a keyboard, for example.

Motion analysis system 100 of this kind can present a location where motion deviating from motion subject to comparison is detected to a user via a result display screen. Therefore, a user can analyze motion subject to comparison efficiently by confirming only a presented location.

The configuration of motion analysis apparatus 300 will now be described.

Figure 2:
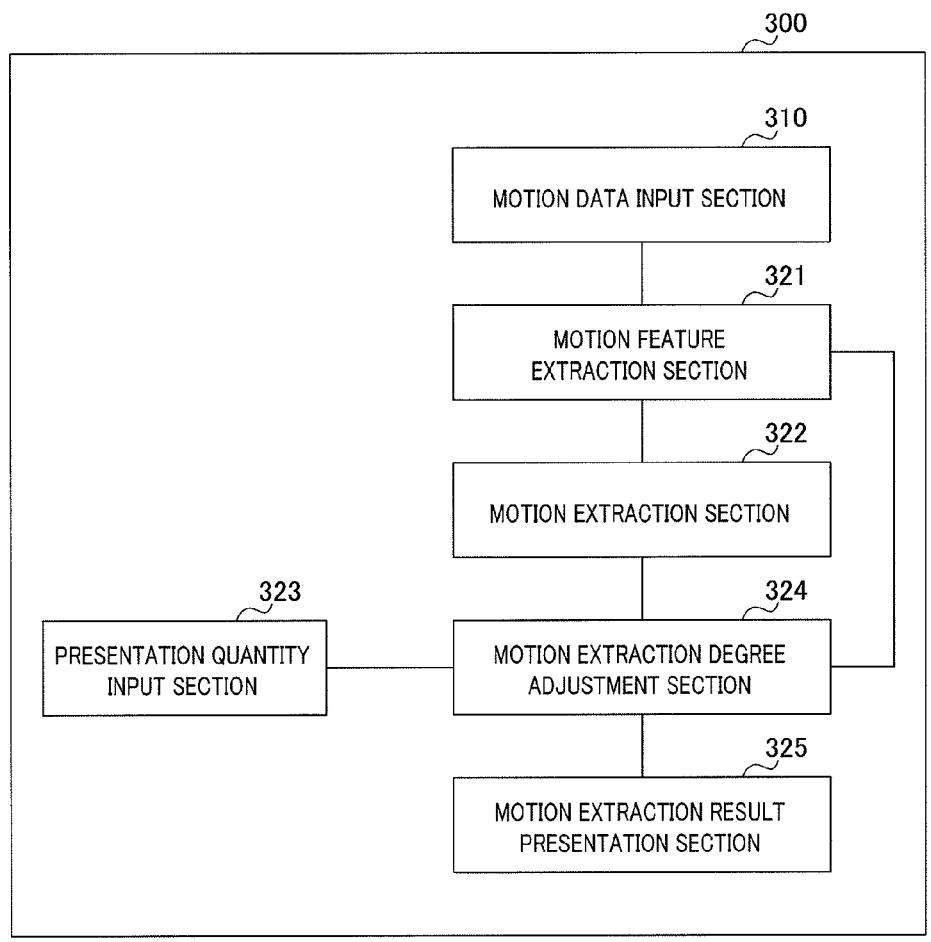
FIG. 2 is a block diagram showing an example of the configuration of a motion analysis apparatus according to Embodiment 1.

FIG. 2 is a block diagram showing an example of the configuration of motion analysis apparatus 300.

In FIG. 2, motion analysis apparatus 300 has motion data input section 310, motion feature extraction section 321, motion extraction section 322, presentation quantity input section 323, motion extraction degree adjustment section 324, and motion extraction result presentation section 325. Motion feature extraction section 321 and motion extraction section 322 correspond to a motion difference extraction section according to the present invention.

Motion data input section 310 acquires motion data from sensor apparatus 200 in response to a request from motion feature extraction section 321, and transfers this motion data to motion feature extraction section 321. Transfer of motion data may be performed in real time, or may be performed after motion data is stored. Motion data input section 310 categorizes motion data input from sensor apparatus 200 as either standard motion data or comparison target motion data at the time of input or after input on receiving an input apparatus 500 user operation. Motion data input section 310 may store input standard motion data for reuse.

Motion feature extraction section 321 extracts a feature amount indicating a motion feature (hereinafter referred to simply as "feature amount") from motion data input from motion data input section 310, using a predetermined parameter (first parameter). Then motion feature extraction section 321 outputs the extracted feature amount to motion extraction section 322.

Below, a feature amount extracted from standard motion data is referred to as "standard motion feature amount" as appropriate, and a feature amount extracted from comparison target motion data is referred to as "compared motion feature amount" as appropriate.

It is assumed here that a feature amount is a CHLAC feature disclosed in Non-Patent Literature 2. A CHLAC feature is an extension to three dimensions, through the addition of a time domain, of a higher-order local autocorrelation (HLAC) feature obtained by feature extraction from two-dimensional image data, and is a feature vector indicating a feature of movement in a three-dimensional coordinate system in which a time domain is added to the planar space of an image. As a value of a parameter used in feature extraction, a predetermined initial value is set in the initial state, after which the value is adjusted by motion extraction degree adjustment section 324 as appropriate.

Motion extraction section 322 extracts a difference between motion subject to comparison and standard motion from a standard motion feature amount and compared motion feature amount input from motion feature extraction section 321, using a predetermined parameter (second parameter). Then motion extraction section 322 extracts a location where the extracted difference satisfies a condition determined by a predetermined parameter (third parameter), and outputs the extraction result to motion extraction degree adjustment section 324. The extraction result includes an extracted location (hereinafter referred to as "extraction location") and a number of extraction locations according to a predetermined count reference (hereinafter referred to as "extraction number"). If an extraction location is an interval, the extraction result includes the start time and end time of that interval.

Below, parameters used by motion feature extraction section 321 in feature amount extraction are referred to generically as "feature extraction parameters" for convenience, and parameters used by motion extraction section 322 in motion extraction are referred to generically as "motion extraction parameters" for convenience. Feature extraction parameter categories include an image size, frame rate, and window size for CHLAC feature extraction, a principal component analysis cumulative contribution degree, a number of basis functions of a Fourier series, a least square criterion partial regression coefficient, and the value of k in a k-nn algorithm (k-nearest neighbor algorithm). Feature extraction parameter categories also include duration of motion and a distance threshold value described later herein.

Presentation quantity input section 323 receives a specification of a number of extraction locations to be presented to a user (an extraction result presentation quantity) via input apparatus 500, and outputs the specified number (hereinafter referred to as "target extraction number") to motion extraction degree adjustment section 324.

When the extraction number and target extraction number do not match, motion extraction degree adjustment section 324 adjusts a motion feature extraction section 321 feature extraction parameter so that they match, and directs motion feature extraction section 321 to perform feature amount re-extraction. Then, when the extraction number and target extraction number match, motion extraction degree adjustment section 324 outputs the extraction result to motion extraction result presentation section 325. That is to say, motion extraction degree adjustment section 324 causes motion feature extraction section 321 and motion extraction section 322 to repeat processing, while changing a feature extraction parameter, until the extraction number and target extraction number match.

Motion extraction result presentation section 325 generates a result display screen that presents extraction results input from motion extraction degree adjustment section 324, and displays this via output apparatus 400.

Motion analysis apparatus 300 having this kind of configuration can present a user with deviating motion locations for a user-specified target extraction number as analysis results. Therefore, a user can adjust a deviating motion location presentation quantity by means of a simple method of target extraction number input, without individually adjusting parameters used in feature amount extraction and motion extraction.

The operation of motion analysis apparatus 300 will now be described.

Figure 3:
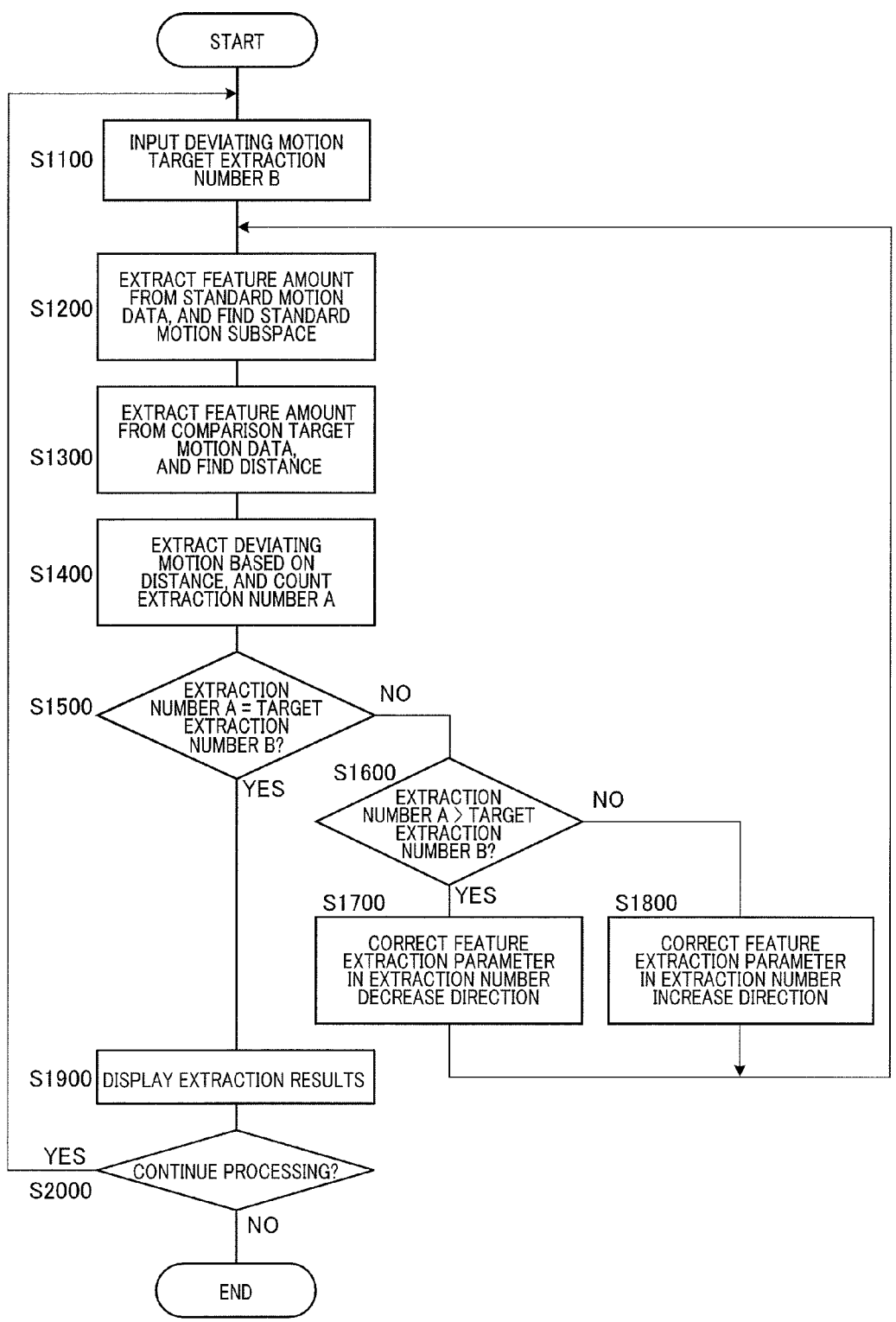
FIG. 3 is a flowchart showing an example of the operation of a motion analysis apparatus according to Embodiment 1.
Figure 4:
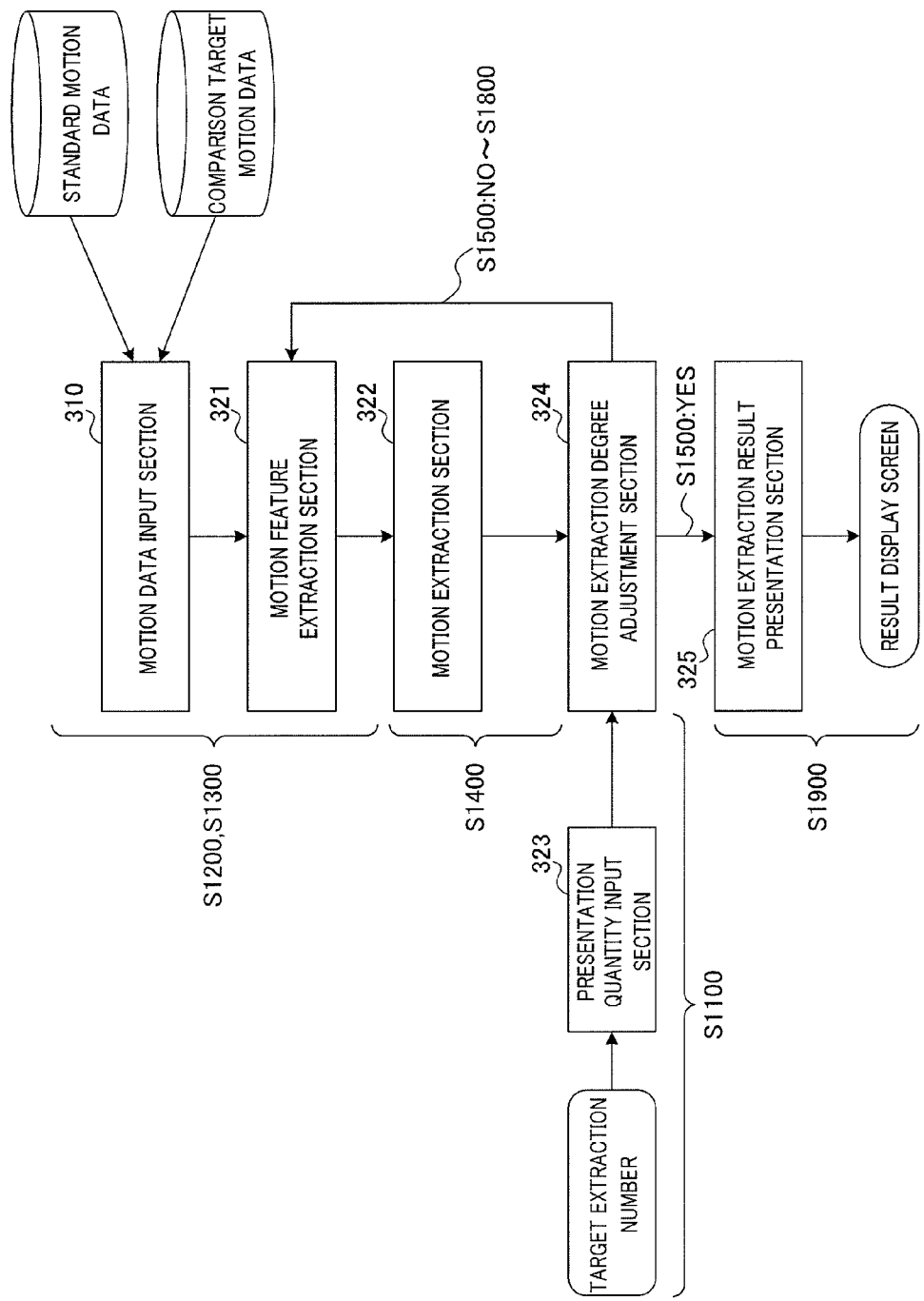
FIG. 4 is a drawing showing an example of the flow of information in a motion analysis apparatus according to Embodiment 1.

FIG. 3 is a flowchart showing an example of the operation of motion analysis apparatus 300, and FIG. 4 is a drawing showing an example of the flow of information in motion analysis apparatus 300.

First, a user, for example, has responsibility for work including an object motion switched around between a skilled worker and general worker on either side of a rest period, and operates motion analysis apparatus 300 so as to photograph the motions of each. In this way, there is no particular need for a time period for motion evaluation, and no burden is imposed on the workers, enabling data acquisition for motion analysis to be performed without affecting factory productivity.

As a result, motion data input section 310 has standard motion data and comparison target motion data as input, and outputs the input standard motion data and comparison target motion data to motion feature extraction section 321. For one analytical processing session, motion data input section 310 may acquire a plurality of standard motion data from one person or a plurality of persons, or may acquire a plurality of comparison target motion data from one person or a plurality of persons. Also, if standard motion data input in the past has been stored, motion data input section 310 may output that standard motion data to motion feature extraction section 321.

First, in step S1100, motion extraction degree adjustment section 324 receives input of a target extraction number (hereinafter referred to using symbol "B" for convenience) via presentation quantity input section 323. Specifically, for example, on receiving a directive from motion extraction degree adjustment section 324, presentation quantity input section 323 displays a screen prompting target extraction number input on output apparatus 400. Then presentation quantity input section 323 returns a numeric value input in response via input apparatus 500 to motion extraction degree adjustment section 324 as target extraction number B.

If using the target extraction number for the previous time, motion extraction degree adjustment section 324 need not necessarily receive target extraction number input via presentation quantity input section 323. Also, in this case, motion extraction degree adjustment section 324 may determine whether or not to use the target extraction number for the previous time based on whether or not there is a user query via presentation quantity input section 323, or processing has been repeated using the same target extraction number a specified number of times.

Then, in step S1200, motion feature extraction section 321 extracts standard motion feature amounts on a frame-by-frame basis from one or a plurality of standard motion data, and finds a standard motion subspace from the extracted series of standard motion feature amounts. Here, a standard motion feature amount is a CHLAC feature, as above. A standard motion subspace is a space that defines standard motion.

Motion feature extraction section 321 calculates CHLAC feature x using the autocorrelation function of an N-th order shown in equation 1 below, for example.

(Equation 1)

$$x_f^N(a_1,\ldots,a_N)=\int f(r)f(r+a)\ldots f(r+a_N)dr \quad [1]$$

Here, f is a time series image, and variable r and N variables $a_i$ (where i=1, . . . , N) are three-dimensional vectors with image-internal two-dimensional coordinates and time as components. The time-direction integration range is decided according to what degree of time-direction correlation there is. That is to say, an integration range is a three-dimensional collection of pixels comprising N still images (local feature images), variable r is one pixel in an image (position pixel), and variable a is a displacement vector from r. Also, f(r) is a position r function value, expressing the brightness value of position r in a local feature image.

In the case of a CHLAC feature, displacement is three-dimensional, and the number of displacement vector combinations (displacement patterns) is one for the zero order, 13 for the first order, and 237 for the second order. Therefore, in the case of a binarized image, a CHLAC feature is expressed as a feature vector with a total of 251 dimensions.

Also, for example, motion feature extraction section 321 performs principal component analysis on a series of standard motion feature amounts, and finds a principal component vector. Then motion feature extraction section 321 acquires this principal component vector as a standard motion subspace. Details of CHLAC feature and standard motion subspace calculation methods are given in Patent Literature 1, for example.

Within its integration range, a CHLAC feature is contained in a standard motion subspace when only motion that is the same as standard motion used in standard motion feature amount calculation is performed. Also, within its integration range, a CHLAC feature is a value separated from a standard motion subspace when even one motion differing from standard motion is performed. Also, a CHLAC feature is a value that is farther separated from a standard motion subspace the greater the difference of motion that differs from standard motion, or the longer the duration of that motion. Therefore, motion analysis apparatus 300 performs motion analysis utilizing the fact that a degree of dissimilarity of motion with respect to standard motion is approximately proportional to the length of a distance from a feature amount standard motion subspace. Here, a distance from a certain feature amount standard motion subspace (hereinafter referred to as "distance" for convenience) is, for example, a vertical distance in an orthogonal complement found from a projector to a standard motion subspace of that feature amount and a projector to an orthogonal complement with respect thereto. A CHLAC feature is greatly influenced by the sum of movements of each part in motion, and is therefore suitable for evaluating the sum consistency of the orientation of movement of each part (for example, a hand) in motion at a certain point in time.

If a standard motion subspace calculated in the past has been stored, motion feature extraction section 321 need not perform a new calculation.

Then, in step S1300, motion feature extraction section 321 extracts compared motion feature amounts on a frame-by-frame basis from comparison target motion data, and finds a distance from a standard motion subspace of each of the extracted series of standard motion feature amounts. Then motion feature extraction section 321 outputs the found distances to motion extraction section 322.

Then, in step S1400, motion extraction section 322 extracts deviating motion based on a distance from a standard motion subspace, counts the number of extractions (extraction number) (hereinafter referred to using symbol "A" for convenience), and outputs this to motion extraction degree adjustment section 324.

More specifically, motion extraction section 322 first extracts a part that satisfies a condition defined by a motion extraction parameter within comparison target motion data as one deviating motion location. Then motion extraction section 322 counts extracted deviating motion locations as extraction number A.

A condition defined by a motion extraction parameter is, for example, that a state in which a distance is greater than a predetermined distance threshold value continues, and the duration thereof is greater than or equal to a predetermined minimum continuous time and less than or equal to a predetermined longest continuous time. A predetermined distance threshold value is, for example, 60% of the maximum distance value found for frames of the entire comparison target motion data. A predetermined minimum continuous time is, for example, 0.3 second. A predetermined minimum continuous time is, for example, 25% of the length of comparison target motion data (average length in the case of a plurality).

By applying a condition of this kind, motion extraction section 322 can avoid treating detected noise, a minutely deviating motion, motion such as background movement that should not be subject to comparison, and so forth, as deviating motion, and can extract only an appropriate deviating motion.

Then, in step S1500, motion extraction degree adjustment section 324 determines whether or not extraction number A and target extraction number B are equal. If extraction number A and target extraction number B are not equal (S1500: NO), motion extraction degree adjustment section 324 proceeds to step S1600.

In step S1600, motion extraction degree adjustment section 324 determines whether or not extraction number A is larger than target extraction number B. If extraction number A is larger than target extraction number B (S1600: YES), motion extraction degree adjustment section 324 proceeds to step S1700, whereas if extraction number A is not larger than target extraction number B (S1600: NO), motion extraction degree adjustment section 324 proceeds to step S1800.

In step S1700, motion extraction degree adjustment section 324 corrects a motion feature extraction section 321 feature extraction parameter in a direction in which extraction number A decreases, returns to step S1200, and directs motion feature extraction section 321 to perform feature amount re-extraction.

For example, motion extraction degree adjustment section 324 adjusts a feature extraction parameter so that a difference between motion subject to comparison and standard motion is detected based on a broad feature amount. That is to say, motion extraction degree adjustment section 324 adjusts a feature extraction parameter based on a parameter adjustment rule so that a location where a large difference appears in a large motion is detected. Here, a large motion is motion that effects a change in a comparatively large number of pixels at a certain moment and that has a long cycle, and a broad feature amount is a feature amount conspicuously extracted from such motion. Parameter correction performed in this case is, for example, to make the resolution of motion data subject to extraction coarser, to increase the frame rate interval, to increase the pixel interval from a reference point of a CHLAC mask pattern, or the like. Other examples of parameter correction include, for example, making the principal component analysis cumulative contribution degree smaller, or making the window size at the time of extraction larger.

A parameter adjustment rule stipulates which parameter is changed in what way for cases in which extraction number A is decreased or increased. Motion analysis apparatus 300 stores a parameter adjustment rule in motion feature extraction section 321 or motion extraction degree adjustment section 324. A parameter adjustment rule is determined based on empirical measurement, experimentation, learning, or the like, and may be stored in motion analysis apparatus 300 in advance, or may be acquired from outside via a network or the like as necessary.

A parameter adjustment rule for decreasing extraction number A has contents that perform feature extraction parameter adjustment in the following way in order to extract a larger feature. For example, a parameter adjustment rule has contents that make resolution coarser by a reduction of 5%, make the frame rate twice as long, double the pixel interval from a reference point of a CHLAC mask pattern, reduce the principal component analysis cumulative contribution degree by 1%, and increase the window size at the time of extraction by 5. In this case, a parameter adjustment rule is written as A>B:r=−5; fs=x2; ps=x2; acr=−1; ws=+5, for example, in accordance with a predetermined description method. When changes for a plurality of parameters are described in a parameter adjustment rule, motion extraction degree adjustment section 324 may change the values of the plurality of parameters in a distributed fashion in a plurality of operations rather than changing the values of all the parameters in a single correction operation.

As a result, extraction number A is decreased, and motion extraction degree adjustment section 324 performs a comparison between extraction number A and target extraction number B once again (S1500).

On the other hand, in step S1800, motion extraction degree adjustment section 324 corrects a feature extraction parameter in a direction in which extraction number A increases, returns to step S1200, and directs motion feature extraction section B21 to perform feature amount re-extraction.

For example, motion extraction degree adjustment section 324 adjusts a feature extraction parameter so that a difference between motion subject to comparison and standard motion is detected based on a fine feature amount—that is to say, so that a location where a large difference appears in a small motion is detected. Here, a small motion is motion that effects a change in a given quantity of pixels or more, fewer than in a large motion, at a certain moment and that has a short cycle, and a fine feature amount is a feature amount conspicuously extracted from such motion. For instance, an example of a large motion is a motion of waving an arm, and an example of a small motion is a motion of moving an index finger up and down. Compared with a small motion, a large motion effects a change in more pixels, and often takes more time.

Parameter correction performed in this case is, for example, to make the resolution of motion data subject to extraction finer, to decrease the frame rate interval, to decrease the pixel interval from a reference point of a CHLAC mask pattern, or the like. Other examples of parameter correction include, for example, making the principal component analysis cumulative contribution degree larger, or making the window size at the time of extraction smaller.

A parameter adjustment rule for increasing extraction number A has contents that perform feature extraction parameter adjustment in the following way in order to extract a smaller feature. For example, a parameter adjustment rule has contents that make resolution finer by an increase of 5%, halve the frame rate, halve the pixel interval from a reference point of a CHLAC mask pattern, increase the principal component analysis cumulative contribution degree by 1%, and decrease the window size at the time of extraction by 5. In this case, a parameter adjustment rule is written as A<B:r=+5; fs=x0.5; ps=x0.5; acr=+1; ws=−5, for example, in accordance with a predetermined description method.

As a result, extraction number A is increased, and motion extraction degree adjustment section 324 performs a comparison between extraction number A and target extraction number B once again (S1500). That is to say, the processing in steps S1200 through S1800 is repeated until extraction number A matches target extraction number B.

Then, if extraction number A is equal to target extraction number B (S1500: YES), motion extraction degree adjustment section 324 outputs an extraction result to motion extraction result presentation section 325, and proceeds to step S1900.

In step S1900, motion extraction result presentation section 325 generates a result display screen that presents extraction results, and displays this screen on output apparatus 400.

Figure 5:
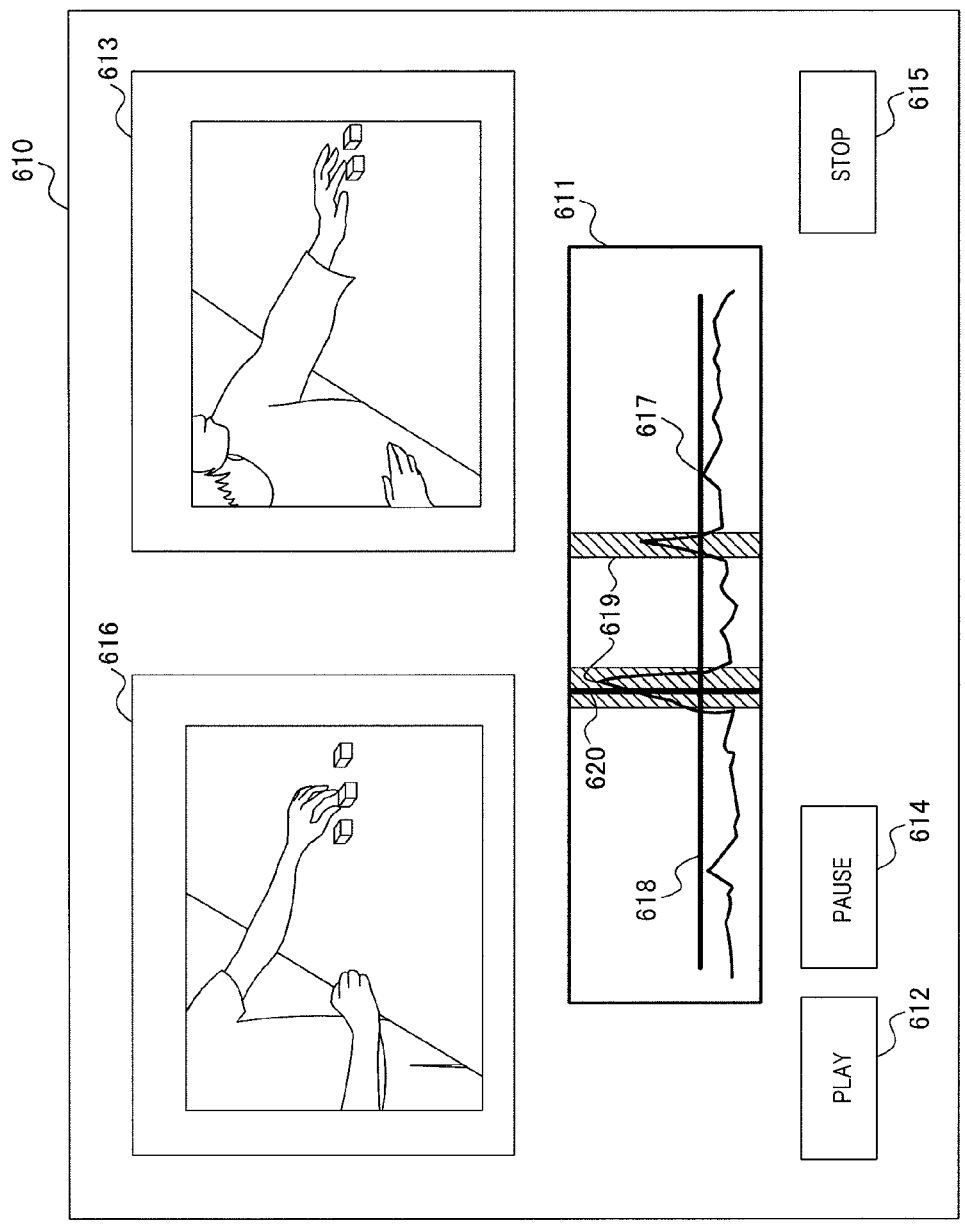
FIG. 5 is a drawing showing an example of a result display screen in Embodiment 1.

FIG. 5 is a drawing showing an example of a result display screen. FIG. 5 shows an example of a case in which conditions extracted as a deviating motion location are that a distance to a standard motion subspace of a feature amount subject to comparison (compared feature amount) is larger than a predetermined distance threshold value, and target extraction number B is 2.

As shown in FIG. 5, result display screen 610 has analysis result display area 611, play button 612, compared motion display area 613, pause button 614, stop button 615, and standard motion display area 616.

In analysis result display area 611, result display screen 610 displays time series data 617 of a distance to a compared feature amount standard motion subspace, threshold value display line 618 indicating a predetermined distance threshold value, and markers 619 indicating extraction locations. Also, motion extraction result presentation section 325 displays playback location display line 620 that can be moved horizontally via input apparatuses 500.

When play button 612 is clicked, motion extraction result presentation section 325 plays back a captured image of motion subject to comparison in compared motion display area 613, and moves playback location display line 620 in accordance with the playback. When pause button 614 is clicked during image playback, motion extraction result presentation section 325 temporarily stops image playback. Standard motion display area 616 also plays back a standard motion captured image in synchronization with playback of the compared motion captured image in compared motion display area 613.

By means of result display screen 610 of this kind, a user can rapidly identify and check video of deviating motion by moving playback location display line 620 to a marker 619 area and clicking play button 612. Also, deviating motion locations are identified according to a specified number, enabling a user to be presented with a quantity of analysis results desired by the user himself. Furthermore, a user can visually compare compared motion and standard motion.

Result display screen 610 may display a standard motion data image and a comparison target motion data image simultaneously or by switching between the two. Also, result display screen 610 may also output other motion-related data, such as the motion data capture date and time, comparison object acceleration data, speech, or the like, for example. Furthermore, if CHLAC features are used, result display screen 610 may also output a CHLAC value (that has been subjected to principal component analysis). Moreover, if feature amounts based on acceleration are used, result display screen 610 may display values obtained by performing principal component analysis of time series high-order feature amounts and reducing dimensions to three, by means of a three-dimensional trajectory. Here, in image playback, provision may be made for result display screen 610 to perform highlighted display of values corresponding to a three-dimensional trajectory output synchronized with playback.

Then, in step S2000, motion analysis apparatus 300 determines whether or not termination of analytical processing has been directed by means of a user operation or the like. If termination of analytical processing has not been directed (S2000: YES), motion analysis apparatus 300 returns to step S1100, whereas if termination of analytical processing has been directed (S2000: NO), motion analysis apparatus 300 terminates the series of operations.

By means of such operation, motion analysis apparatus 300 can adjust a feature extraction parameter so that an actual extraction number matches a user-specified target extraction number, and can present a user with extraction results when the extraction number matches the target extraction number.

When correcting a parameter in a direction in which an extraction number increases, motion extraction degree adjustment section 324 may leave extraction results thus far as subject to presentation (presentation objects).

More specifically, first, each time parameter correction is performed, motion extraction degree adjustment section 324 compares an extraction location prior to that parameter correction (hereinafter referred to as "pre-correction extraction location") and an extraction location after that parameter correction (hereinafter referred to as "post-correction extraction location"). Then motion extraction degree adjustment section 324 goes on increasing presentation objects by adding an item not included in any pre-correction extraction location among post-correction extraction locations (hereinafter referred to as "new extraction location") to pre-correction extraction locations. Then, when the number of extraction locations subject to presentation reaches the target extraction number, motion extraction degree adjustment section 324 proceeds to step S1900.

That is to say, motion extraction degree adjustment section 324 compares the sum ($A_{sum}=A_{old}+A_{new}$) of the number of pre-correction extraction locations ($A_{old}$) and the number of new extraction locations ($A_{new}$), with the target extraction number (B). While the sum of the numbers of extraction locations ($A_{sum}$) is smaller than the target extraction number (B) ($A_{sum}<B$), motion extraction degree adjustment section 324 repeats parameter correction in a direction in which the extraction number increases. Then, when the sum of the extraction locations ($A_{sum}$) becomes greater than or equal to the target extraction number (B) ($As_{um} \geq B$), motion extraction degree adjustment section 324 employs a location extracted first and a new extraction location as extraction results, and proceeds to step S1900.

By this means, it is possible to prevent a deviating motion location that has once been extracted from becoming excluded from extraction objects in the process whereby a parameter is corrected in a direction in which the extraction number increases.

When the number of times parameter correction has been performed reaches a predetermined upper limit, motion extraction degree adjustment section 324 may regard extraction number A as being equal to target extraction number B, and proceed to step S1900.

Also, if extraction number A that is larger than target extraction number B becomes smaller than target extraction number B as a result of parameter correction, motion extraction degree adjustment section 324 may regard extraction number A as being equal to target extraction number B, and proceed to step S1900.

Furthermore, if extraction number A that is smaller than target extraction number B becomes larger than target extraction number B as a result of parameter correction, motion extraction degree adjustment section 324 may regard extraction number A as being equal to target extraction number B, and proceed to step S1900.

Moreover, motion extraction degree adjustment section 324 may select an extraction result when the difference in number between extraction number A and target extraction number B becomes minimal, and proceed to step S1900.

By employing such kinds of processing, a situation can be prevented in which steps S1200 through S1800 are repeated for a long period of time, and extraction results are never displayed.

Also, if extraction number A that is larger than target extraction number B becomes smaller than target extraction number B as a result of parameter correction, and the difference between the pre-correction number ($A_{old}$) and target extraction number B becomes less than or equal to a predetermined threshold value, motion extraction degree adjustment section 324 may perform the following processing.

Motion extraction degree adjustment section 324 selects pre-correction extraction locations, in order from the one with the largest motion area, up to a number that matches target extraction number B, performs confirmation for the selected extraction locations, and proceeds to step S1900. Here, the area of a motion is a time integral of parts that exceed a distance threshold value among extraction location distances. If a distance extracted for time t is designated d(t), a distance threshold value is designated p, and an extraction location start time and end time are designated t1 and t2, motion area S is a value expressed by equation 2 below.

(Equation 2)

$$S = \int_{t1}^{t2} (d(t)-p) dt \quad [2]$$

Also, if extraction number A that is smaller than target extraction number B becomes larger than target extraction number B as a result of parameter correction, motion extraction degree adjustment section 324 may perform the following processing.

Motion extraction degree adjustment section 324 selects pre-correction extraction locations, in order from the one with the largest motion area, equivalent to a number ($B-A_{old}$) obtained by subtracting the number of pre-correction extraction locations from the target extraction number. Next, motion extraction degree adjustment section 324 takes those extraction locations as new extraction locations, and makes the number thereof the number of new extraction locations ($A_{new}$). Then motion extraction degree adjustment section 324 confirms pre-correction extraction locations and new extraction locations as extraction results, and proceeds to step S1900. The sum of the number of pre-correction extraction locations and the number of new extraction locations ($A_{old} + A_{new}$) matches the target extraction number (B).

Also, if the number of times parameter correction has been performed reaches the upper limit, motion extraction degree adjustment section 324 may select extraction locations when extraction number A nearest target extraction number B is obtained, in order from the one with the largest motion area, within the range of target extraction number B, and proceed to step S1900.

By employing such kinds of processing, motion analysis apparatus 300 according to this embodiment can prevent selection of motion that differs from standard motion but is of short duration and should not be treated as deviating motion. That is to say, motion analysis apparatus 300 according to this embodiment can take the duration of motion into consideration in performing deviating motion extraction.

Also, motion extraction degree adjustment section 324 may perform target extraction number input at other timing, such as when motion analysis apparatus 300 inputs motion data, or thereafter.

As described above, motion analysis apparatus 300 according to this embodiment adjusts a predetermined condition so that a number of locations for which the degree of difference between motion subject to comparison and standard motion satisfies a predetermined condition matches a user-specified target extraction number. That is to say, motion analysis apparatus 300 sets a number of locations to be presented as deviating motions in line with a user-specified value. By this means, motion analysis apparatus 300 can adjust an analysis result presentation quantity without performing fine parameter adjustment, and makes it possible for a user who does not understand a detailed motion analysis algorithm to easily obtain analysis results at a desired level of analysis.

Also, motion analysis apparatus 300 according to this embodiment does not require manual adjustment of parameter settings relating to a motion analysis algorithm, and is therefore also suitable for a case in which a large number of unit motions are subject to analysis. Moreover, motion analysis apparatus 300 according to this embodiment is effective in a case in which there are an enormous number of parameter types and the mechanism of the influence of each parameter on analysis results is complicated, eliminates the need for parameter adjustment tasks that require skill, and enables time and effort to be reduced.

Furthermore, motion analysis apparatus 300 according to this embodiment does not require manual adjustment of parameter settings relating to a motion analysis algorithm even if the target extraction number changes, and is therefore suitable for a case in which a required level of analysis frequently changes.

Also, motion analysis apparatus 300 according to this embodiment can perform fine extraction object adjustment that takes the type of motion subject to extraction into consideration.

The present invention can be applied to various embodiments other than above-described Embodiment 1. Another embodiment of the present invention will now be described as a variation of Embodiment 1.

Variation 1 of Embodiment 1

Variation 1 of Embodiment 1 is an example in which motion extraction degree adjustment section 324 corrects a motion extraction parameter of motion extraction section 322 instead of a feature extraction parameter of motion feature extraction section 321.

Figure 6:
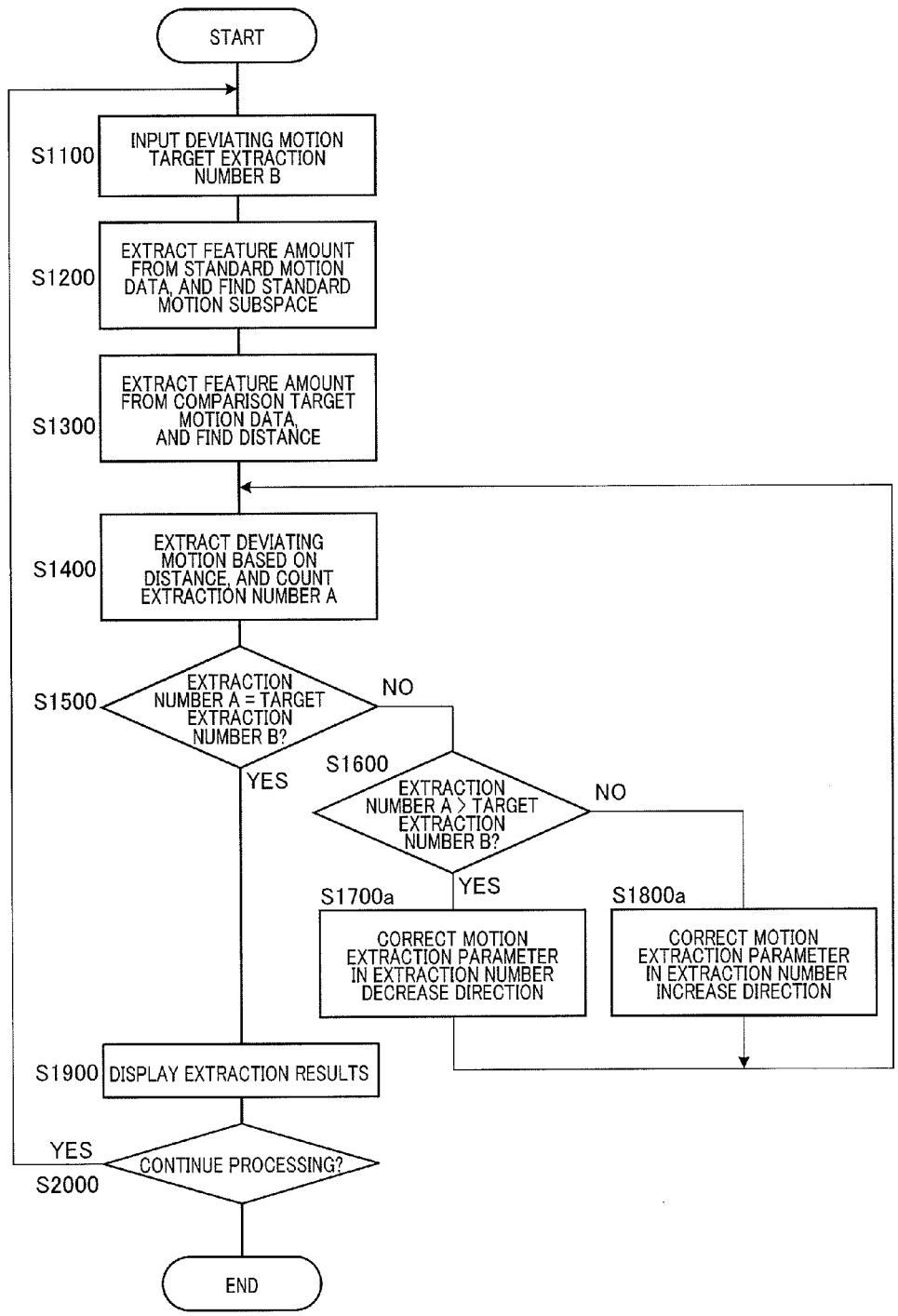
FIG. 6 is a flowchart showing an example of the operation of a motion analysis apparatus according to Variation 1 of Embodiment 1.
Figure 7:
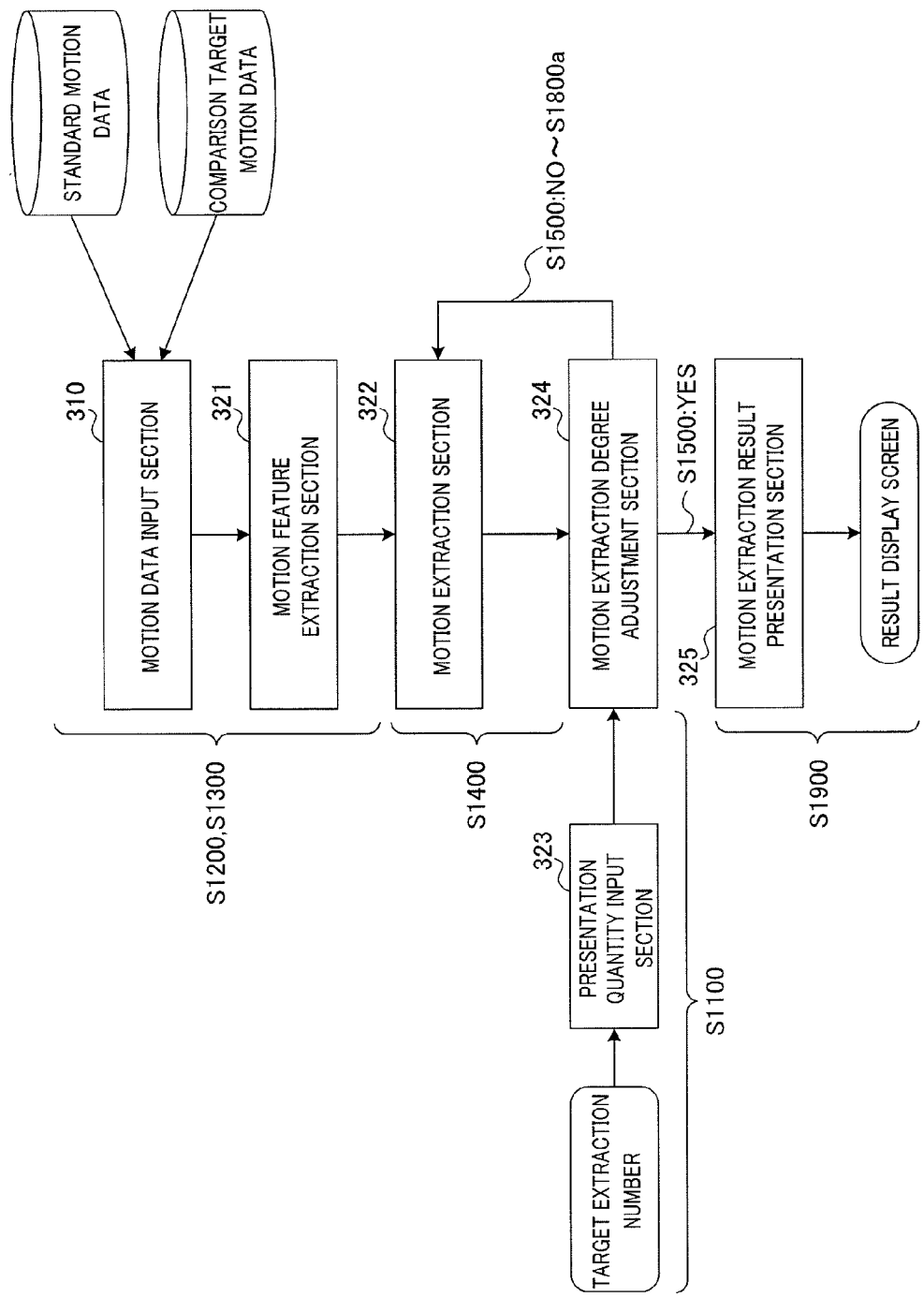
FIG. 7 is a drawing showing an example of the flow of information in a motion analysis apparatus according to Variation 1 of Embodiment 1.

FIG. 6 is a flowchart showing an example of the operation of motion analysis apparatus 300 according to this variation, and corresponds to FIG. 3. FIG. 7 is a drawing showing an example of the flow of information in motion analysis apparatus 300 according to this variation, and corresponds to FIG. 4. Parts in FIG. 6 and FIG. 7 identical to those in FIG. 3 and FIG. 4 are assigned the same step numbers as in FIG. 3 and FIG. 4, and descriptions thereof are omitted here.

If extraction number A is larger than target extraction number B (S1600: YES), motion extraction degree adjustment section 324 of motion analysis apparatus 300 according to this variation proceeds to step S1700a, whereas if extraction number A is not larger than target extraction number B (S1600: NO), motion extraction degree adjustment section 324 proceeds to step S1800a.

In step S1700a, motion extraction degree adjustment section 324 corrects a motion extraction section 322 motion extraction parameter in a direction in which extraction number A decreases, returns to step S1400, and directs motion extraction section 322 to perform motion re-extraction.

For example, assume that a condition for motion extraction by motion extraction section 322 is defined by an above-described distance threshold value, minimum continuous time, and longest continuous time. In this case, a parameter adjustment rule for decreasing extraction number A has contents that, for example, increase the distance threshold value by 10%, increase the minimum continuous time by 0.1 second, and increase the longest continuous time by 5%.

On the other hand, in step S1800a, motion extraction degree adjustment section 324 corrects a motion extraction section 322 motion extraction parameter in a direction in which extraction number A increases, returns to step S1400, and directs motion extraction section 322 to perform motion re-extraction.

In the case of the above condition, a parameter adjustment rule for increasing extraction number A has contents that, for example, decrease the distance threshold value by 5%, decrease the minimum continuous time by 0.1 second, and decrease the longest continuous time by 5%.

According to this variation, motion analysis apparatus 300 adjusts a motion extraction parameter, and therefore does not require feature amount re-extraction to be performed, and makes it possible to display analysis results speedily.

Motion analysis apparatus 300 may also adjust both a feature extraction parameter and a motion extraction parameter. Furthermore, these adjustments may be performed simultaneously in a single correction operation, or may be performed divided into separate correction operations. By this means, it is possible to perform finer extraction object adjustment that takes the type and degree of similarity of motions subject to extraction into consideration.

Variation 2 of Embodiment 1

Variation 2 of Embodiment 1 is an example in which motion analysis apparatus 300 performs analysis efficiently for a plurality of types of motion.

Motion analysis apparatus 300 according to this variation performs both motion extraction focusing on a feature amount corresponding to a large motion, and motion extraction focusing on a feature amount corresponding to a small motion.

For this purpose, motion analysis apparatus 300 stores in advance initial settings for extraction of a feature amount corresponding to a large motion (hereinafter referred to as "first initial settings"), and initial settings for extraction of a feature amount corresponding to a small motion (hereinafter referred to as "second initial settings").

Initial settings include an initial value of a feature extraction parameter and an initial value of a motion extraction parameter. For example, a first initial setting is a setting that performs processing that lowers the resolution of input motion data by half, and a second initial setting is a setting that leaves the resolution of input motion data unchanged.

Motion analysis apparatus 300 first acquires first analysis results extracted based on first initial settings, and second analysis results extracted based on second initial settings. Also, motion analysis apparatus 300 receives input of both a first target extraction number corresponding to a large motion, and a second target extraction number corresponding to a small motion, from a user. Then motion analysis apparatus 300 adjusts a parameter included in the first initial settings based on the first extraction results and first target extraction number, and adjusts a parameter included in the second initial settings based on the second extraction results and second target extraction number.

Then motion analysis apparatus 300 displays analysis results for a large motion and analysis results for a small motion simultaneously or by switching between the two. If motion analysis apparatus 300 displays analysis results for a large motion and analysis results for a small motion in analysis result display area 611 (see FIG. 5) simultaneously, it is desirable for markers 619 having different display modes, such as different colors, to be displayed.

According to this variation, both deviating motion in a large motion and deviating motion in a small motion are extracted and displayed together, enabling the efficiency and convenience of motion analysis to be improved for a user.

Variation 3 of Embodiment 1

Variation 3 of Embodiment 1 is an example of a case in which in which a specified presentation quantity is not an extraction number but a proportion of the total value of extraction location playback time (hereinafter referred to as "extraction time") with respect to comparison target motion data playback time.

Motion analysis apparatus 300 according to this variation calculates a proportion of extraction time (hereinafter referred to as "extraction time proportion") with respect to comparison target motion data playback time, and also receives an extraction time proportion specification from a user. Then motion analysis apparatus 300 adjusts a feature extraction parameter and motion extraction parameter so that the calculated extraction operation time matches the specified extraction operation time (hereinafter referred to as "target extraction time proportion").

For example, if the target extraction time proportion is 20% and the average comparison target motion data playback time is 30 seconds, motion analysis apparatus 300 performs motion extraction parameter adjustment so that the extraction time is 6 seconds (30 seconds×0.2).

The operation of motion analysis apparatus 300 is similar to the operation described using FIG. 3. However, an extraction number and a target extraction number are replaced by an extraction time proportion and a target extraction time proportion respectively. Also, since it is difficult to set a parameter adjustment rule such that an extraction time proportion perfectly matches a target extraction time proportion, motion analysis apparatus 300 performs the following kind of operation, for example.

If the difference between an extraction time proportion and a target extraction time proportion is less than or equal to a predetermined threshold value, motion analysis apparatus 300 regards the extraction time proportion as matching the target extraction time proportion, and proceeds to analysis result display processing. For example, if the predetermined threshold value is 5% of the average comparison target motion data playback time, and that average playback time is 30 seconds, motion analysis apparatus 300 accepts an error of 1.5 seconds (30 seconds×0.05). Then, if 20% has been specified as a target extraction time proportion, motion analysis apparatus 300 completes adjustment processing when the extraction time proportion satisfies the condition "greater than or equal to 4.5 seconds and less than or equal to 7.5 seconds," and displays the analysis results.

According to this variation, inputting a proportion of time with respect to the length of motion data rather than a number of motions enables a degree of extraction to be specified in an abstract fashion without particularly taking the length of motion data into consideration.

Motion analysis apparatus 300 may also receive an extraction time target value setting instead of a target extraction time proportion, and perform parameter adjustment so that an actual extraction time matches this target value. By this means, a user can make the time required for extraction location playback a desired time.

Variation 4 of Embodiment 1

Variation 4 of Embodiment 1 is an example in which a feature amount indicating a motion feature is other than a CHLAC-feature feature amount, and information other than distance to a standard motion subspace is used in motion extraction.

For example, motion feature extraction section 321 uses an SVM feature amount as a feature amount indicating a motion feature, and performs motion extraction based on a one-class SVM. Details of the methods of calculating an SVM feature amount and one-class SVM are given in Non-Patent Literature 1, for example, and therefore a description thereof is omitted here.

In this case, feature extraction parameters used by motion analysis apparatus 300 include, for example, a window size, wavelet expansion coefficient, and principal component analysis cumulative contribution degree. Also, motion extraction parameters used by motion analysis apparatus 300 according to this variation include a proportion of discriminative hyperplane divergence data, discriminative hyperplane kernel parameter, minimum continuous time, and longest continuous time.

Motion feature extraction section 321 can also perform motion extraction by means of a one-class SVM using a CHLAC feature. Furthermore, motion feature extraction section 321 can perform motion extraction using not only a motion feature amount but also another high-order feature amount.

According to this variation, in a motion analysis method that uses a feature amount and information other than a CHLAC feature and distance, a user can easily adjust an analysis result presentation quantity without manually adjusting individual parameters.

The above-described variations can be implemented in any combination. By this means, the above-described effects can be obtained in a composite fashion.

Embodiment 2

Embodiment 2 of the present invention is a motion analysis apparatus that enables a type of motion subject to presentation to be switched.

Figure 8:
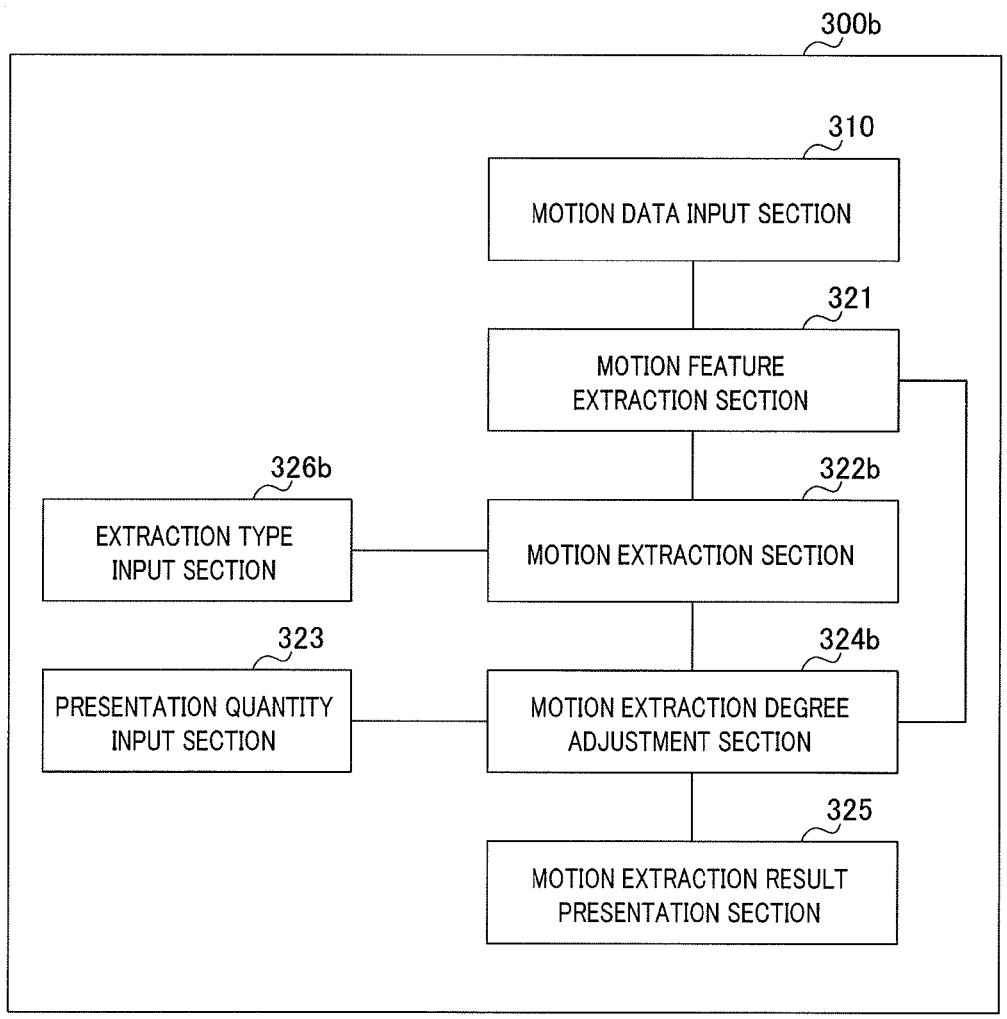
FIG. 8 is a block diagram showing an example of the configuration of a motion analysis apparatus according to Embodiment 2 of the present invention.

FIG. 8 is a block diagram showing an example of the configuration of a motion analysis apparatus according to this embodiment, and corresponds to FIG. 2 of Embodiment 1. Parts in FIG. 8 identical to those in FIG. 2 are assigned the same reference codes as in FIG. 2, and descriptions thereof are omitted here.

In FIG. 8, motion analysis apparatus 300b has motion extraction section 322b and motion extraction degree adjustment section 324b instead of, and performing different operations from, the motion extraction section and motion extraction degree adjustment section of Embodiment 1, and also has newly added extraction type input section 326b.

Extraction type input section 326b receives a specification of a type of motion to be presented to a user, via input apparatus 500, and outputs the specified type (hereinafter referred to as "extraction motion type") to motion extraction section 322b. It is assumed here that extraction type input section 326b receives a specification of either deviating motion, or motion for which the difference between motion subject to comparison and standard motion is small (hereinafter referred to as "standard level motion"), as an extraction motion type.

Motion extraction section 322b performs the same kind of operation as in Embodiment 1 when deviating motion is specified, or extracts a location of standard level motion as a standard level motion location when standard level motion is specified, and outputs extraction results to motion extraction degree adjustment section 324b. The standard level motion location extraction method will be described later herein.

When a deviating motion location has been input, motion extraction degree adjustment section 324b performs the same kind of operation as in Embodiment 1. When a standard level motion location has been input, motion extraction degree adjustment section 324b causes the extraction number to match a target extraction number by means of parameter adjustment differing in content from that used in the case of deviating motion.

Motion analysis apparatus 300b having this kind of configuration can perform standard level motion location extraction, and perform extraction location presentation in line with a user-specified presentation quantity.

The operation of motion analysis apparatus 300b will now be described.

Figure 9:
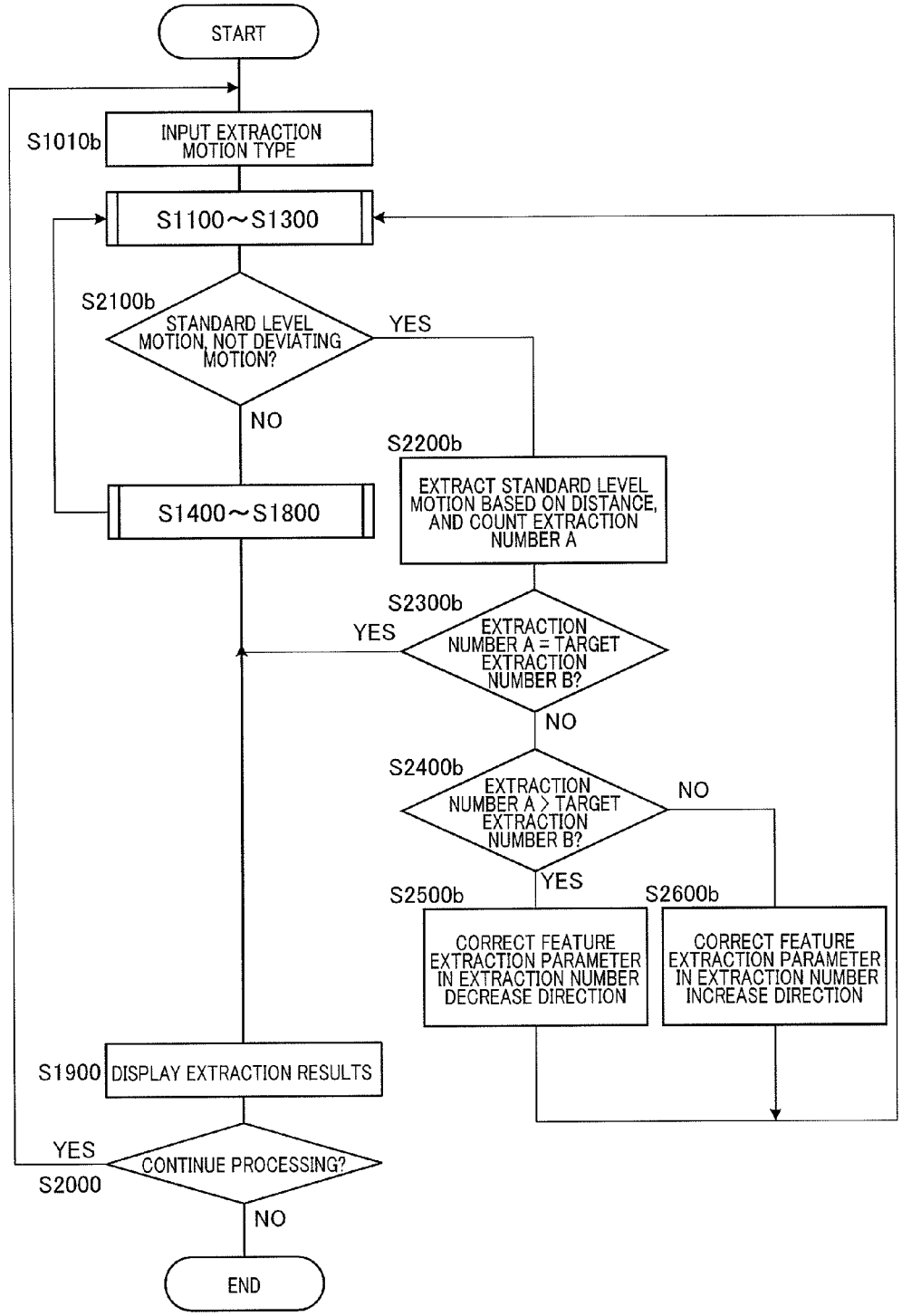
FIG. 9 is a flowchart showing an example of the operation of a motion analysis apparatus according to Embodiment 2.
Figure 10:
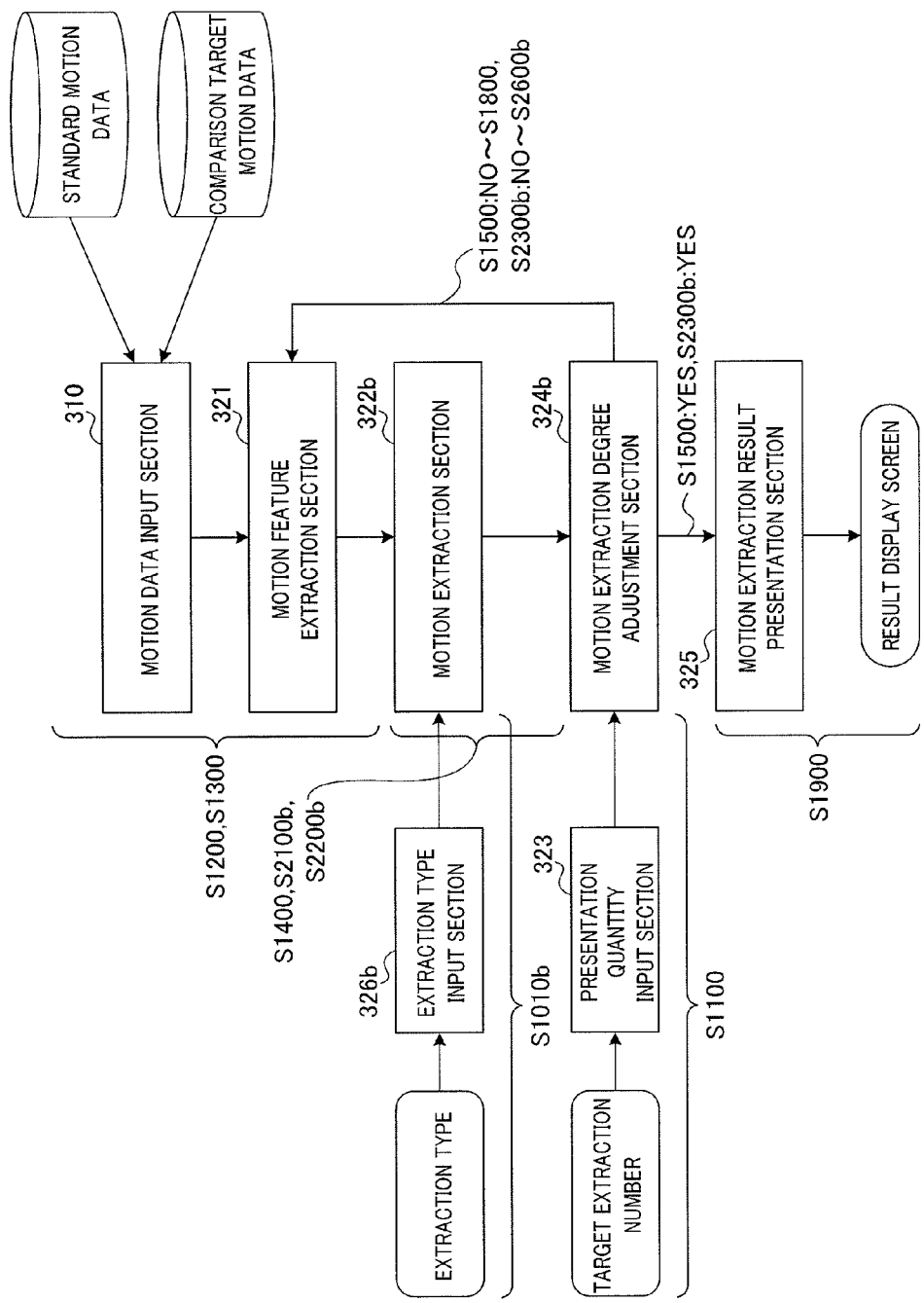
FIG. 10 is a drawing showing an example of the flow of information in a motion analysis apparatus according to Embodiment 2.

FIG. 9 is a flowchart showing an example of the operation of motion analysis apparatus 300b, and corresponds to FIG. 3 of Embodiment 1. Parts in FIG. 9 identical to those in FIG. 3 are assigned the same reference codes as in FIG. 3, and descriptions thereof are omitted here. FIG. 10 is a drawing showing an example of the flow of information in motion analysis apparatus 300b.

First, in step S1010b, motion extraction section 322b receives input of an extraction motion type via extraction type input section 326b, and proceeds to step S1100. Specifically, on receiving a directive from motion extraction section 322b, extraction type input section 326b displays a screen prompting motion type selection on output apparatus 400. Then extraction type input section 326b returns a motion type selected in response via input apparatus 500 to motion extraction section 322b as an extraction motion type.

Then motion analysis apparatus 300b inputs target extraction number B, calculates the distance of a standard motion feature amount from a standard motion subspace on a frame-by-frame basis (S1100 through S1300), and then proceeds to step S2100b.

In step S2100b, motion extraction section 322b determines whether or not the extraction motion type is standard level motion rather than deviating motion. If the extraction motion type is deviating motion (S2100b: NO), motion extraction section 322b proceeds to step S1400, whereas if the extraction motion type is standard level motion (S2100b: YES), motion extraction section 322b proceeds to step S2200b.

In step S2200b, motion extraction section 322b extracts standard level motion based on a distance, counts the number of extractions (extraction number) (hereinafter referred to using symbol "A" for convenience), and outputs this to motion extraction degree adjustment section 324b.

More specifically, motion extraction section 322b first extracts a part that satisfies a condition defined by a motion extraction parameter within comparison target motion data as one standard level motion location. Then motion extraction section 322b counts the extracted standard level motion location as extraction number A.

A condition defined by a motion extraction parameter is, for example, that a state in which a distance is smaller than a predetermined distance threshold value continues, and the duration thereof is greater than or equal to a predetermined minimum continuous time and less than or equal to a predetermined longest continuous time. A predetermined distance threshold value is, for example, 40% of the maximum distance value found from the entire comparison target motion data. A predetermined minimum continuous time is, for example, 0.3 second. A predetermined minimum continuous time is, for example, 25% of the length of comparison target motion data (average length in the case of a plurality).

By applying a condition of this kind, motion that should be treated as standard level motion can be prevented from being excluded from presentation objects due to the influence of detected noise or background movement.

Then, in the same way as in steps S1500 through S1800 in FIG. 3, motion extraction degree adjustment section 324b performs motion feature extraction section 321 feature extraction parameter adjustment according to the magnitude relationship between extraction number A and target extraction number B (S2300b through S2600b).

However, in steps S2500b and S2600b, motion extraction degree adjustment section 324 performs parameter adjustment differing in content from S1700 and S1800. That is to say, for example, motion extraction degree adjustment section 324 stores parameter adjustment rules for a case in which extraction number A is decreased and a case in which extraction number A is increased for a case in which the extraction motion type is deviating motion and a case in which the extraction motion type is standard level motion, respectively. This is because a condition defined by a motion extraction parameter differs as described above for deviating motion and standard level motion, and how which parameter should be corrected differs even when extraction number A is changed in the same direction.

Figure 11:
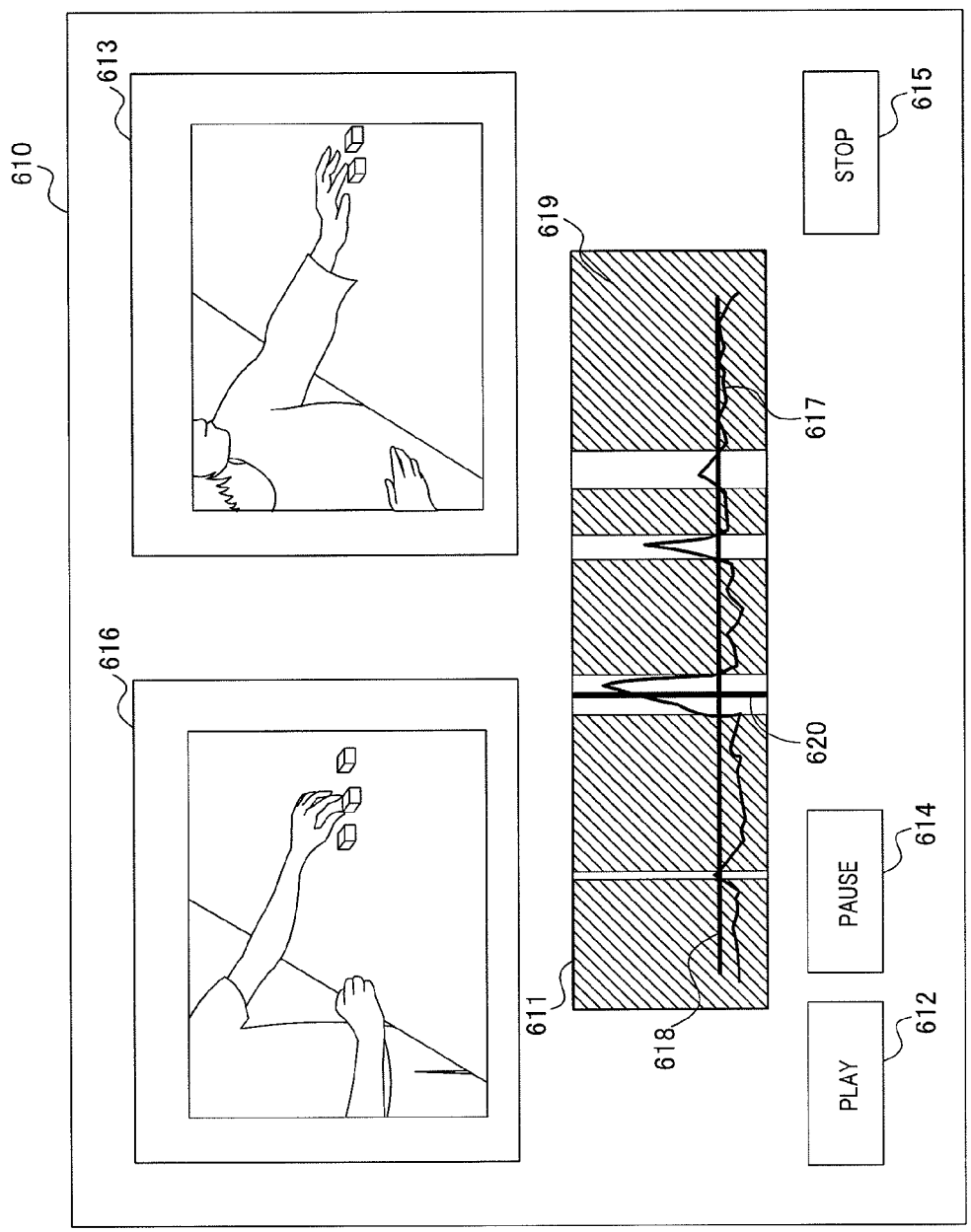
FIG. 11 is a drawing showing an example of a motion extraction result display screen in Embodiment 2.

FIG. 11 is a drawing showing an example of a motion extraction result display screen when standard level motion is selected, and corresponds to FIG. 5 of Embodiment 1. Parts in FIG. 11 identical to those in FIG. 5 are assigned the same reference codes as in FIG. 5, and descriptions thereof are omitted here.

In this case, as shown in FIG. 11, result display screen 610 displays markers 619 indicating extraction locations, which are standard level motion locations, in analysis result display area 611. By means of result display screen 610 of this kind, a user can rapidly identify a standard level motion location, and can rapidly check standard level motion by means of video. Also, standard level motion locations are identified according to a specified number, enabling a user to be presented with a quantity of analysis results desired by the user himself.

Thus, motion analysis apparatus 300b according to this embodiment can present not only deviating motion but also standard level motion in line with a user-specified presentation quantity. Also, a type of motion subject to presentation can be switched in accordance with a user specification. Therefore, a user can perform more in-depth analysis of motion subject to comparison.

Motion analysis apparatus 300b may extract both a deviating motion location and a standard level motion location, and display both extraction results simultaneously or by switching between the two. If motion analysis apparatus 300b displays a deviating motion location and a standard level motion location in analysis result display area 611 (see FIG. 5) simultaneously, it is desirable for markers 619 having different display modes, such as different colors, to be displayed. Provision may also be made for motion analysis apparatus 300b always to present only standard level motion locations.

This embodiment can be implemented in any combination with the variations described in Embodiment 1.

When standard level motion location extraction is performed using motion area, motion area S is a value expressed by equation 3 below. Then motion extraction degree adjustment section 324b selects pre-correction extraction locations, in order from the one with the smallest motion area, up to a number that matches target extraction number B, and performs confirmation for the selected extraction locations.

(Equation 3)

$$S=\int_{t1}^{t2}d(t)dt \quad [3]$$

Embodiment 3

Embodiment 3 of the present invention is a motion analysis apparatus in which a feature amount indicating a motion feature is a time weight in a CHLAC feature, and time weights are used in motion extraction.

Figure 12:
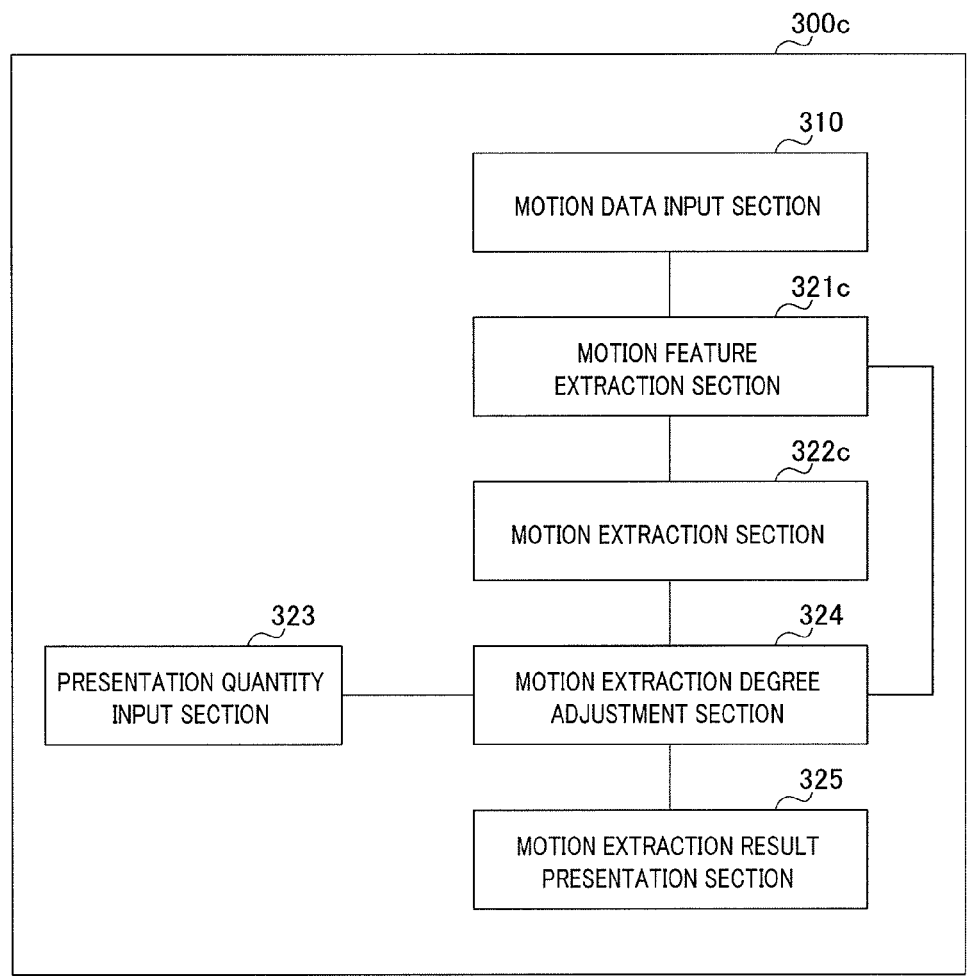
FIG. 12 is a block diagram showing an example of the configuration of a motion analysis apparatus according to Embodiment 3 of the present invention.

FIG. 12 is a block diagram showing an example of the configuration of a motion analysis apparatus according to this embodiment, and corresponds to FIG. 2 of Embodiment 1. Parts in FIG. 12 identical to those in FIG. 2 are assigned the same reference codes as in FIG. 2, and descriptions thereof are omitted here.

In FIG. 12, motion analysis apparatus 300c has motion feature extraction section 321c and motion extraction section 322c instead of, and performing different operations from, the motion feature extraction section and motion extraction section of Embodiment 1.

In a method of calculating video features that are feature amounts relating to overall motion data by integrating values resulting from applying time weights to CHLAC features, motion feature extraction section 321c learns a weight map that defines weights on a frame-by-frame basis (see Non-Patent Literature 2). Then motion feature extraction section 321c outputs the learned weight map to motion extraction section 322c.

Motion extraction section 322c performs deviating motion extraction based on per-frame weights included in the weight map, and outputs extraction results to motion extraction degree adjustment section 324.

Motion analysis apparatus 300c having this kind of configuration can perform deviating motion location extraction based on a weight map of video features in which time weights are applied to CHLAC features, and perform extraction location presentation in line with a user-specified presentation quantity.

Figure 13:
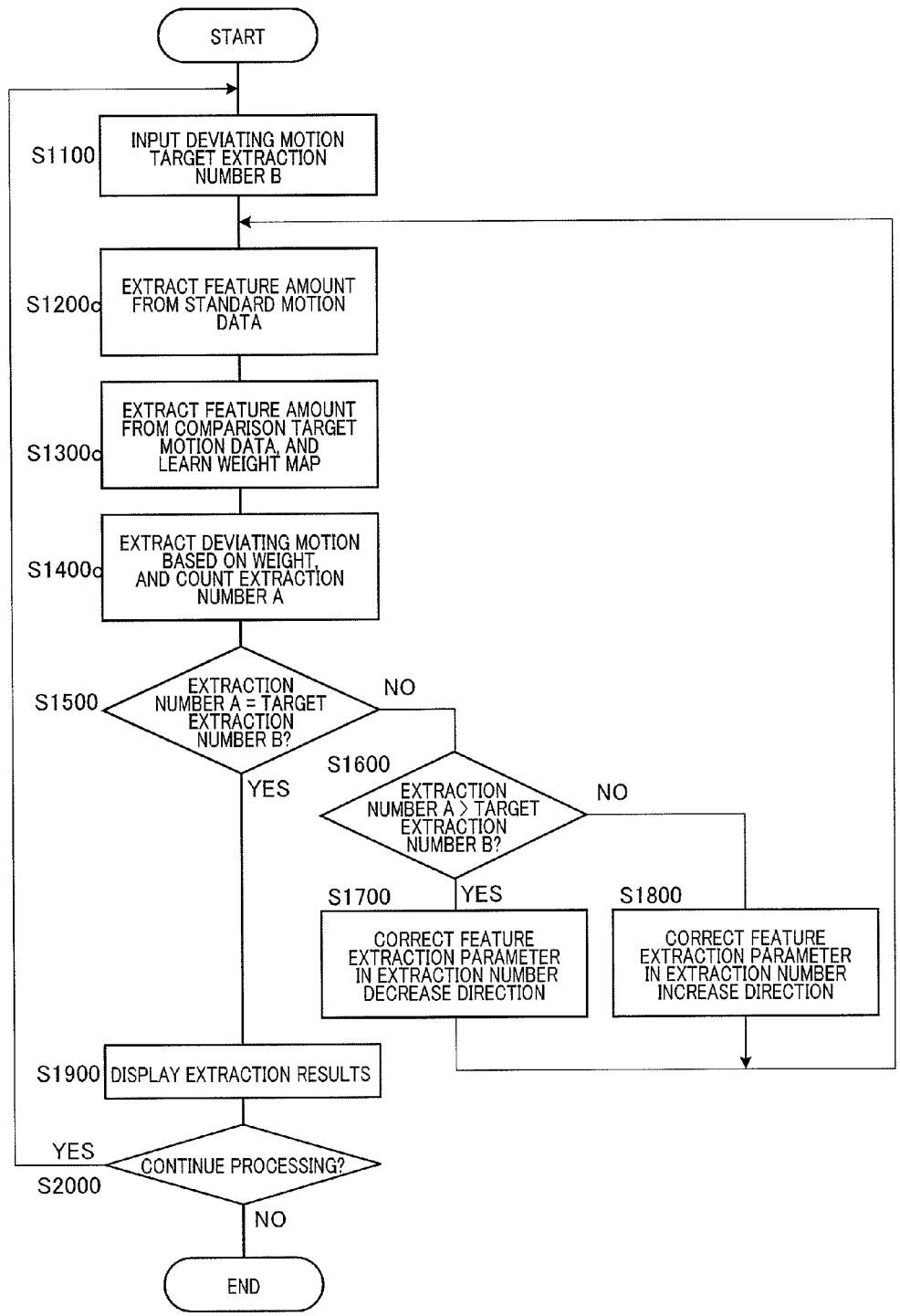
FIG. 13 is a flowchart showing an example of the operation of a motion analysis apparatus according to Embodiment 3.

FIG. 13 is a flowchart showing an example of the operation of motion analysis apparatus 300c, and corresponds to FIG. 3 of Embodiment 1. Parts in FIG. 13 identical to those in FIG. 3 are assigned the same step numbers as in FIG. 3, and descriptions thereof are omitted here.

When deviating motion target extraction number B is input (S1100), motion analysis apparatus 300c proceeds to step S1200c.

In step S1200c, motion feature extraction section 321c extracts CHLAC features on a frame-by-frame basis from standard motion data.

Then, in step S1300c, motion feature extraction section 321c extracts CHLAC features on a frame-by-frame basis from comparison target motion data and learns a weight map, and outputs the learned weight map to motion extraction section 322c.

Specifically, motion feature extraction section 321c learns a weight map of time weights for extracting video features (per-frame weights) from CHLAC features of a series of extracted standard motions and compared motions by means of a Fisher discriminant criterion, for example. Feature extraction parameters used in weight map learning include a number of basis functions associated with a Fourier series expansion introduced in order to absorb temporal expansion and contraction.

Motion feature extraction section 321c performs parameter adjustment in the same kind of way as in Embodiment 1. Therefore, weighting optimization is performed based on not only learning data but also a target extraction number. Optimized weights are characterized by becoming larger the greater the difference in motion of a frame, and have an effect of absorbing differences in the lengths of motion data while performing time series evaluation of motion. Details of video features and a weight map learning method are given in Patent Literature 2, for example, and therefore descriptions thereof are omitted here.

Then, in step S1400c, motion extraction section 322c extracts deviating motion based on weights, counts the number of extractions (extraction number) (hereinafter referred to using symbol "A" for convenience), and outputs this to motion extraction degree adjustment section 324.

More specifically, motion extraction section 322c first extracts a part that satisfies a condition defined by a motion extraction parameter within comparison target motion data as one deviating motion location. Then motion extraction section 322c counts extracted deviating motion locations as extraction number A.

A condition defined by a motion extraction parameter is, for example, that a state in which a weight is larger than a predetermined weight threshold value continues, and the duration thereof is greater than or equal to a predetermined minimum continuous time and less than or equal to a predetermined longest continuous time. A predetermined weight threshold value is, for example, 60% of the maximum weight value found from the entire comparison target motion data. A predetermined minimum continuous time is, for example, 0.3 second. A predetermined minimum continuous time is, for example, 25% of the length of comparison target motion data (average length in the case of a plurality).

Then, in the same way as in steps S1500 through S1800 in FIG. 3, motion extraction degree adjustment section 324c performs motion feature extraction section 321 feature extraction parameter adjustment according to the magnitude relationship between extraction number A and target extraction number B. However, in steps S1700c and S1800c, motion extraction degree adjustment section 324c may perform parameter adjustment differing in content from S1700 and S1800.

For example, when making a change in a direction in which extraction number A is decreased, motion extraction degree adjustment section 324c decreases the number of basis functions used in weight map learning by 1. In this case, motion extraction degree adjustment section 324c stores a parameter adjustment rule written as A>B:bf=−1, for example, in accordance with a predetermined description method. Here, parameter adjustment for decreasing extraction number A apart from basis functions has contents that perform parameter adjustment in the following way so that a larger feature is extracted. For example, parameter adjustment may have contents that simultaneously perform adjustments such as lowering resolution by 5%, doubling the frame rate, doubling the pixel interval from a reference point of a CHLAC mask pattern, reducing the principal component analysis cumulative contribution degree by 1%, and increasing the window size by 5.

Also, for example, when making a change in a direction in which extraction number A is increased, motion extraction degree adjustment section 324c increases the number of basis functions used in weight map learning by 1. In this case, motion extraction degree adjustment section 324c stores a parameter adjustment rule written as A<B:bf=+1, for example, in accordance with a predetermined description method. Here, parameter adjustment for increasing extraction number A apart from the number of basis functions has contents that perform parameter adjustment in the following way so that a smaller feature is extracted. For example, parameter adjustment may have contents that simultaneously perform adjustments such as increasing resolution by 5%, halving the frame rate, halving the pixel interval from a reference point of a CHLAC mask pattern, increasing the principal component analysis cumulative contribution degree by 1%, and decreasing the window size by 5.

By means of such operation, motion analysis apparatus 300c can extract a location with a large weight as a deviating motion location.

As described above, motion analysis apparatus 300c according to this embodiment can extract deviating motion based on weights learned in video feature extraction, and present extraction results in line with a user-specified presentation quantity. Weights learned in video feature extraction are larger for locations where the order in which motions are performed differs even though individual motions are correct. Therefore, using motion analysis apparatus 300c enables time series motion evaluation to be performed easily.

This embodiment can be implemented in any combination with the variations described in Embodiment 1, and Embodiment 2. Also, as with Embodiment 2, this embodiment may correct only motion extraction parameters, and not feature extraction parameters.

When deviating motion extraction is performed using motion area, the area of a motion is a time integral of parts that exceed a weight threshold value among extraction location weights. Also, when standard level motion location extraction is performed using motion area, the area of a motion is a time integral of extraction location weights.

If this embodiment is combined with Embodiment 2, for example, both feature extraction parameter correction and motion extraction parameter correction can be performed. In this case, a parameter adjustment rule for decreasing extraction number A has contents that perform feature extraction parameter adjustment in the following way in order to extract a larger feature. For example, a parameter adjustment rule has contents that increase resolution by 5%, double the frame rate, double the pixel interval from a reference point of a CHLAC mask pattern, reduce the principal component analysis cumulative contribution degree by 1%, and increase the window size by 5. Also, for motion extraction parameters, this parameter adjustment rule has contents that lower the weight threshold value by 5%, increase the minimum continuous time by 0.2 second, increase the longest continuous time by 1%, and decrease the number of basis functions by 1. In this case, a parameter adjustment rule is written as A>B:r=+5; fs=x2; ps=x2; acr=−1; ws=+5; w=−5; mint=+0.2; maxt=+ 0.1; bf=−1, for example, in accordance with a predetermined description method.

Embodiment 4

Embodiment 4 of the present invention is a motion analysis apparatus that performs presentation of analysis results at a level specified by a user from among a plurality of different presentation quantity levels.

Figure 14:
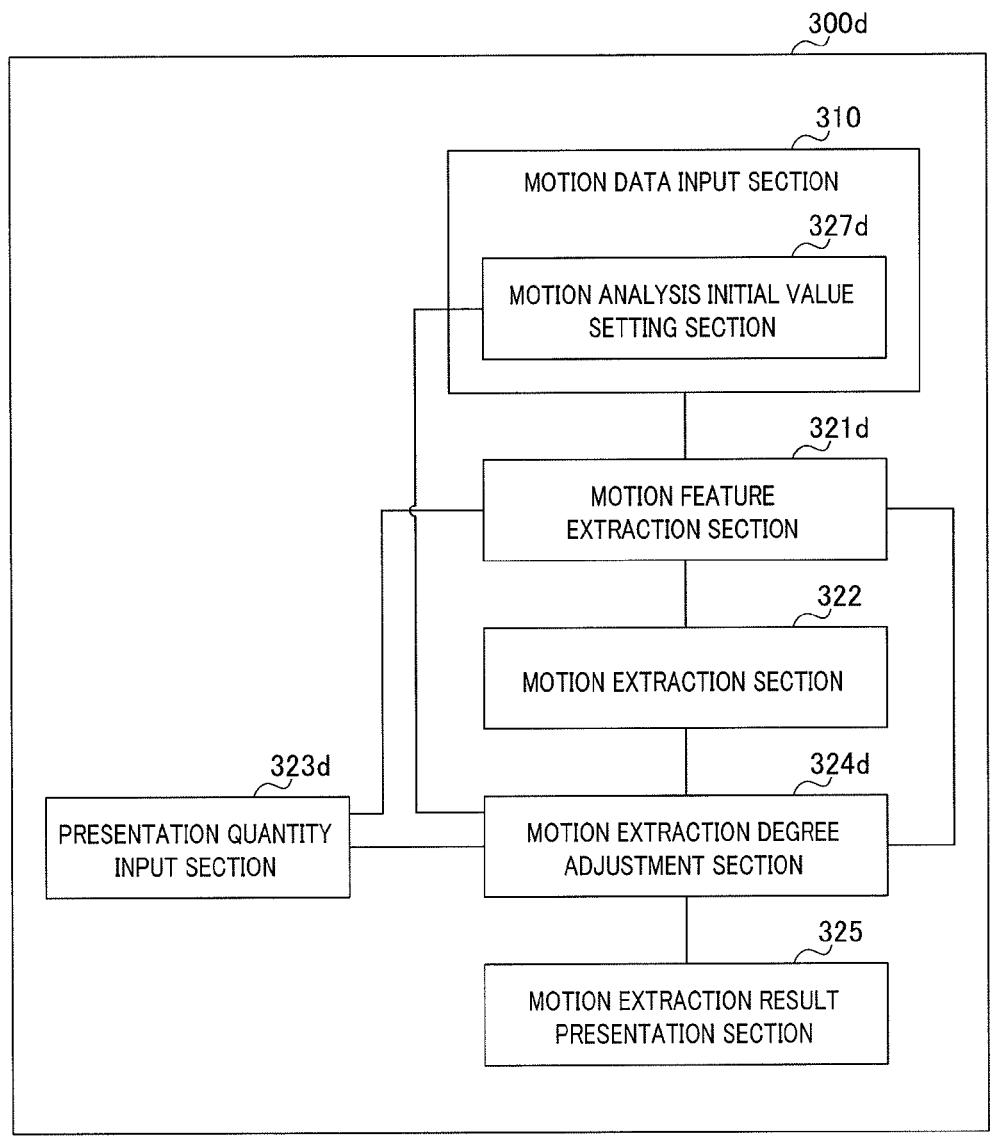
FIG. 14 is a block diagram showing an example of the configuration of a motion analysis apparatus according to Embodiment 4 of the present invention.

FIG. 14 is a block diagram showing an example of the configuration of a motion analysis apparatus according to this embodiment, and corresponds to FIG. 2 of Embodiment 1. Parts in FIG. 14 identical to those in FIG. 2 are assigned the same reference codes as in FIG. 2, and descriptions thereof are omitted here.

In FIG. 14, motion analysis apparatus 300d has motion feature extraction section 321d, presentation quantity input section 323d, and motion extraction degree adjustment section 324d, instead of, and performing different operations from, the motion feature extraction section, presentation quantity input section, and motion extraction degree adjustment section of Embodiment 1, and also has newly added motion analysis initial value setting section 327d. Motion analysis initial value setting section 327d is located in motion data input section 310, for example.

Motion analysis initial value setting section 327d sets an initial value of each parameter (hereinafter referred to as "parameter initial value") and target extraction number in correspondence to each of a predefined plurality of different presentation quantity levels (hereinafter referred to as "extraction levels"). Specifically, motion analysis initial value setting section 327d calculates and sets parameter initial values and a target extraction number, based on standard motion data, in correspondence to a predefined extraction level.

In this embodiment, a case is described in which a motion extraction parameter uses a fixed default value. Also, it is assumed that three levels are defined as extraction levels: a low level at which the presentation quantity is small, a medium level at which the presentation quantity is moderate, and a high level at which the presentation quantity is large.

Presentation quantity input section 323d receives an extraction level specification from a user via input apparatus 500, and outputs the specified extraction level (hereinafter referred to as "target extraction level") to motion feature extraction section 321d and motion extraction degree adjustment section 324d.

Motion feature extraction section 321d applies parameter initial values of the user-specified extraction level to feature extraction parameters, and performs feature amount extraction. Feature extraction parameter values are subsequently adjusted by motion extraction degree adjustment section 324d as appropriate.

When an extraction number does not match a target extraction number calculated by motion analysis initial value setting section 327d, motion extraction degree adjustment section 324d performs motion feature extraction section 321 feature extraction parameter adjustment so that the extraction matches the target extraction number.

Motion analysis apparatus 300d having this kind of configuration can present a user with deviating motion locations in accordance with a user-specified extraction level. Also, motion analysis apparatus 300d sets appropriate parameter initial values and target extraction numbers for each extraction level based on standard motion data, enabling the time required to present analysis results to be shortened.

The operation of motion analysis apparatus 300d will now be described.

Figure 15:
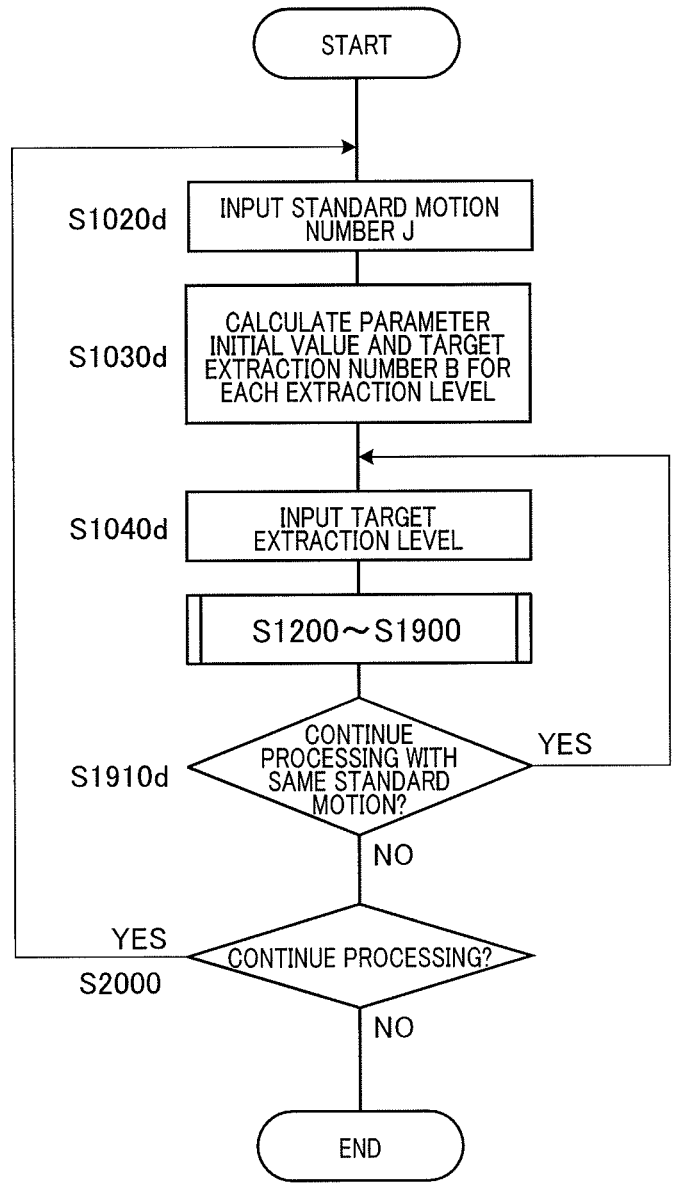
FIG. 15 is a flowchart showing an example of the operation of a motion analysis apparatus according to Embodiment 4.
Figure 16:
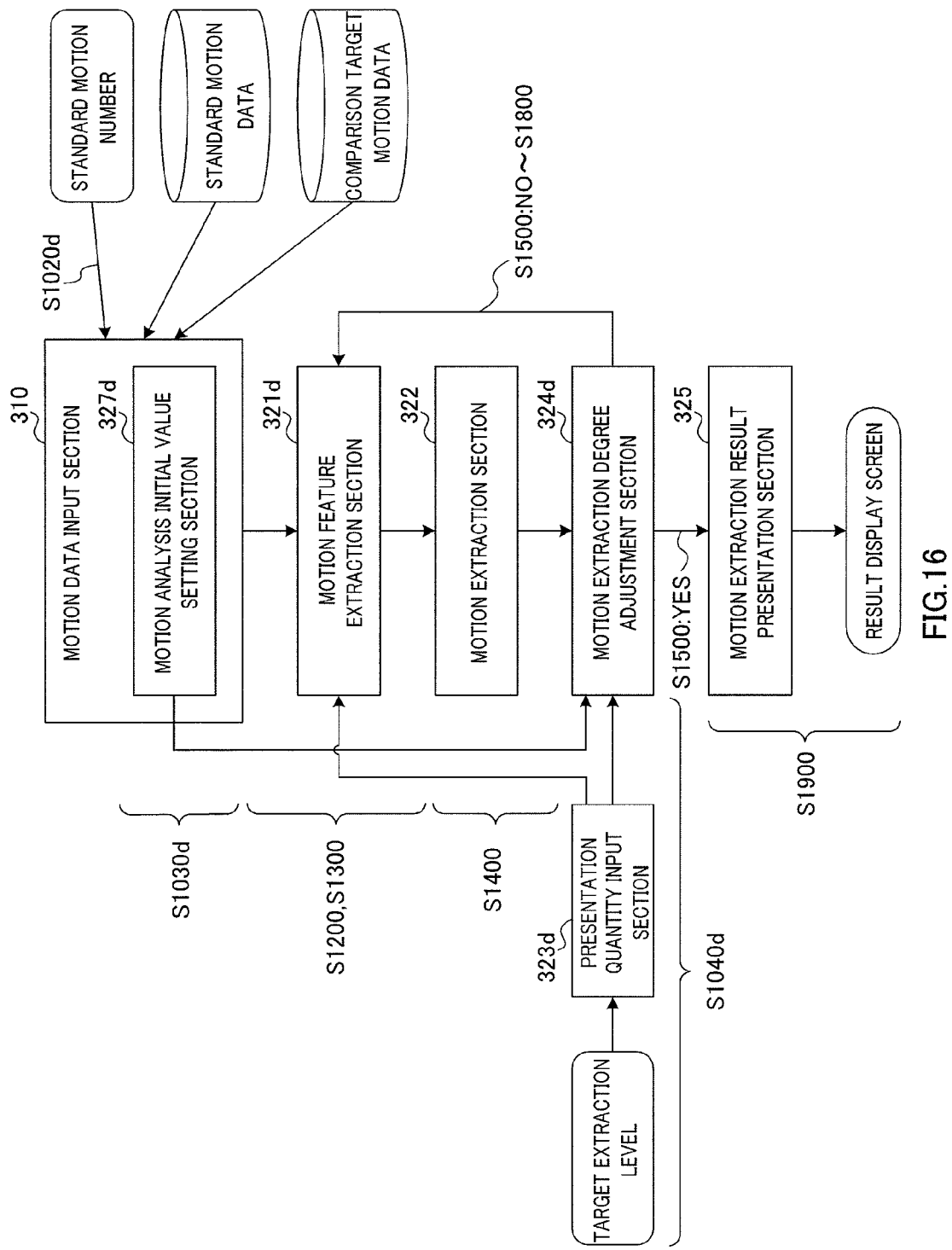
FIG. 16 is a drawing showing an example of the flow of information in a motion analysis apparatus according to Embodiment 4.

FIG. 15 is a flowchart showing an example of the operation of motion analysis apparatus 300d, and corresponds to FIG. 3 of Embodiment 1. Parts in FIG. 15 identical to those in FIG. 3 are assigned the same step numbers as in FIG. 3, and descriptions thereof are omitted here. FIG. 16 is a drawing showing an example of the flow of information in motion analysis apparatus 300d according to this embodiment.

First, in step S1020d, motion analysis initial value setting section 327d receives a number of standard motions (standard motion number) (hereinafter referred to using symbol "J" for convenience) from a user via input apparatus 500, and outputs standard motion number J to motion feature extraction section 321d. Here, a standard motion number is a number of standard motions included in standard motion data input by motion data input section 310—for example, the number of times a skilled worker extends a hand forward. A standard motion number is a guide to the quantity of motions that should be subject to analysis, and tends to increase, for example, when standard motion data is long or when motions are performed in a busy fashion.

Then, in step S1030d, motion analysis initial value setting section 327d calculates parameter initial values and target extraction number B of the selected extraction level, based on standard motion number J. Motion analysis initial value setting section 327d then sets the calculated parameter initial values as parameter initial values of the selected extraction level, and outputs these to motion feature extraction section 321d. Also, motion analysis initial value setting section 327d sets calculated target extraction number B as target extraction number B of the selected extraction level, and outputs this to motion extraction degree adjustment section 324d.

How parameter initial values and target extraction number B are calculated is stored in motion analysis initial value setting section 327d for each extraction level as an initial value calculation rule. An initial value calculation rule may be stored in advance, or may be acquired from outside via a network or the like as necessary.

An initial value calculation rule corresponding to the low level has contents that, for example, make the resolution 321×240, lower the frame rate by ⅓, set the pixel interval from a reference point of a CHLAC mask pattern to 3, set the principal component analysis cumulative contribution degree to 96%, make the window size a value obtained by multiplying the frame rate by the average motion length and dividing the result by standard motion number J, and make target extraction number B a value obtained by multiplying standard motion number J by 0.2.

An initial value calculation rule corresponding to the medium level has contents that, for example, make the resolution 640×480, keep the frame rate unchanged, set the pixel interval from a reference point of a CHLAC mask pattern to 3, set the principal component analysis cumulative contribution degree to 97%, make the window size a value obtained by multiplying the frame rate by the average motion length and dividing the result by standard motion number J, and make target extraction number B a value obtained by multiplying standard motion number J by 0.3.

An initial value calculation rule corresponding to the high level has contents that, for example, make the resolution 1280×960, keep the frame rate unchanged, set the pixel interval from a reference point of a CHLAC mask pattern to 2, set the principal component analysis cumulative contribution degree to 98%, make the window size a value obtained by multiplying the frame rate by the average motion length and dividing the result by standard motion number J, and make target extraction number B a value obtained by multiplying standard motion number J by 0.4.

The average motion length is, for example, a length of time obtained by dividing the average standard motion data playback time by standard motion number J.

A case is assumed here in which the above initial value calculation rules are applied, and in original standard motion data, standard motion number J is 10, the average playback time is 20 seconds, and the frame rate is 30 bps. At this time, the frame rate initial value is 20 bps at the low level and 30 bps at the medium level and high level, and the window size is 40 bps at the low level, 60 bps at the medium level, and 30 bps at the high level. Also, target extraction number B is 2 at the low level, 3 at the medium level, and 4 at the high level.

Here, if the average comparison target motion data playback time is longer than the average standard motion data playback time, the average speed of motion may well be slow because the skill level of a general worker is low. In this case, motion analysis initial value setting section 327d may use the average comparison target motion data playback time rather than the average standard motion data playback time in calculating a window size to be used in compared motion feature amount extraction. However, even if the average comparison target motion data playback time is longer than the average standard motion data playback time, there is also a possibility that a general worker is performing superfluous motions. Therefore, motion analysis initial value setting section 327d may also perform compared motion feature amount extraction using the same window size (a window size calculated based on the average standard motion data playback time).

Then, in step S1040d, motion extraction degree adjustment section 324d receive input of a target extraction level (hereinafter referred to using symbol "K" for convenience) via presentation quantity input section 323d. Specifically, for example, on receiving a directive from motion feature extraction section 321d or motion extraction degree adjustment section 324d, presentation quantity input section 323d displays a screen prompting selection of an extraction level on output apparatus 400. Then presentation quantity input section 323d returns an extraction level selected in response via input apparatus 500 to motion feature extraction section 321d and motion extraction degree adjustment section 324d as target extraction level K.

As a result, motion feature extraction section 321d and motion extraction degree adjustment section 324d employ parameter initial values and target extraction number B corresponding to target extraction level K. Then motion analysis apparatus 300d performs analytical processing using the employed parameter initial values and target extraction number B, presents analysis results (S1200 through S1900), and proceeds to step S1910d.

In step S1910d, motion analysis apparatus 300d determines whether or not termination of analytical processing with the same standard motion has been directed by means of a user operation or the like. If termination of analytical processing with the same standard motion has not been directed (S1910d: YES), motion analysis apparatus 300d returns to step S1040d. On the other hand, if termination of analytical processing with the same standard motion has been directed (S1910d: NO), motion analysis apparatus 300d proceeds to step S2000.

By means of such operation, motion analysis apparatus 300d can perform extraction result presentation in accordance with a user-specified extraction level—that is, using an appropriate presentation quantity according to the standard motion data playback time and standard motion number.

As described above, motion analysis apparatus 300d according to this embodiment sets parameter initial values and a target extraction number for each presentation level based on standard motion data, and performs analytical processing at a specified extraction level. By this means, as compared with a case in which only a single default value is used as a parameter initial value, motion analysis apparatus 300d can start processing from an appropriate value, and can not only achieve an increase in processing speed, but also improve the accuracy of analysis results. Also, motion analysis apparatus 300d can adjust the presentation quantity of each extraction level according to the standard motion data playback time, standard motion number, and so forth. Furthermore, since a user performs presentation quantity adjustment not by inputting a number or a numeric value of a proportion, but by performing an operation to select an abstract option called an extraction level, a user can perform an operation more intuitively.

Motion analysis apparatus 300d may also define two, or four or more, extraction levels.

Motion analysis apparatus 300d may also perform analytical processing for a plurality of or all, extraction levels in advance, and display a plurality of analysis results simultaneously or by switching among them.

Provision may also be made for motion analysis apparatus 300d to execute only processing corresponding to one extraction level by default. In this case, input of a target extraction level is not necessary. In this case, also, processing can be started from an appropriate value, and processing speed can be increased.

If, for example, this embodiment is combined with Embodiment 2, in particular, initial values can be set for both feature extraction parameters and motion extraction parameters. Examples of initial value calculation rules for motion extraction parameters, and examples of corresponding calculation results, are shown below.

An initial value calculation rule corresponding to the low level has contents that, for example, make the distance threshold value 65% of the maximum distance value, make the minimum continuous time a value obtained by multiplying the average motion length by 0.5, keep the maximum continuous time unchanged, and set the number of basis functions to 5.

An initial value calculation rule corresponding to the medium level has contents that, for example, make the distance threshold value 60% of the maximum distance value, make the minimum continuous time a value obtained by multiplying the average motion length by 0.5, keep the maximum continuous time unchanged, and set the number of basis functions to 5.

An initial value calculation rule corresponding to the high level has contents that, for example, make the distance threshold value 50% of the maximum distance value, make the minimum continuous time a value obtained by multiplying the average motion length by 0.25, make the maximum continuous time a value obtained by multiplying the average motion length by 0.75, and set the number of basis functions to 8.

A case is assumed here in which the above initial value calculation rules are applied, and in original standard motion data, standard motion number J is 10 and the average playback time is 20 seconds. At this time, the minimum continuous time initial value is 1 second at the low level and medium level, and 0.5 second at the high level, and the maximum continuous time initial value is 2 seconds at the low level and medium level, and 1.5 seconds at the high level.

In the above-described embodiments, motion data has been assumed to be moving image data, but this is not a limitation. Various kinds of data allowing extraction of a feature amount indicating a motion feature—such as distance data, temperature data, acceleration data, magnetism data, audio data, or the like, obtained from motion—can be employed as motion data. In these cases, it is necessary for a sensor apparatus to be an appropriate apparatus such as a distance sensor, temperature sensor, accelerometer, magnetism sensor, or sound collector.

A motion analysis apparatus may also perform presentation of analysis results by means of speech output, together with or instead of screen display. In this case, it is necessary for the output apparatus to be a loudspeaker or the like.

Embodiment 5

A motion evaluation method whereby motion evaluation is performed by means of principal component analysis or the like using time integration values of each position of a CHLAC feature amount is described in Patent Literature 2, for example. By using the method in Patent Literature 2, a user can be presented with a position for which a degree of difference between motion subject to comparison and standard motion is large in video, with a light processing load.

When, for example, correct motion is to play an E with the middle finger after playing a C with the index finger in a piano recital, a different tune will result if a C is played with the index finger after playing an E with the middle finger Therefore, when such motion is performed, it is desirable for the position of the middle finger and the position of the index finger to be presented in video.

Also, if, for example, screw-tightening motions in a product assembly process are performed in an order different from the correct order, it is desirable for the order in which those motions are performed to be presented in a comparison target motion video. This is because the screw-tightening order is a significant factor in product safety and work efficiency.

That is to say, if a series of motions are produced in which individual motions are correct but the order of the motions differs (hereinafter referred to as "differing-order motions"), it is desirable for the positions of those motions to be presented.

However, with the method described in Non-Patent Literature 2, a position of a differing-order motion cannot be extracted automatically even though a time of a differing-order motion can be extracted. This is because the method described in Non-Patent Literature 2 uses position-invariation values resulting from space integration of CHLAC feature amounts.

Also, with the method described in Patent Literature 2, since individual motions are correct, the occurrence of a differing-order motion cannot be detected. This is because the method described in Patent Literature 2 uses position-invariation values resulting from time integration of CHLAC feature amounts.

If the method described in Patent Literature 2 is applied with time finely divided, it is possible to extract a position of a differing-order motion for each divided time. However, such processing is complicated, and the apparatus processing load is heavy, particularly when the length of time differs for standard motion video data and comparison target motion video data. That is to say, with conventional technology there is a problem of not being able to easily extract a position of a differing-order motion.

Thus, as Embodiment 5 of the present invention, a motion analysis apparatus will be described that enables a position of a differing-order motion to be extracted easily.

Embodiment 5 of the present invention will now be described in detail with reference to the accompanying drawings.

Figure 17:
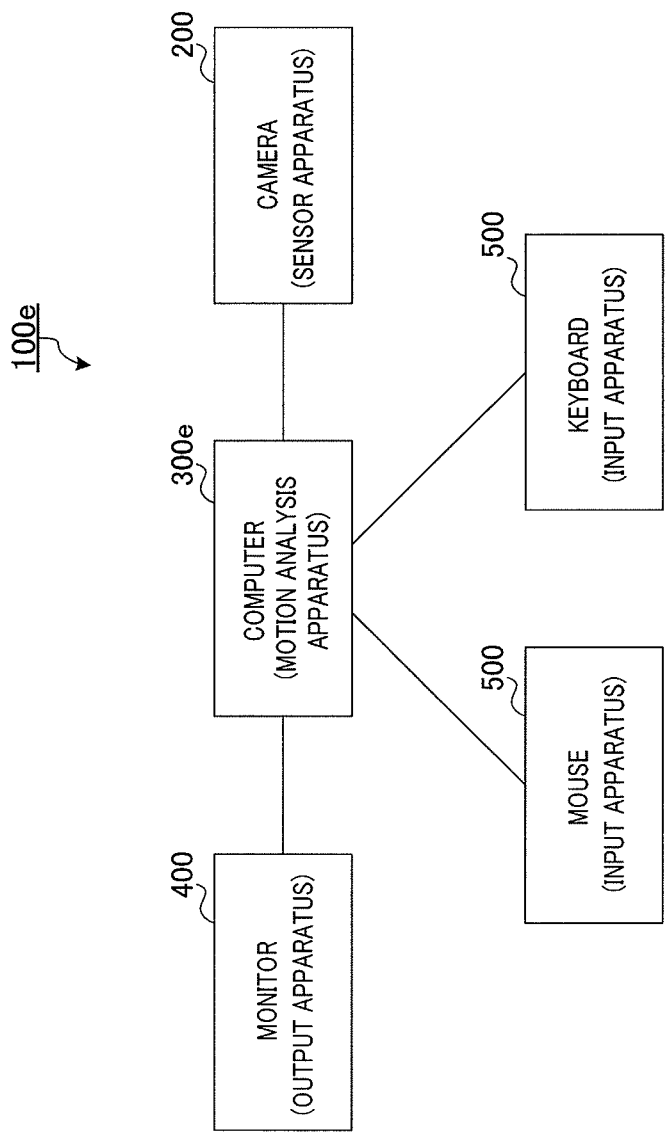
FIG. 17 is a system configuration diagram showing an example of the configuration of a motion analysis system that includes a motion analysis apparatus according to Embodiment 5 of the present invention.

FIG. 17 is a system configuration diagram showing an example of the configuration of a motion analysis system that includes a motion analysis apparatus according to Embodiment 5 of the present invention.

In this embodiment, as in Embodiment 1 through Embodiment 4, a case is described by way of example in which the present invention is applied to a motion analysis system for analyzing motions of each general worker in a factory in which skilled workers and general workers work. However, a motion analysis system in this embodiment extracts positions of motions that differ greatly between a general worker and a skilled worker.

In FIG. 17, motion analysis system 100e according to this embodiment has sensor apparatus 200, motion analysis apparatus 300e according to this embodiment, output apparatus 400, and input apparatuses 500.

Sensor apparatus 200 is an apparatus that detects human motion. Sensor apparatus 200 outputs data resulting from measurement of a worker's motion to motion analysis apparatus 300. Here, sensor apparatus 200 is assumed to be a camera that outputs image frame data of a captured image (moving image data) in real time, and to be capable of individually photographing workers working on a factory assembly line.

Below, as in Embodiment 1 through Embodiment 4, time series frame data obtained by photographing a series of standard motions by a skilled worker is referred to as "standard motion data," and time series frame data obtained by photographing a series of motions subject to comparison by a general worker is referred to as "comparison target motion data." Also, for convenience, standard motion data and comparison target motion data are referred to generically as "motion data." Furthermore, a consecutive plurality of frames constituting one target of analysis (analysis target) among frames constituting comparison target motion data are referred to as "target frames."

Motion analysis system 100e according to this embodiment performs motion analysis based on image feature amounts. In this embodiment, CHLAC features disclosed in Non-Patent Literature 2 are used as image feature amounts.

In this embodiment, an image feature amount obtained from standard motion data is referred to as a "standard feature amount," and data of a standard feature amount obtained from standard motion data is referred to as "standard feature amount data." Also, an image feature amount obtained from comparison target motion data is referred to as a "compared feature amount," and data of a compared feature amount obtained from comparison target motion data is referred to as "comparison-target feature amount data." For convenience, standard feature amount data and comparison-target feature amount data are referred to generically as "feature amount data."

Motion analysis apparatus 300e is an apparatus that performs analysis of motion subject to comparison by means of comparison with standard motion. Motion analysis apparatus 300 extracts a time weight, which is a value representing the size of a difference between motion subject to comparison and standard motion in images of each time (hereinafter referred to as "motion difference" for convenience) from comparison-target feature amount data and standard feature amount data. Motion analysis apparatus 300e then calculates weighted position feature amounts of comparison-target feature amount data and standard feature amount data using extracted time weights.

Here, a time weight indicates a degree of difference of image feature amounts of each time, calculated from a standard feature amount and compared feature amount of each time. If a time weight value at a certain time is large, this indicates that the difference between a standard feature amount and compared feature amount of that time is large, and if a time weight value at a certain time is small, this indicates that the difference between a standard feature amount and compared feature amount of that time is small.

Motion analysis apparatus 300e, for example, generates a standard subspace from standard feature amounts for each time, calculates a distance between a standard subspace and compared feature amount, and finds a time weight of each time. A standard subspace distance calculation method is known technology.

Assume, for example, that for each motion data, each motion data starting point is designated time t=0, and there are 300e frames' worth (10 seconds' worth) of 30-frames-per-second images. In this case, if the window size is made 1,298 per-window CHLAC feature amounts can be acquired (3 frames are necessary to calculate one CHLAC feature amount). Here, if standard motion data is 30 frames' worth, motion analysis apparatus 300e calculates 298 standard subspaces up to $9^{28}/_{30}$ seconds from $1/_{30}$ second that is a CHLAC feature amount frame time from standard motion data for each window. Then motion analysis apparatus 300e finds time weights based on compared feature amount distances with respect to the respective standard subspaces. For example, motion analysis apparatus 300e may make a value obtained by standardizing the 298 distances found here with an average of 0 and variance of 1 a time weight value of each time.

Here, an example has been described in which an image feature amount of each frame is applied directly to an image feature amount of each time, but provision may also be made for motion analysis apparatus 300e to absorb temporal expansion and contraction if the number of frames differs according to the motion data. Specifically, for example, motion analysis apparatus 300e converts a time of each motion data to a conversion time by expansion or contraction of the frame interval, based on the average time of standard motion data, and then estimates a necessary conversion time image feature amount, and perform is the above processing.

For example, image feature amount extraction is performed with frame rate F set to 20 frames per second (frame interval D=0.05 second). Also, standard motion data average value p is 10 seconds (200 frames), and standard motion data time q is 8 seconds (160 frames). In this case, the standard motion frame rate is converted to D'=0.0625 second (=p/Fq). Then, for example, the first frame conversion time is t=0, the second frame conversion time is t=0.0625, and the j'th frame conversion time is t=0.0625(j−1)=pj/Fq.

Here, motion analysis apparatus 300e may also calculate the image feature amount of j'th frame conversion time D(j−1) using an image feature amount of a frame of a conversion time nearest conversion time D(j−1). Motion analysis apparatus 300e may also calculate the image feature amount of j'th frame conversion time D(j−1) by means of estimation from image feature amounts of two adjacent frames.

For example, when finding an image feature amount of conversion time t=0.5, motion analysis apparatus 300e employs an image feature amount of an eighth frame of conversion time t=0.5. Also, motion analysis apparatus 300e may calculate an image feature amount of conversion time t=0.55 using the value of a ninth frame of conversion time t=0.5625. Motion analysis apparatus 300e may also perform the calculation by means of estimation from the eighth frame and ninth frame adjacent to time t=0.55.

When using an image feature amount of a frame whose conversion time is nearest, motion analysis apparatus 300e can reduce the processing load while absorbing a difference in motion data length. When calculating by means of estimation, motion analysis apparatus 300e can obtain a more accurate result.

Figure 18:
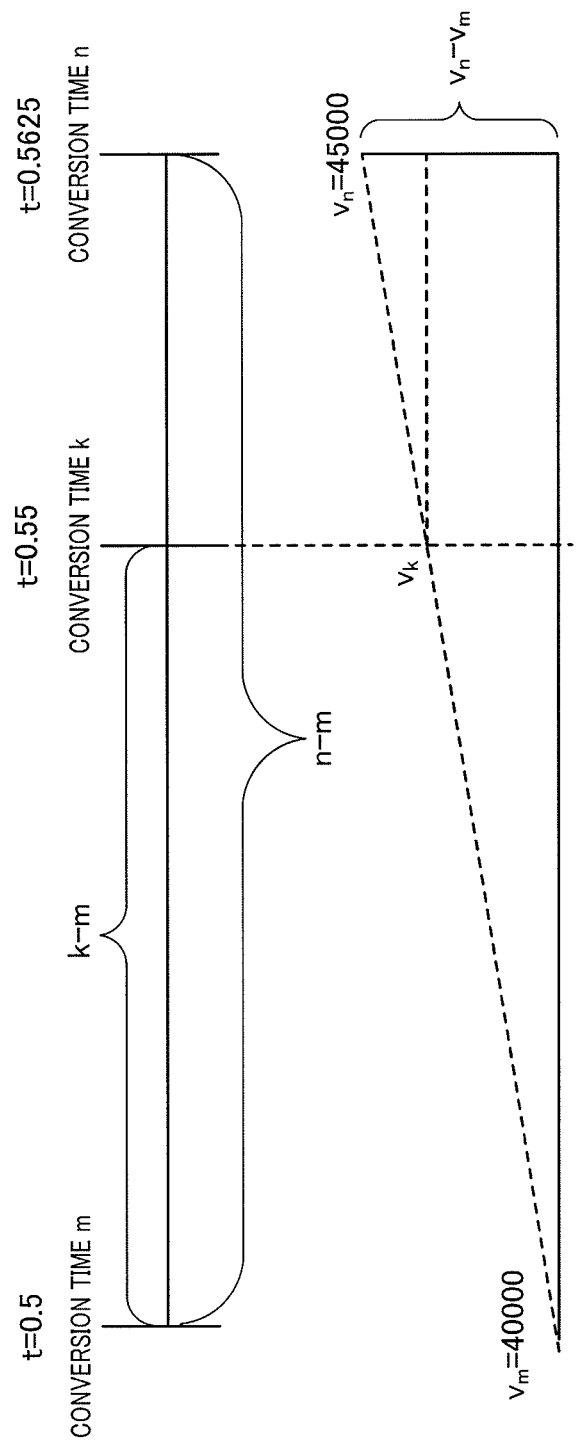
FIG. 18 is a drawing showing an example of an image feature amount calculation method in Embodiment 5.

FIG. 18 is a drawing showing an example of a method of calculating an image feature amount by means of estimation.

As shown in FIG. 18, for conversion time n, conversion time t=0.5625 (ninth frame), and for conversion time m, conversion time t=0.5 (eighth frame). It is assumed here that an image feature amount of conversion time k for which conversion time t=0.55 is estimated.

Here, for example, a conversion time n frame 251-dimension image feature amount is designated $V_n$, a conversion time m frame 251-dimension image feature amount is designated $V_m$, and a conversion time k frame 251-dimension image feature amount is designated $V_k$.

In this case, motion analysis apparatus 300e calculates image feature amount $V_k$ for each dimension of image feature amount $V_k$ from image feature amounts $V_n$ and $V_m$, using equation 4 below, for example.

(Equation 4)

$$V_k = V_m (V_n - V_m) \times (k-m)/(n-m) \qquad [4]$$

That is to say, motion analysis apparatus 300e estimates image feature amount $V_k$ by estimating a proportional relationship between time and a value difference shown in FIG. 18.

For example, assume that the first-dimension value of feature amount $V_n$ is 45000, and the first-dimension value of feature amount $V_m$ is 40000. In this case, motion analysis apparatus 300e calculates 40000+(45000−40000)×0.05/0.625=40400 as the first-dimension value of feature amount $V_k$. Motion analysis apparatus 300e also calculates the values of the remaining 250 dimensions in a similar way.

Here, a method has been described whereby values of 251 dimensions are calculated as image feature amounts, but motion analysis apparatus 300e may also perform estimation using a value after performing principal component analysis and reducing the order. In this way, the amount of calculation can be reduced. Also, here, estimation has been performed by means of a linear function using 2 points, but motion analysis apparatus 300e may also perform estimation using another function, such as a quadratic function or trigonometric function, using multiple points. By this means, a further improvement in estimation accuracy can be expected.

By means of such methods, motion analysis apparatus 300e calculates image feature amounts for all standard motion data and comparison target motion data, and all conversion times that create a standard subspace. Following this, motion analysis apparatus 300e generates a standard subspace for each time at which a time weight is calculated from image feature amounts calculated from standard motion data in the same way as when estimation is not performed. Then motion analysis apparatus 300e calculates distances between the respective standard subspaces and image feature amounts calculated from corresponding comparison target motion data, and uses these as time weights.

A weighted position feature amount is a per-position time integral of values obtained by applying time weights to feature amount data. A weighted position feature amount, in other words, is a time weight correspondent pixel correspondent CHLAC feature amount. That is to say, a weighted position feature amount is an extremely local feature amount obtained by applying a time weight to a product of gray values of pixels in the vicinity of a specific pixel, and adding this to an overall target frame. A pixel correspondent CHLAC feature amount to which a time weight has not been added is described in Non-Patent Literature 3, for example, and therefore a description thereof is omitted here.

Then motion analysis apparatus 300e acquires weighted position feature amount data obtained from time weights and comparison-target feature amount data, and weighted position feature amount data obtained from time weights and standard feature amount data. Next, motion analysis apparatus 300e extracts a position weight, which is a value representing the size of a difference between compared motion and standard motion, from acquired weighted position feature amount data and weighted position feature amount data. Below, comparison-target feature amount data weighted position feature amount data is referred to as "compared position feature amount data," and standard feature amount data weighted position feature amount data is referred to as "standard position feature amount data." Also, motion analysis apparatus 300e generates result display screen data indicating a position weight of each position as a degree of significance of each position in comparison target motion video, and outputs this to output apparatus 400. Below, standard position feature amount data and compared position feature amount data are referred to generically as "position feature amount data" for convenience.

Here, a position weight denotes a weight of a position on a video surface, optimized by means of Fisher discriminant criteria or the like so as to maximize dispersion of a matrix in which d-dimension feature amount vectors of each pixel are arrayed.

If image size differs according to the motion data, provision may be made for motion analysis apparatus 300e to absorb a difference in image size by increasing or decreasing the number of pixels. Specifically, for example, motion analysis apparatus 300e converts a position of each motion data to a conversion position by expansion or contraction of the image size based on the number of pixels of standard motion data, and then estimates a necessary conversion position image feature amount, and performs the above processing.

It is assumed that motion analysis apparatus 300e is a computer having a CPU, a storage medium such as RAM, and a video capture function for capturing moving image data. That is to say, motion analysis apparatus 300e operates by means of execution of a stored control program by the CPU.

Output apparatus 400 outputs a result display screen based on data input from motion analysis apparatus 300e. It is assumed here that output apparatus 400 is a monitor having a liquid crystal display. Output apparatus 400 may also be an apparatus installed at a remote location (such as a remote monitoring apparatus, mobile phone, or the like). In this case, output apparatus 400 is connected to motion analysis apparatus 300e via a network such as the Internet, for example.

Input apparatuses 500 are interfaces used by a user to operate motion analysis apparatus 300e. Here, input apparatuses 500 are a mouse as a pointing device and a keyboard, for example.

Motion analysis system 100e first calculates a time weight indicating the size of a difference in motion in the time domain. Next, motion analysis system 100e extracts a position weight indicating the size of a difference in motion on a video surface (in per-frame space). Then motion analysis system 100e generates a result display screen indicating calculated position weights as a degree of significance of each position in comparison target motion video, and presents this to the user. By this means, even with differing-order motion, motion analysis system 100e can exploit such CHLAC feature amount benefits as enabling the processing load to be reduced and additivity, and enables a corresponding motion position to be easily extracted and presented to the user.

The configuration of motion analysis apparatus 300e will now be described.

Figure 19:
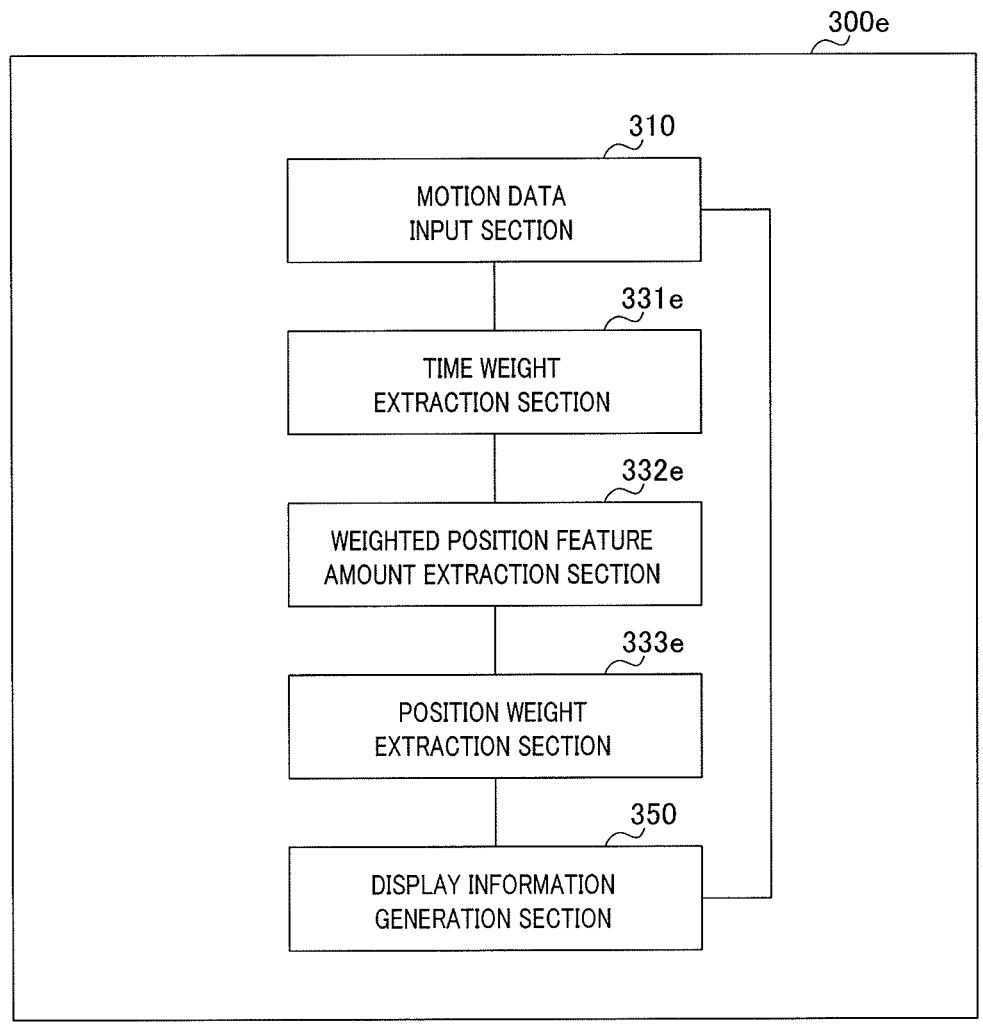
FIG. 19 is a block diagram showing an example of the configuration of a motion analysis apparatus according to Embodiment 5.

FIG. 19 is a block diagram showing an example of the configuration of motion analysis apparatus 300e.

In FIG. 19, motion analysis apparatus 300e has motion data input section 310, time weight extraction section 331e, weighted position feature amount extraction section 332e, position weight extraction section 333e, and display information generation section 350.

Motion data input section 310 acquires motion data from sensor apparatus 200 in response to a request from time weight extraction section 331e, and transfers this motion data to time weight extraction section 331e and display information generation section 350. Transfer of motion data may be performed in real time, or may be performed after motion data is stored. Motion data input section 310 categorizes motion data input from sensor apparatus 200 as either standard motion data or comparison target motion data at the time of input or after input on receiving an input apparatus 500 user operation. Motion data input section 310 may store input standard motion data for reuse.

Time weight extraction section 331e extracts an image feature amount from motion data, and generates feature amount data (standard feature amount data and comparison-target feature amount data). Then time weight extraction section 331e extracts time weights from generated standard feature amount data and comparison-target feature amount data, and generates a time weight map that defines a weight for each frame. A time weight map is data that describes a time weight of each frame of comparison target motion data. Then time weight extraction section 331e outputs the generated time weight map and feature amount data (standard feature amount data and comparison-target feature amount data) to weighted position feature amount extraction section 332e.

Weighted position feature amount extraction section 332e calculates weighted position feature amounts (standard position feature amount and compared position feature amount) from the time weight map and feature amount data (standard feature amount data and comparison-target feature amount data), and calculates position feature amount data. Then weighted position feature amount extraction section 332e outputs the calculated position feature amount data (standard position feature amount data and compared position feature amount data) to position weight extraction section 333e.

Position weight extraction section 333e extracts position weights from compared position feature amount data and standard position feature amount data, and generates a position weight map that defines a weight for each position. A position weight map is data that describes a position weight of each position of comparison target motion data video. Then position weight extraction section 333e outputs the generated position weight map to display information generation section 350.

Display information generation section 350 generates result display screen data indicating a position weight of each position as a degree of significance of each position in comparison target motion video from motion data. Then display information generation section 350 outputs the generated result display screen data to output apparatus 400. Details of the result display screen will be given later herein.

As described above, a weighted position feature amount is a per-position time integral of values obtained by applying time weights to feature amount data. A time weight has a larger value in a time in which a motion difference is greater. That is to say, a weighted position feature amount of each position increases if there is a time for which a motion difference is great, and, for example, if differing-order motion occurs, increases in correspondence to the position of that motion. Also, a position weight has a larger value in a position for which a weighted position feature amount is larger.

Therefore, when differing-order motion is present, motion analysis apparatus 300e having the above-described configuration can intensify a position weight of a position corresponding to that motion, and can extract and present the user with the differing-order motion position.

The operation of motion analysis apparatus 300e will now be described.

Figure 20:
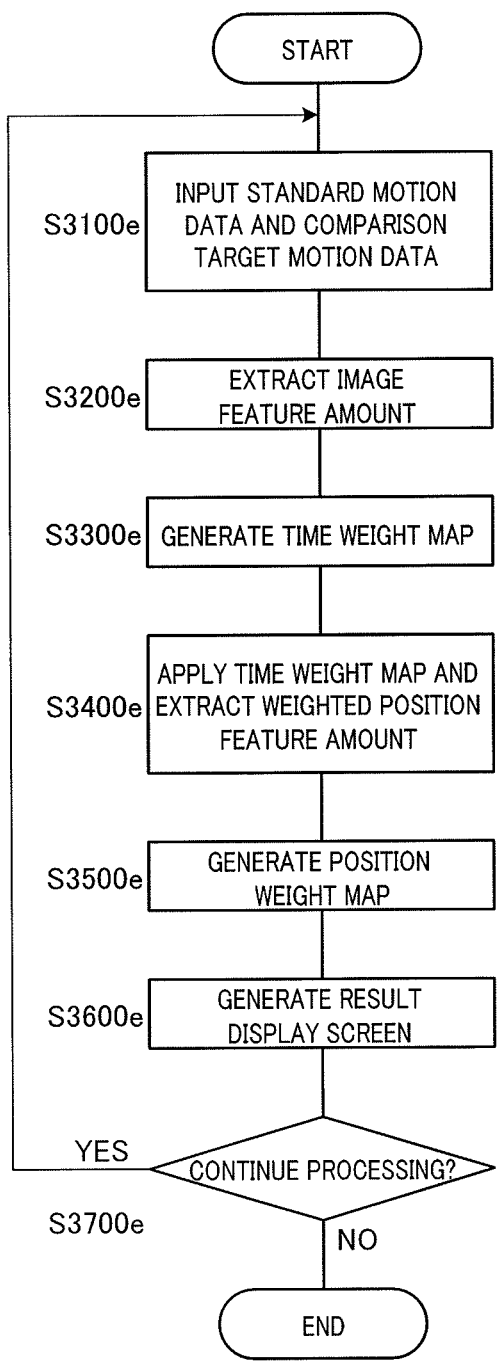
FIG. 20 is a flowchart showing an example of the operation of a motion analysis apparatus according to Embodiment 5.

FIG. 20 is a flowchart showing an example of the operation of motion analysis apparatus 300e.

First, a user, for example, has responsibility for work including an object motion switched around between a skilled worker and general worker on either side of a rest period, and operates motion analysis apparatus 300e so as to photograph the motions of each. In this way, there is no particular need for a time period for motion evaluation, and no burden is imposed on the workers, enabling data acquisition for motion analysis to be performed without affecting factory productivity.

As a result, motion data input section 310 has standard motion data and comparison target motion data as input in step S3100e. Then motion data input section 310 outputs the input standard motion data and comparison target motion data to time weight extraction section 331e and display information generation section 350 in response to a request from time weight extraction section 331e. If standard motion data input in the past has been stored, motion data input section 310 may output that standard motion data to time weight extraction section 331e.

Then, in step S3200e, time weight extraction section 331e extracts an image feature amount from motion data, and generates feature amount data (standard feature amount data and comparison-target feature amount data).

Specifically, for example, time weight extraction section 331e calculates per-position and per-time image feature amounts V using the N-order autocorrelation function shown in equation 5 below.

(Equation 5)

$$V_f^N(a_1, \ldots, a_N) = \int f(r)f(r+a) \ldots f(r+a_N)dr \quad [5]$$

Here, f is a time series image, and variable r and N variables $a_i$ (where i=1, ..., N) are three-dimensional vectors with image-internal two-dimensional coordinates and time as components. The time-direction integration range is decided according to what degree of time-direction correlation there is. That is to say, an integration range is a three-dimensional collection of pixels comprising N still images (local feature images), variable r is one pixel in an image (position pixel), and variable a is a displacement vector from r. Also, f(r) is a position r function value, expressing the brightness value of position r in a local feature image.

In the case of a CHLAC feature amount, displacement is three-dimensional, and the number of displacement vector combinations (displacement patterns) is one for the zero order, 13 for the first order, and 237 for the second order. Therefore, in the case of a binarized image, a CHLAC feature amount is expressed as a feature vector with a total of 251 dimensions.

In step S3300e, time weight extraction section 331e generates a time weight map from standard feature amount data and comparison-target feature amount data, and outputs this to weighted position feature amount extraction section 332e together with the standard feature amount data and comparison-target feature amount data.

In step S3400e, weighted position feature amount extraction section 332e applies the time weight map to standard feature amount data and calculates standard position feature amount data, and applies the time weight map to comparison-target feature amount data and calculates compared position feature amount data. Then weighted position feature amount extraction section 332e outputs the calculated standard position feature amount data and compared position feature amount data to position weight extraction section 333e.

Specifically, weighted position feature amount extraction section 332e uses equation 8 to calculate weighted position feature amount $V_{x,y}$ (tilde) from time weight $w_t$ expressed by equation 6 and real-number image feature amount $V_{t,x,y}$ expressed by equation 7, as shown below. Then weighted position feature amount extraction section 332e outputs data in which weighted position feature amounts $V_{x,y}$ (tilde) for the entire video surface are arrayed to position weight extraction section 333e as position feature amount data. Here, symbol t indicates a time (corresponding to a frame) in comparison target motion video, symbols x and y indicate a two-dimensional position in a per-frame space (video surface), symbol d indicates the number of dimensions of an image feature amount, and symbol τ indicates the time-direction integration range.

(Equation 6)

$$w_t \in R \quad [6]$$

(Equation 7)

$$V_{t,x,y} \in R^d \quad [7]$$

(Equation 8)

$$\tilde{V}_{x,y} = \sum_{t=0}^{\tau-1} w_t V_{t,x,y} \quad [8]$$

Then, in step S3500e, position weight extraction section 333e generates a position weight map from standard position feature amount data and compared position feature amount data, and outputs this to display information generation section 350.

Then, in step S3600e, display information generation section 350 generates a result display screen presenting extraction results from the position weight map, standard motion data, and comparison target motion data, and displays this result display screen on output apparatus 400.

Then, in step S3700e, motion analysis apparatus 300e determines whether or not termination of analytical processing has been directed by means of a user operation or the like. If termination of analytical processing has not been directed (S3700e: YES), motion analysis apparatus 300e returns to step S3100e, whereas if termination of analytical processing has been directed (S3700e: NO), motion analysis apparatus 300e terminates the series of operations.

By means of the above-described operation, motion analysis apparatus 300e calculates time weight $w_{x,y,t}$, and then calculates position weight $w_{x,y}$ from position feature amount data $V_{x,y}$ (tilde) obtained by applying that time weight $w_{x,y,t}$ to feature amount data $V_{t,x,y}$ (tilde). Then motion analysis apparatus 300e can present calculated position weight $w_{x,y}$ as a degree of significance of each position of video.

States of parameters and a result display screen will now be described, taking differing-order motion as an example.

Figure 21:
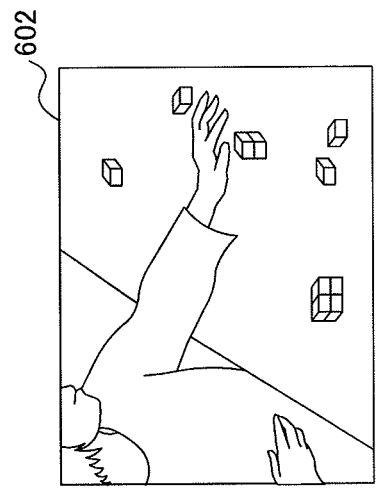
FIG. 21 is a drawing showing expected standard motion video and comparison target motion video in Embodiment 5.
Figure 21:
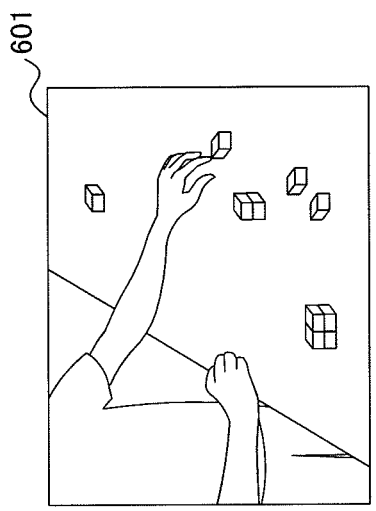

FIG. 21 is a drawing showing expected standard motion video and comparison target motion video.

As shown in FIG. 21, standard motion video 601 and comparison target motion video 602 are shot from the same angle. Therefore, when the same motions are performed in the same order, the direction, magnitude, and order of movements in the videos are virtually identical due to motion analysis apparatus 300e making the shooting angle and number of captured pixels the same.

FIG. 22 is a drawing showing examples of expected standard motion and compared motion contents, and a time weight map in that case.

Figure 22A:
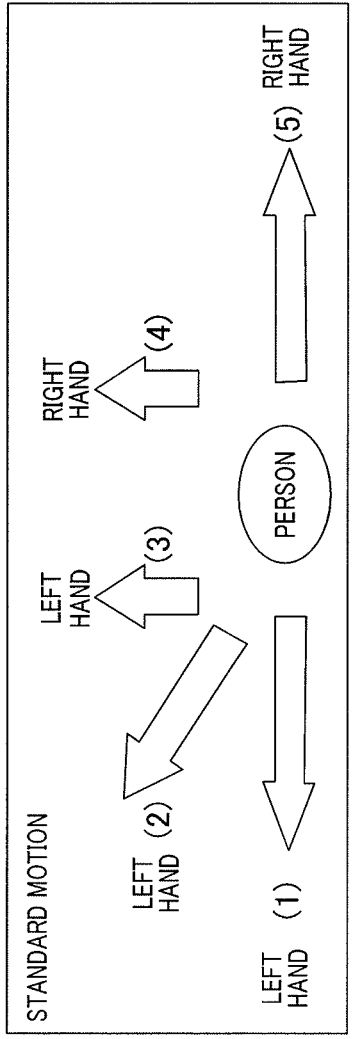
FIG. 22 is a drawing showing examples of expected standard motion and compared motion contents, and a time weight map in that case, in Embodiment 5.

The example of standard motion includes the following motions, as shown in FIG. 22A.

(1) A first component is taken from the left side and placed directly in front;

(2) the left hand is extended diagonally to the left, and a second component is taken and is attached to the first component;

(3) the left hand is extended forward, and a third component is taken and is attached to the first component;

(4) the right hand is extended forward, and a fourth component is taken and is attached to the first component; and (5) the first component, to which the second through fourth components have been attached, is placed on the right.

Figure 22B:
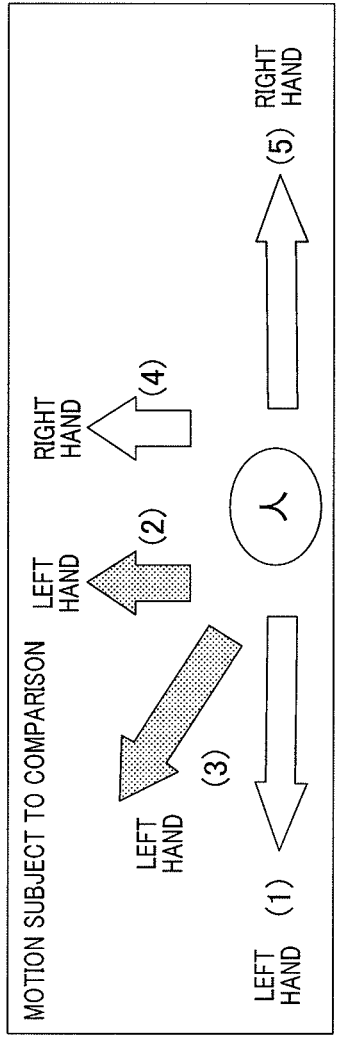

On the other hand, the example of motion subject to comparison includes the following motions, as shown in FIG. 22B.

(1) A first component is taken from the left side and placed directly in front;

(2) the left hand is extended forward, and a third component is taken and is attached to the first component;

(3) the left hand is extended diagonally to the left, and a second component is taken and is attached to the first component;

(4) the right hand is extended forward, and a fourth component is taken and is attached to the first component; and (5) the first component, to which the second through fourth components have been attached, is placed on the right. That is to say, the motion subject to comparison includes differing-order motions, with the order of the second motion and the third motion differing from the standard motion.

Figure 22C:
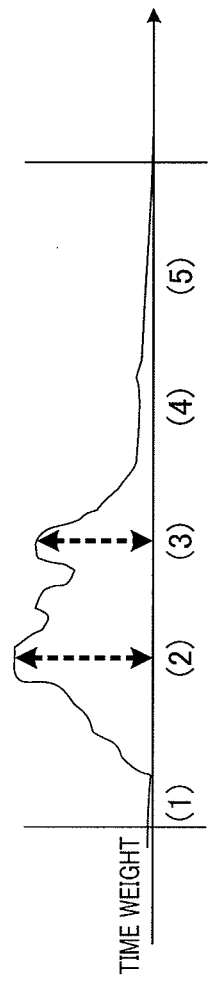

In this case, a difference between standard feature amount data and comparison-target feature amount data is large at the locations of motions (2) and (3). Therefore, time weights calculated by motion analysis apparatus 300e are large at the locations of motions (2) and (3), as shown in FIG. 22C.

FIG. 23 is a drawing showing an example of time weights at each of the times in the motions shown in FIG. 22. Here, the density of hatching indicates the size of a time weight, and the suffix of each symbol indicates corresponding time t. Times t=1 through 5 correspond respectively to motions (1) through (5) shown in FIG. 22. That is to say, differing-order motions occur at times t=2 and 3.

Figure 23A:
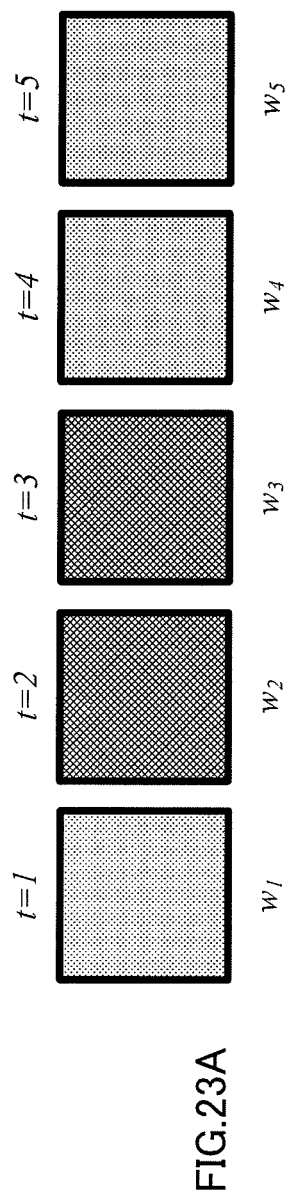
FIG. 23 is a drawing showing an example of time weights at various times in Embodiment 5.

As shown in FIG. 23A, of time weights $w_1$ through $w_5$, the values of time weights $w_2$ and $w_3$ corresponding to differing-order motions are larger. Image feature amounts $V_1$ through $V_5$ are large values at positions at which motions (1) through (5) are performed. That is to say, for a time t=1 frame, for example, image feature amount $V_{t,s,y}$ of a position at which motion (1) is performed (the range of movement of the left hand from the left side to directly in front) is a large value, and image feature amounts $V_{t,s,y}$ of other positions are small values.

Figure 23B:
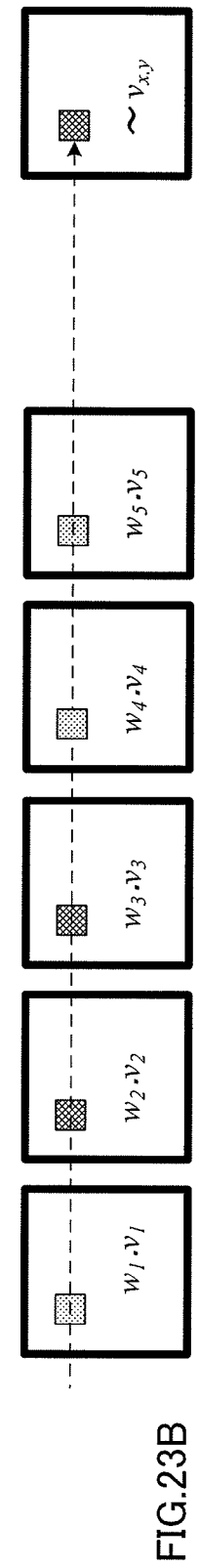

Therefore, as shown in FIG. 23B, when a differing-order motion with large movement is present, weighted position feature amount $V_{x,y}$ (tilde) of that motion position is a large value due to being calculated by integrating values obtained by multiplying image feature amount $V_{t,s,y}$ by time weight $w_t$ for each time. Also, when a differing-order motion with large movement is present, position weight $w_{x,y}$ of a position at which that motion is performed is also a large value. On the other hand, weighted position feature amount $V_{x,y}$ (tilde) and position weight $w_{x,y}$ of other positions are small values due to the fact that image feature amount $V_{x,y}$ is small, irrespective of time weight $w_t$.

If the integration range ($\tau$) when weighted position feature amount $V_{x,y}$ (tilde) is calculated is short compared with the overall length of a target frame, the size of weighted position feature amount $V_{x,y}$ (tilde) differs according to the position of the integration range.

Figure 24:
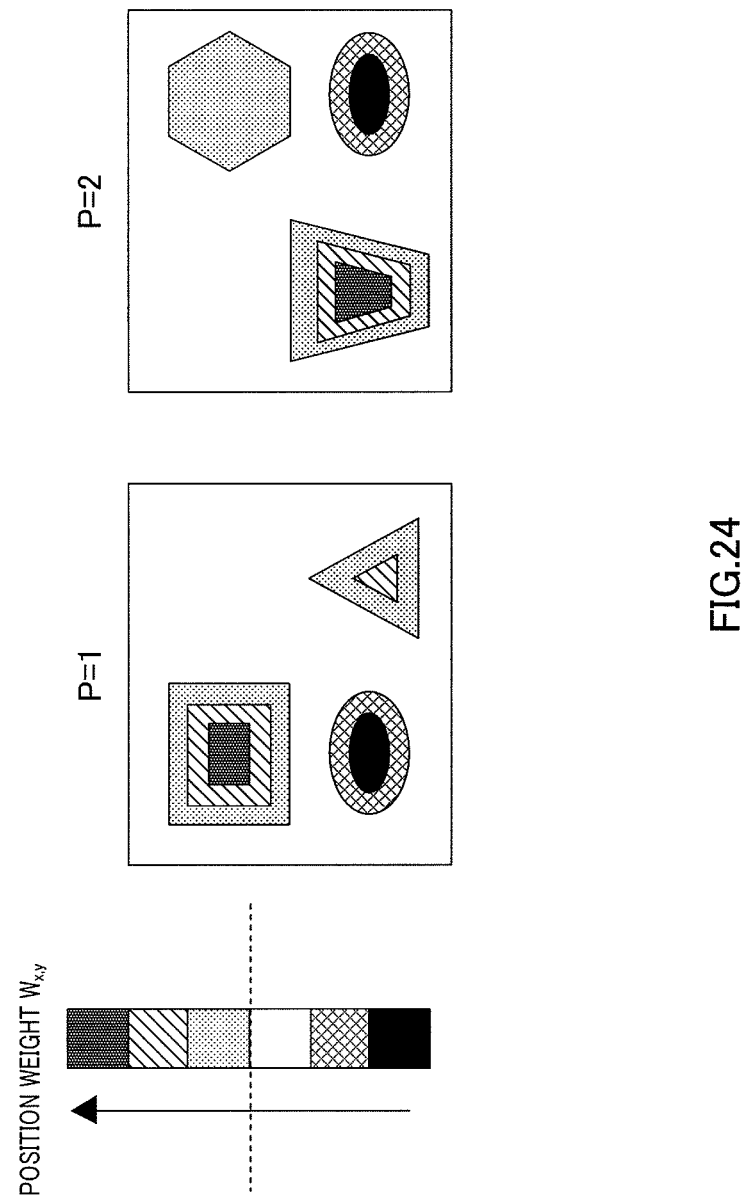
FIG. 24 is a drawing showing examples of position weight distribution (position weight maps) in Embodiment 5.

FIG. 24 is a drawing showing examples of position weight $w_{x,y}$ distribution (position weight maps) in each interval. Here, the density of hatching indicates the size of position weight $w_{x,y}$.

The position at which motion is performed differs for time t=2 and time t=3 due to the fact that the direction in which the left hand is extended differs. Therefore, as shown in FIG. 24, position weight map contents differ for interval P=1 centered on time t=2 and interval P=2 centered on time t=3.

When presenting only information of one interval, for example, display information generation section 350 generates a result display screen that highlights a position at which the value of position weight $w_{x,y}$ is large. For example, display information generation section 350 sets a coherent area that includes a position at which the value of position weight $w_{x,y}$ is large (hereinafter referred to as "significant area"). Then, the higher the average value of position weight $w_{x,y}$ of a significant area, the darker display information generation section 350 makes the color, or the greater the thickness, of a line enclosing the significant area. Also, for example, display information generation section 350 generates a result display screen in which only significant area video is displayed sharply, and video of other parts is displayed in a blurry fashion.

Figure 25:
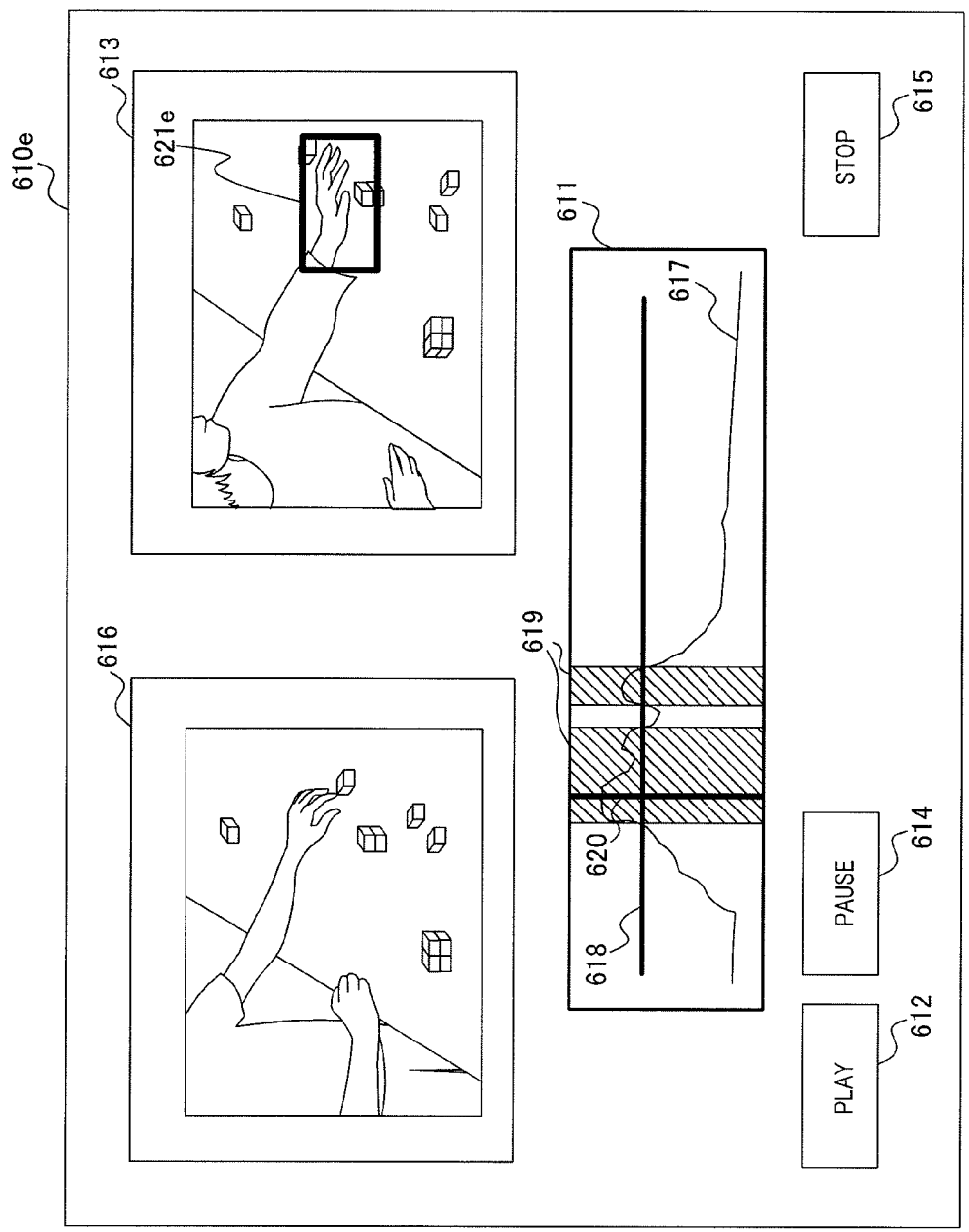
FIG. 25 is a drawing showing an example of a result display screen in Embodiment 5.

FIG. 25 is a drawing showing an example of a result display screen.

As shown in FIG. 25, result display screen 610e has analysis result display area 611, play button 612, compared motion display area 613, pause button 614, stop button 615, and standard motion display area 616.

In analysis result display area 611, result display screen 610e displays time weight time series data (weight map) 617, threshold value display line 618 indicating a predetermined threshold value, and markers 619 indicating intervals in which a time weight exceeds threshold value display line 618.

Also, result display screen 610e displays playback location display line 620 that can be moved horizontally via input apparatuses 500.

When play button 612 is clicked, result display screen 610e plays back a captured image of motion subject to comparison in compared motion display area 613, and moves playback location display line 620 in accordance with the playback. When pause button 614 is clicked during image playback, result display screen 610e temporarily stops image playback. Standard motion display area 616 also plays back a standard motion captured image in synchronization with playback of the compared motion captured image in compared motion display area 613.

Result display screen 610e also displays frame 621e indicating a significant area, superimposed on the compared motion captured image. Frame 621e is, for example, darker in color in an interval in which a time weight exceeds threshold value display line 618, and lighter in color in other display intervals.

By means of result display screen 610e of this kind, a user can move playback location display line 620 to a marker 619 area and click play button 612. Then, by means of this operation, a user can rapidly identify and check video of a location where a difference in motion is large due to differing-order motion or the like. Also, since frame 621e indicating a significant area is displayed, a user can rapidly identify and check a location where a difference in motion is large and a degree of significance as an analysis target is high. That is to say, a user can easily grasp where he should focus his attention within an image. Moreover, since the density of frame 621e corresponds to a time weight, a user can check a difference in motion in the video while also checking the degree of significance.

The shape and size of frame 621e may be fixed, or frame 621e may be of a shape and size in line with the shape of a significant area. Also, result display screen 610e may display a standard motion data image and a comparison target motion data image simultaneously or by switching between the two. Result display screen 610e may also output other motion-related data, such as the motion data capture date and time, comparison object acceleration data, speech, or the like, for example.

Figure 26:
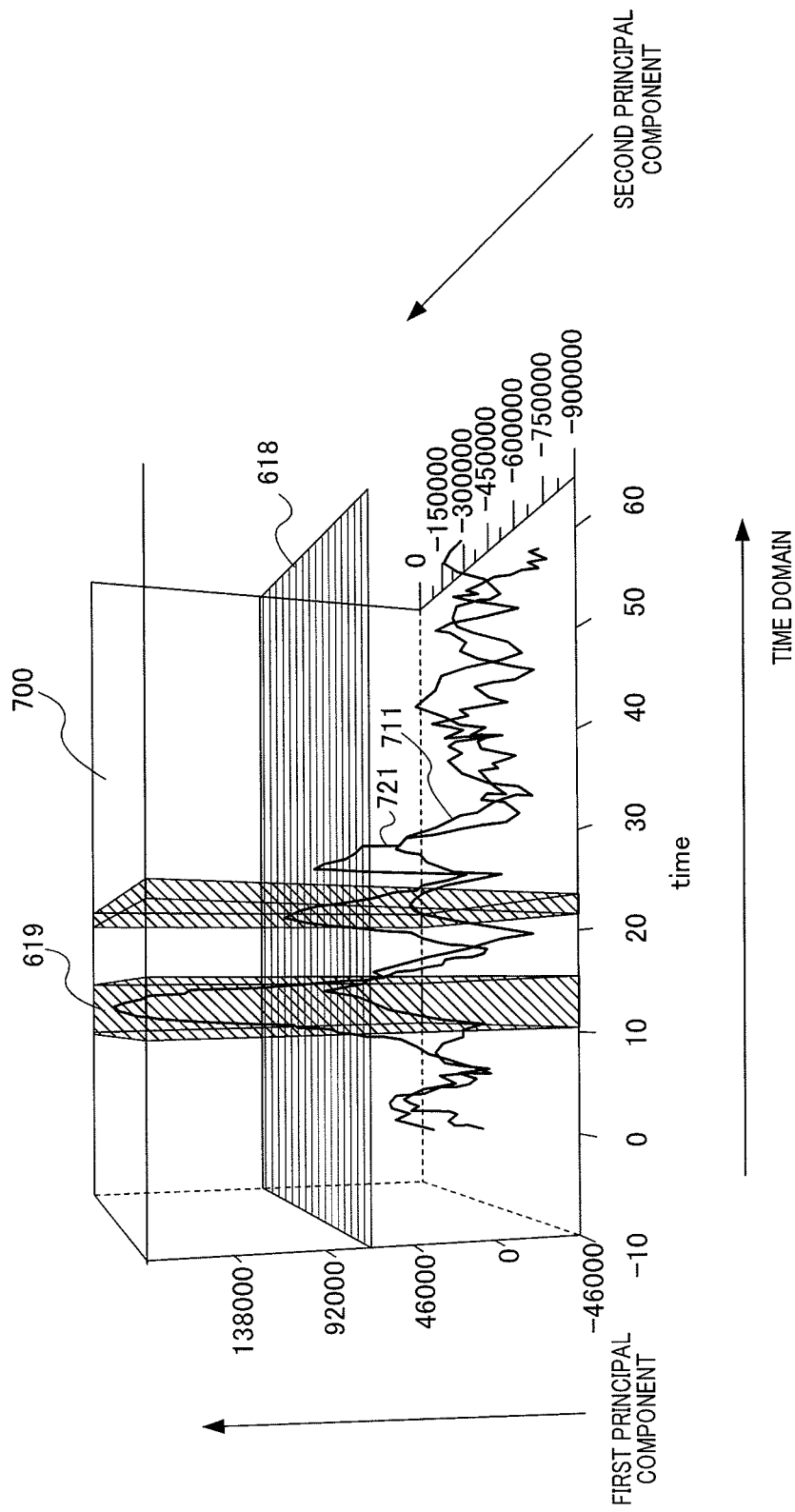
FIG. 26 is a drawing showing an example of a three-dimensional graph included in a result display screen in Embodiment 5.

Also, analysis result display area 611 of result display screen 610e may also output standard feature amount and compared feature amount principal component scores. For example, as shown in FIG. 26, analysis result display area 611 of result display screen 610e may include three-dimensional graph 700 with image feature amount principal component scores, and with time on the horizontal axis. In three-dimensional graph 700, for example, standard motion feature amounts are linked by line 711, and compared feature amounts by line 721. By performing three-dimensional display in this way, result display screen 610e can display not only time weights, but also changes in image feature amounts in line with motion, in an easily understandable fashion.

As described above, motion analysis apparatus 300e according to this embodiment calculates time weights, and then calculates position weights indicating the degree of significance of each video position from position feature amount data obtained by applying the time weights to feature amount data. By this means, motion analysis apparatus 300e according to this embodiment can easily extract differing-order motions. That is to say, motion analysis apparatus 300e can exploit the benefits of CHLAC features, and extract differing-order motions, without finely dividing time.

Also, since motion analysis apparatus 300e displays a position for which the video position weight is large, a position for which a difference in motion is large can be presented to a user. Furthermore, since motion analysis apparatus 300e displays a time for which the video time weight is large, a time location where a difference in motion is large can be presented to a user. That is to say, motion analysis apparatus 300e enables a user to be presented with motion that should be checked in video.

In this embodiment, a time weight map applied to standard feature amount data and a time weight map applied to comparison-target feature amount data are the same, but the present invention is not limited to this. For example, a time weight map applied to standard feature amount data may also be a fixed distribution time weight map, or a time weight map with fixed values in all frames. The first time weight value in a target frame, the average time weight in a target frame, or the lowest time weight value in a target frame, for example, can be employed as a fixed value. Also, an upper limit may be set for a time weight. The average time weight in a target frame, for example, can be employed as an upper limit. By this means, a difference in weighted position feature amounts between standard motion and motion subject to comparison may become clearer.

A motion analysis apparatus may also first extract time intervals subject to presentation based on time weights, and calculate position weights for each extracted time interval. By this means, it is possible to calculate more appropriate position weights.

In this embodiment, temporal expansion and contraction is absorbed for time weights, based on a standard image, but a Fourier series expansion may also be introduced. With time weights for which a Fourier series is introduced, temporal expansion and contraction is absorbed for differences in feature amount data by the introduction of a Fourier series expansion. Time weights for which a Fourier series is introduced denote frequency weights in the time domain, optimized by means of Fisher discriminant criteria or the like, so as to maximize dispersion of a matrix in which d-dimension feature amount vectors of each pixel are arrayed. Optimized time weights are characterized by becoming larger the greater the difference in motion of a frame, and have an effect of absorbing differences in the lengths of motion data while performing time series evaluation of motion. Details of time weights are given in Non-Patent Literature 2, for example, and therefore a description thereof is omitted here.

In this embodiment, motion analysis apparatus 300e calculates a distance between a standard subspace of each time calculated from standard motion data, and an image feature amount calculated from corresponding comparison target motion data, and uses this as a time weight. Motion analysis apparatus 300e may also use a value after normalization or suchlike processing has been performed based on a calculated distance as a time weight. Furthermore, for a difference in time feature amount data, motion analysis apparatus 300e may also use a value optimized by means of Fisher discriminant criteria or the like so as to maximize dispersion of a matrix in which d-dimension feature amount vectors of each time are arrayed.

If lengths of time are the same for standard motion video and comparison target motion video, or if expansion or contraction is performed to the same length of time if the lengths of time are not the same, introduction need not necessarily be performed as described in this embodiment. Also, in such cases, a time weight may be simply a difference in image feature amounts of each frame, and a position weight may be simply a difference in weighted position feature amounts of each position.

In this embodiment, an image feature amount has been described as a CHLAC feature amount, but this is not a limitation. For example, high-order local feature amounts using a weighting orientation histogram or the like can be used as image feature amounts. If such feature amounts are used, a motion analysis apparatus can find a local orientation histogram of an image from a concentration gradient image, and use the found orientation histogram as a feature vector. A position of a differing-order motion can also be easily extracted when such image feature amounts are used.

In this embodiment, data acquired from the same sensor is used when performing time weight calculation and position weight calculation, but data acquired from different sensors may also be used. For example, in this embodiment, data acquired from camera sensors that are the same kind of sensors may also be used. In this case, standard data used in time weight calculation may be data acquired from somewhat diagonally ahead enabling not only horizontal but also vertical movement to be easily captured, and data used in position weight calculation may be data acquired from directly above. In this way, more appropriate time weights and position weights can be extracted for a particular purpose.

Provision may also be made, for example, for data acquired from an accelerometer to be used in time weight calculation, and for data captured by a camera sensor to be used in position weight calculation. In this embodiment, for example, position weights are calculated using data acquired from a camera sensor, and time weights are calculated using data acquired from an accelerometer. In this case, a shortcoming of a camera sensor can be compensated for even if there is a blind spot or error in a camera sensor's horizontal direction or vertical direction. When data acquired from an accelerometer is used, also, after local feature amounts are calculated, time weights are calculated in the same way as feature amounts calculated from an image. For example, if accelerometers are attached to both wrists of a worker, feature amounts of 21 dimensions, combining 6 dimensions of both arms and 15 dimensions of correlation between acceleration data, can be calculated as accelerometer local feature amounts. Also, attaching an accelerometer to a tool used in motion to be evaluated can also be considered. This makes it possible to perform motion evaluation that exploits the characteristics of different sensors without attaching accelerometers to a worker.

Embodiment 6

In a product assembly process, for example, the right hand and left hand may perform different tasks. A specific example is a task in which a tool such as an electric screwdriver is held in the right hand, a component such as a screw is taken and held in the left hand, and a screwing operation is performed. If the left hand performs unnecessary motion when performing a task in which a large tool is held in the right hand and a small component is held in the left hand in this way, work efficiency will fall. Therefore, when performing this kind of motion, it is desirable for video of the time when that motion occurs to be presented.

However, in the case of an example of this kind, it is difficult to extract unnecessary motion of the left hand using the methods described in Patent Literature 2 and Non-Patent Literature 2 above.

The reason is as follows. In the case of the above example, movement of a large tool is associated with motion of the right hand, and movement of a small component is associated with motion of the left hand. Therefore, an area of a video surface occupied by movement relating to motion of the left hand is small in comparison with an area of the video surface occupied by movement relating to motion of the right hand.

With the method described in Non-Patent Literature 2 in which values resulting from space integration of CHLAC feature amounts are used, the influence of an image feature amount indicating motion of the left hand on an integral value is small, and it is difficult to appropriately extract a time of unnecessary motion of the left hand. Also, the influence of an image feature amount indicating motion of the right hand on an integral value is large, and therefore motion time extraction becomes more difficult if there are other such large movements.

Also, with the method described in Patent Literature 2, even if a position of unnecessary motion of the left hand can be extracted, a time of unnecessary motion of the left hand cannot be extracted automatically. This is because the method described in Patent Literature 2 uses position-invariation values resulting from time integration of CHLAC feature amounts.

If the method described in Non-Patent Literature 2 is applied with the video surface finely divided, and motion evaluation is performed for each divided area, it is possible to extract a time of unnecessary motion of the left hand. However, since this kind of processing is frequent, the apparatus processing load is heavy, particularly when the number of video pixels differs for standard motion video data and comparison target motion video data. That is to say, with conventional technology, if motion occurs in which an area of a video surface occupied by related movement is small but a difference from standard motion is large (hereinafter referred to as "small differing motion"), there is a problem of not being able to easily extract the motion time.

Thus, as Embodiment 6 of the present invention, a motion analysis apparatus will be described that enables a time of a small differing motion to be extracted easily.

Embodiment 6 of the present invention will now be described in detail with reference to the accompanying drawings.

Figure 27:
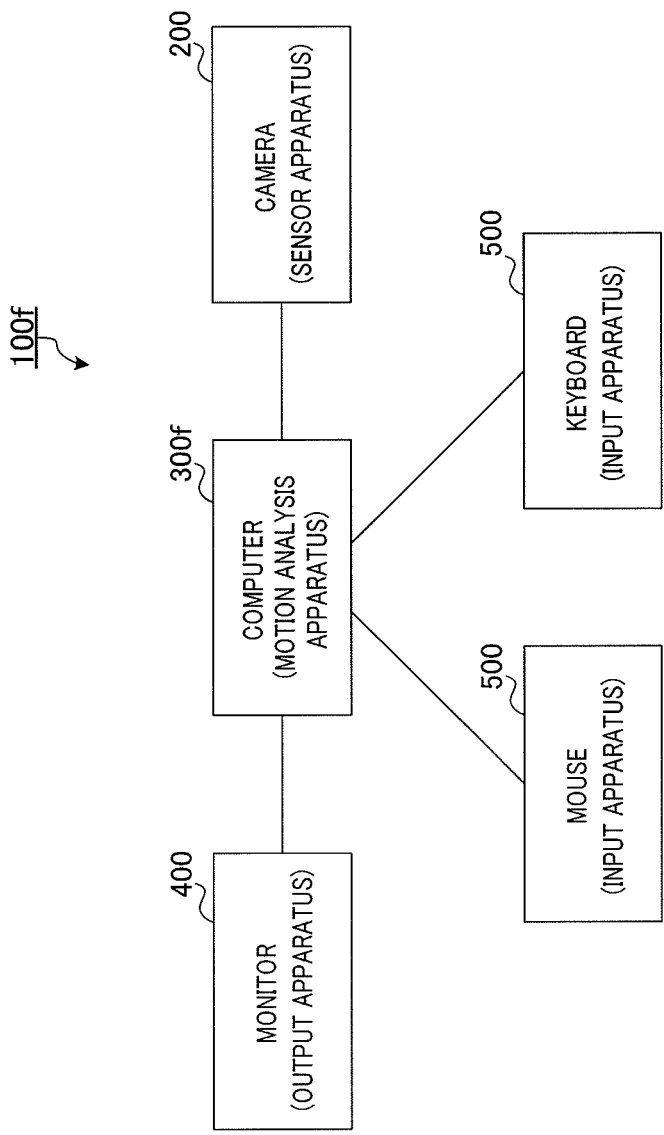
FIG. 27 is a system configuration diagram showing an example of the configuration of a motion analysis system that includes a motion analysis apparatus according to Embodiment 6 of the present invention.

FIG. 27 is a system configuration diagram showing an example of the configuration of a motion analysis system that includes a motion analysis apparatus according to Embodiment 6 of the present invention.

In this embodiment, as in Embodiment 1 through Embodiment 5, a case is described by way of example in which the present invention is applied to a motion analysis system for analyzing motions of each general worker in a factory in which skilled workers and general workers work. However, a motion analysis system in this embodiment extracts times of motions that differ greatly between a general worker and a skilled worker.

In FIG. 27, motion analysis system 100f according to this embodiment has sensor apparatus 200, motion analysis apparatus 300f according to this embodiment, output apparatus 400, and input apparatuses 500.

Sensor apparatus 200 is an apparatus that detects human motion. Sensor apparatus 200 outputs data resulting from measurement of a worker's motion to motion analysis apparatus 300f. Here, sensor apparatus 200 is assumed to be a camera that outputs image frame data of a captured image (moving image data) in real time, and to be capable of individually photographing workers working on a factory assembly line.

Below, as in Embodiment 1 through Embodiment 5, time series frame data obtained by photographing a series of standard motions by a skilled worker is referred to as "standard motion data," and time series frame data obtained by photographing a series of motions subject to comparison by a general worker is referred to as "comparison target motion data." Also, for convenience, standard motion data and comparison target motion data are referred to generically as "motion data." Furthermore, a consecutive plurality of frames constituting one target of analysis (analysis target) among frames constituting comparison target motion data are referred to as "target frames."

Motion analysis system 100$f$ according to this embodiment performs motion analysis based on image feature amounts. In this embodiment, CHLAC features disclosed in Non-Patent Literature 2 are used as image feature amounts. A CHLAC feature is an extension to three dimensions, through the addition of a time domain, of a higher-order local autocorrelation (HLAC) feature obtained by feature extraction from two-dimensional data, and is a feature vector indicating a feature of movement in a three-dimensional coordinate system in which a time domain is added to the planar space of an image.

As in Embodiment 5, in this embodiment also, an image feature amount obtained from standard motion data is referred to as a "standard feature amount," and data of a standard feature amount obtained from standard motion data is referred to as "standard feature amount data." Also, an image feature amount obtained from comparison target motion data is referred to as a "compared feature amount," and data of a compared feature amount obtained from comparison target motion data is referred to as "comparison-target feature amount data." For convenience, standard feature amount data and comparison-target feature amount data are referred to generically as "feature amount data."

Motion analysis apparatus 300$f$ is an apparatus that performs analysis of motion subject to comparison by means of comparison with standard motion. Motion analysis apparatus 300$f$ extracts a position feature amount from comparison-target feature amount data and standard feature amount data. Then motion analysis apparatus 300$f$ extracts a position weight, which is a value representing the size of a difference between motion subject to comparison and standard motion for each position of a video surface (hereinafter referred to as "motion difference" for convenience) from this position feature amount. Motion analysis apparatus 300$f$ then calculates time feature amounts of comparison-target feature amount data and standard feature amount data using extracted position weights.

Here, a position feature amount is a value obtained by adding a feature amount of a specific position represented by two-dimensional coordinates in an image of each time a number of times equal to the number of target frames. Also, a position weight indicates a degree of difference of image feature amounts of each position, calculated from a standard feature amount and compared feature amount of each position of a video surface (hereinafter referred to simply as "position"). If a position weight value at a certain position is large, this indicates that the difference between a standard feature amount and compared feature amount of that position is large, and if a position weight value at a certain position is small, this indicates that the difference between a standard feature amount and compared feature amount of that position is small. As disclosed in Non-Patent Literature 3, a fixed weight map value may be used as a position weight, or a value of a Fisher weight map using Fisher discriminant criteria may be used.

If the number of pixels differs according to the motion data, provision may be made for motion analysis apparatus 300$f$ to absorb two-dimensional spatial expansion and contraction. Specifically, for example, increases or decreases the number of pixels of comparison target motion data based on the number of pixels of standard motion data before performing the above processing.

A weighted time feature amount is a per-time (per-frame) space integral of values obtained by applying position weights to feature amount data. A weighted time feature amount, in other words, is a position weight correspondent CHLAC feature amount. That is to say, a weighted time feature amount is an extremely local feature amount obtained by assigning a position weight to a product of gray values of pixels in the vicinity of a specific pixel, and adding this to an overall image surface. A CHLAC feature amount to which a position weight has not been assigned is described in Non-Patent Literature 2, for example, and therefore a description thereof is omitted here.

Then motion analysis apparatus 300$f$ acquires weighted time feature amount data obtained from comparison-target feature amount data, and weighted time feature amount data obtained from standard feature amount data. Next, motion analysis apparatus 300$f$ extracts a time weight, which is a value representing the size of a difference between compared motion and standard motion, from acquired weighted time feature amount data and weighted time feature amount data. Below, comparison-target feature amount data weighted time feature amount data is referred to as "compared time feature amount data," and standard feature amount data weighted time feature amount data is referred to as "standard time feature amount data." Also, motion analysis apparatus 300$f$ generates result display screen data indicating a time weight of each time as a degree of significance of each time in comparison target motion video, and outputs this to output apparatus 400. Below, standard time feature amount data and compared time feature amount data are referred to generically as "time feature amount data" for convenience.

Here, a time weight is a distance between a standard subspace of each time calculated from standard motion data and a position weight, and an image feature amount calculated from corresponding comparison target motion data and a position weight.

If the number of pixels differs according to the motion data, provision may be made for motion analysis apparatus 300$f$ to absorb temporal expansion or contraction. Specifically, for example, motion analysis apparatus 300$f$ converts a time of each motion data to a conversion time by expansion or contraction of the frame interval, based on the average time of standard motion data, and then estimates a necessary conversion time image feature amount, and performs the above processing. Image feature amount estimation may be performed by approximation using the feature amount nearest the time for which estimation is to be performed, by means of a linear function using feature amounts of 2 points before and after the estimated time, or by using another function, such as such as a quadratic function or trigonometric function, using a plurality of points in the vicinity. By this means, a further improvement in estimation accuracy can be expected.

It is assumed that motion analysis apparatus 300$f$ is a computer having a CPU, a storage medium such as RAM, and a video capture function for capturing moving image data. That is to say, motion analysis apparatus 300$f$ operates by means of execution of a stored control program by the CPU.

Output apparatus 400 outputs a result display screen based on data input from motion analysis apparatus 300$f$. It is assumed here that output apparatus 400 is a monitor having a liquid crystal display. Output apparatus 400 may also be an apparatus installed at a remote location (such as a remote monitoring apparatus, mobile phone, or the like). In this case, output apparatus 400 is connected to motion analysis apparatus 300f via a network such as the Internet, for example.

Input apparatuses 500 are interfaces used by a user to operate motion analysis apparatus 300f. Here, input apparatuses 500 are a mouse as a pointing device and a keyboard, for example.

Motion analysis system 100f first calculates a position weight indicating the size of a difference in motion on a video surface (per-frame two-dimensional space). Then motion analysis system 100f calculates a time weight indicating the size of a difference in motion in the time domain from time feature amount data obtained by applying a position weight to feature amount data. Then motion analysis system 100f generates a result display screen indicating calculated time weights as a degree of significance of each time in comparison target motion video, and presents this to the user. By this means, even with a small differing motion, motion analysis system 100f can exploit such CHLAC feature amount benefits as enabling the processing load to be reduced and additivity, and enables a corresponding occurrence time to be easily extracted and presented to the user. That is to say, motion analysis system 100f can perform differing motion extraction in a state in which the influence of the size of an object that moves in association with motion is suppressed.

The configuration of motion analysis apparatus 300f will now be described.

Figure 28:
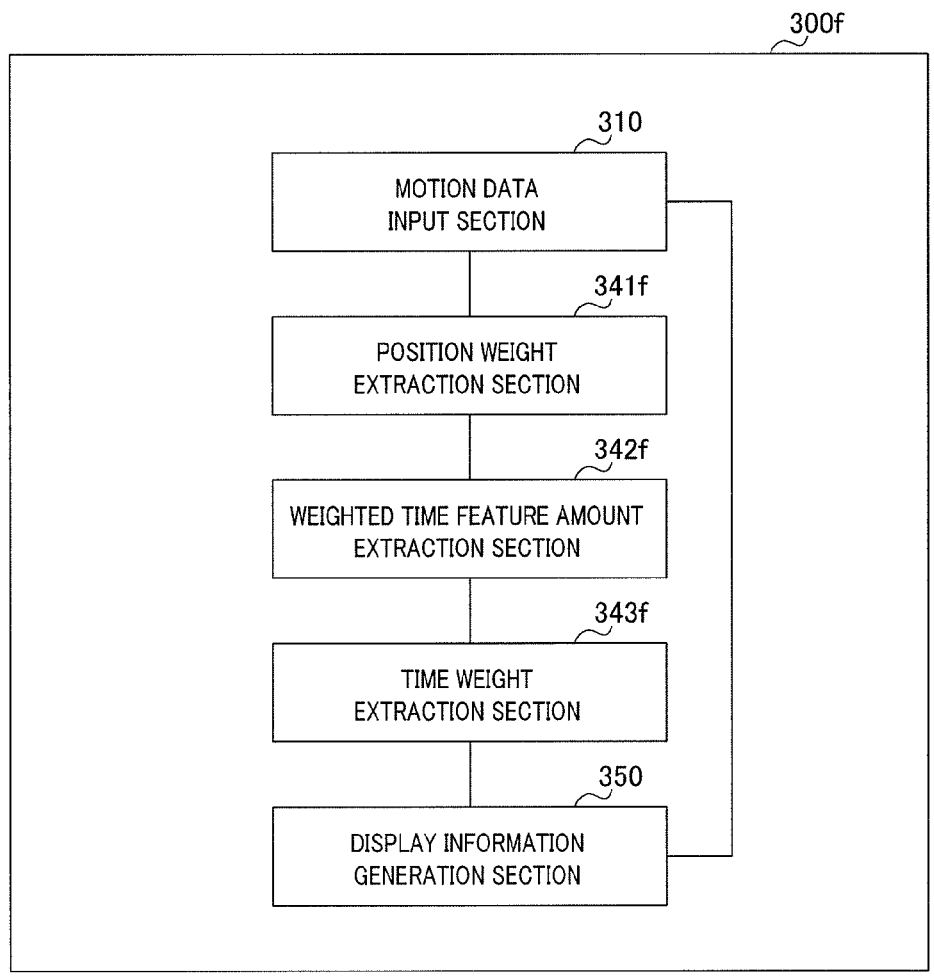
FIG. 28 is a block diagram showing an example of the configuration of a motion analysis apparatus according to Embodiment 6.

FIG. 28 is a block diagram showing an example of the configuration of motion analysis apparatus 300f.

In FIG. 28, motion analysis apparatus 300f has motion data input section 310, position weight extraction section 341f, weighted time feature amount extraction section 342f, time weight extraction section 343f, and display information generation section 350.

Motion data input section 310 acquires motion data from sensor apparatus 200 in response to a request from position weight extraction section 341f, and transfers this motion data to position weight extraction section 341f and display information generation section 350. Transfer of motion data may be performed in real time, or may be performed after motion data is stored. Motion data input section 310 categorizes motion data input from sensor apparatus 200 as either standard motion data or comparison target motion data at the time of input or after input on receiving an input apparatus 500 user operation. Motion data input section 310 may store input standard motion data for reuse.

Position weight extraction section 341f extracts an image feature amount from motion data, and generates feature amount data (standard feature amount data and comparison-target feature amount data). Then position weight extraction section 341f extracts position weights from generated standard feature amount data and comparison-target feature amount data, and generates a position weight map that defines a weight for each position. A position weight map is data that describes a position weight of each position of a comparison target motion data video surface. Then position weight extraction section 341f outputs the generated position weight map and feature amount data (standard feature amount data and comparison-target feature amount data) to weighted time feature amount extraction section 342f.

Weighted time feature amount extraction section 342f calculates weighted time feature amounts (standard time feature amount and compared time feature amount) from the position weight map and feature amount data (standard feature amount data and comparison-target feature amount data), and calculates time feature amount data. Then weighted time feature amount extraction section 342f outputs the calculated time feature amount data (standard time feature amount data and compared time feature amount data) to time weight extraction section 343f.

Time weight extraction section 343f extracts time weights from compared time feature amount data and standard time feature amount data, and generates a time weight map that defines a weight for each time. A time weight map is data that describes a time weight of each time of comparison target motion data video. Then time weight extraction section 343f outputs the generated time weight map to display information generation section 350.

Display information generation section 350 generates result display screen data indicating a time weight of each time as a degree of significance of each time in comparison target motion video from motion data. Then display information generation section 350 outputs the generated result display screen data to output apparatus 400. Details of the result display screen will be given later herein.

As described above, a weighted time feature amount is a per-time (per window in which a number of frames are aligned for smoothing) space integral of values obtained by applying position weights to feature amount data. A position weight has a larger value in a position in which a motion difference is greater. That is to say, a weighted time feature amount of each time increases if there is a position for which a motion difference is great, and, for example, if a small differing motion occurs, increases in accordance with the time of that motion. Also, a time weight has a larger value in a position for which a weighted time feature amount is larger.

Therefore, when a small differing motion is present, motion analysis apparatus 300f having the above-described configuration can intensify a time weight of a time corresponding to that motion, and can extract and present the user with the time of the small differing motion.

The operation of motion analysis apparatus 300f will now be described.

Figure 29:
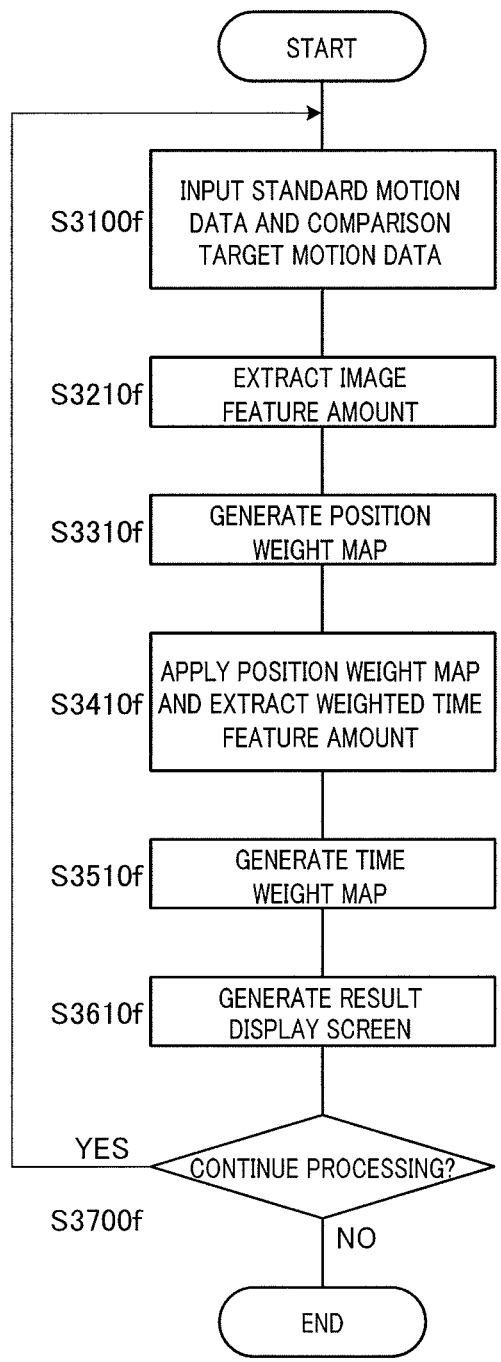
FIG. 29 is a flowchart showing an example of the operation of a motion analysis apparatus according to Embodiment 6.

FIG. 29 is a flowchart showing an example of the operation of motion analysis apparatus 300f.

First, a user, for example, has responsibility for work including an object motion switched around between a skilled worker and general worker on either side of a rest period, and operates motion analysis apparatus 300f so as to photograph the motions of each. In this way, there is no particular need for a time period for motion evaluation, and no burden is imposed on the workers, enabling data acquisition for motion analysis to be performed without affecting factory productivity.

As a result, motion data input section 310 has standard motion data and comparison target motion data as input in step S3100f. Then motion data input section 310 outputs the input standard motion data and comparison target motion data to position weight extraction section 341f and display information generation section 350 in response to a request from position weight extraction section 341f. If standard motion data input in the past has been stored, motion data input section 310 may output that standard motion data to position weight extraction section 341f.

Then, in step S3200f, position weight extraction section 341f extracts an image feature amount from motion data, and generates feature amount data (standard feature amount data and comparison-target feature amount data).

Specifically, for example, position weight extraction section 341f calculates per-position and per-time image feature amounts V using the autocorrelation function of an N-th order shown in equation 9 below.

(Equation 9)

$$V_f^N(a_1, \ldots, a_N) = \int f(r)f(r+a) \ldots f(r+a_N)dr \qquad [9]$$

Here, f is a time series image, and variable r and N variables a; (where i=1, ..., N) are three-dimensional vectors with image-internal two-dimensional coordinates and time as components. The time-direction integration range is decided according to what degree of time-direction correlation there is. That is to say, an integration range is a three-dimensional collection of pixels comprising N still images (local feature images), variable r is one pixel in an image (position pixel), and variable a is a displacement vector from r. Also, f(r) is a position r function value, expressing the brightness value of position r in a local feature image.

In the case of a CHLAC feature amount, displacement is three-dimensional, and the number of displacement vector combinations (displacement patterns) is one for the zero order, 13 for the first order, and 237 for the second order. Therefore, in the case of a binarized image, a CHLAC feature amount is expressed as a feature vector with a total of 251 dimensions.

In step S3310f, position weight extraction section 341f generates a position weight map from standard feature amount data and comparison-target feature amount data, and outputs this to weighted time feature amount extraction section 342f together with the standard feature amount data and comparison-target feature amount data.

In step S3410f, weighted time feature amount extraction section 342f applies the position weight map to standard feature amount data and calculates standard time feature amount data, and applies the position weight map to comparison-target feature amount data and calculates compared time feature amount data. Then weighted time feature amount extraction section 342f outputs the calculated standard time feature amount data and compared time feature amount data to time weight extraction section 343f.

Specifically, weighted time feature amount extraction section 342f uses equation 12 to calculate weighted time feature amount $V_t$ (tilde) from position weight $w_{x,y}$ expressed by equation 10 and real-number image feature amount $V_{t,x,y}$ expressed by equation 11, as shown below. Then weighted time feature amount extraction section 342f outputs data in which weighted time feature amounts $V_t$ (tilde) for the entire video surface are arrayed to time weight extraction section 343f as time feature amount data. Here, symbol t indicates a time (corresponding to a frame) in comparison target motion video, symbols x and y indicate a two-dimensional position in a per-frame space (video surface), symbol d indicates the number of dimensions of an image feature amount, and symbols n and m indicate the number of vertical and horizontal video pixels respectively.

(Equation 10)

$$w_{x,y} \in R \quad [10]$$

(Equation 11)

$$V_{t,x,y} \in R^d \quad [11]$$

(Equation 12)

$$\tilde{V}_t = \sum_{x=1, y=1}^{x=n, y=m} w_{x,y} V_{t,x,y} \quad [12]$$

Then, in step S3510f, time weight extraction section 343f generates a time weight map from standard time feature amount data and compared time feature amount data, and outputs this to display information generation section 350.

Then, in step S3610f, display information generation section 350 generates a result display screen presenting extraction results from the time weight map, standard motion data, and comparison target motion data, and displays this result display screen on output apparatus 400.

Then, in step S3700f, motion analysis apparatus 300f determines whether or not termination of analytical processing has been directed by means of a user operation or the like. If termination of analytical processing has not been directed (S3700f: YES), motion analysis apparatus 300f returns to step S3100f, whereas if termination of analytical processing has been directed (S3700f: NO), motion analysis apparatus 300f terminates the series of operations.

By means of the above-described operation, motion analysis apparatus 300f calculates position weight $w_{x,y}$, and then calculates time weight $w_t$ from time feature amount data $V_t$ (tilde) obtained by applying that position weight $w_{x,y}$ to feature amount data $V_{t,x,y}$. Then motion analysis apparatus 300f can present calculated position weight $w_t$ as a degree of significance of each time of video.

Below, there are cases where there is a difference in positions in motion screens, and viewed in the time domain there is another large motion, so that the motion is relatively small. States of parameters and a result display screen will now be described, taking an example of motion that can be called such a motion that differs between standard motion and motion subject to comparison (hereinafter referred to simply as "small differing motion").

Figure 30:
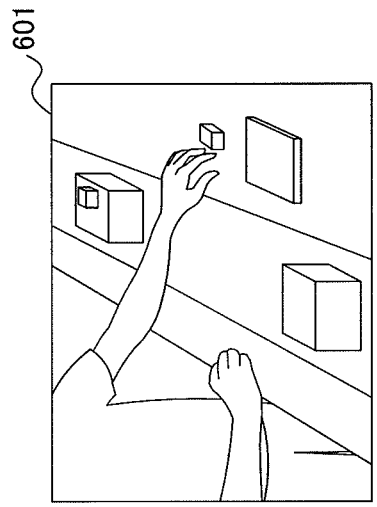
FIG. 30 is a drawing showing expected standard motion video and comparison target motion video in Embodiment 6.
Figure 30:
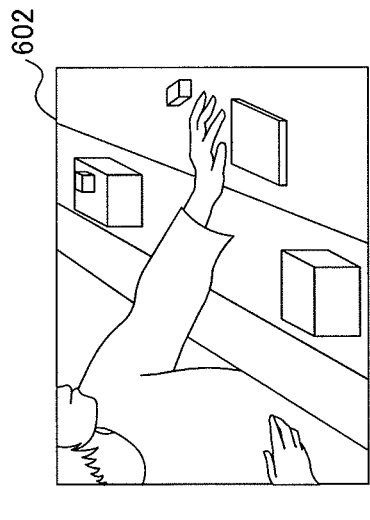

FIG. 30 is a drawing showing expected standard motion video and comparison target motion video.

As shown in FIG. 30, standard motion video 601 and comparison target motion video 602 are shot from the same angle and have the same number of captured pixels. Therefore, when the same motions are performed in the same order, the direction, magnitude, and order of movements in the videos are virtually identical due to motion analysis apparatus 300f making the shooting angle the same.

FIG. 31 is a drawing showing examples of expected standard motion and compared motion contents, and a position weight map in that case.

Figure 31A:
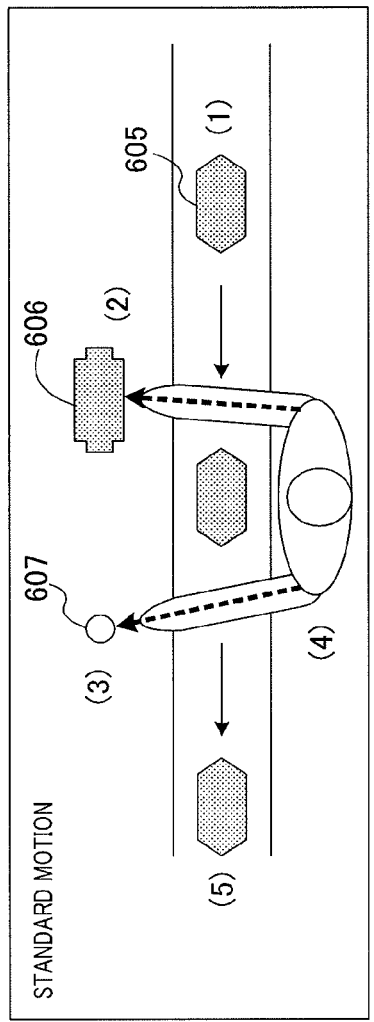
FIG. 31 is a drawing showing examples of expected standard motion and compared motion contents, and a time weight map in that case, in Embodiment 6.

The example of standard motion includes the following motions, as shown in FIG. 31A.

(1) Large first component 605 moves from the right side and is placed directly in front;
(2) the right hand is extended forward and takes tool 606;
(3) the left hand is extended forward and takes second component 607;
(4) second component 607 is attached to first component 605 with tool 606; and
(5) first component 605, to which second component 607 has been attached, is conveyed to the left.

Figure 31B:
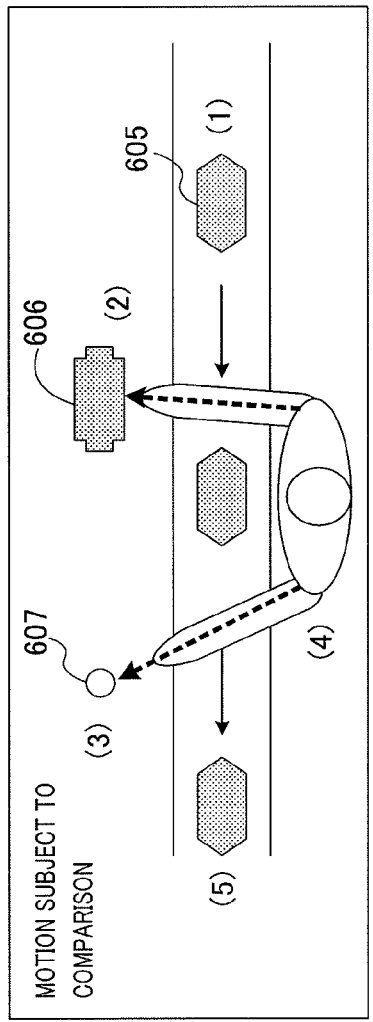

On the other hand, the example of motion subject to comparison includes the following motions, as shown in FIG. 31B.

(1) Large first component 605 moves from the right side and is placed directly in front;
(2) the right hand is extended forward and takes tool 606;
(3) the left hand is extended diagonally to the left and takes second component 607;
(4) second component 607 is attached to first component 605 with tool 606; and
(5) first component 605, to which second component 607 has been attached, is conveyed to the left. That is to say, in the motion subject to comparison, the direction of the motion of taking second component 607 differs from that in the standard motion.

Figure 31C:
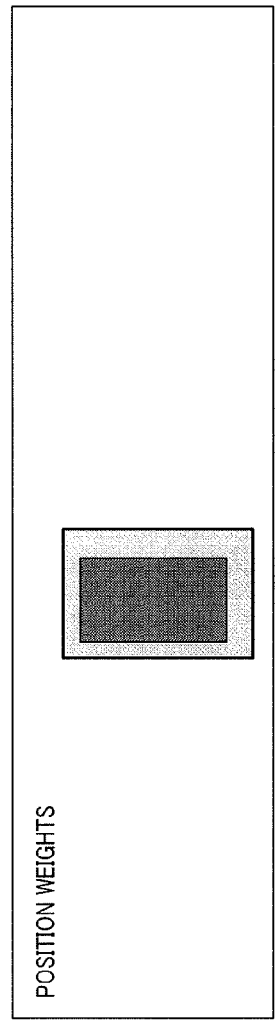

In this case, a difference between standard feature amount data and comparison-target feature amount data is large at the location of motion (3). Therefore, a position weight calculated by motion analysis apparatus 300f is large at the location of motion (3), as shown in FIG. 31C. Here, the density of hatching indicates the size of a position weight.

With conventional CHLAC feature amounts—that is, values resulting from space integration of image feature amounts on a frame-by-frame basis—pixel values are added uniformly. Therefore, an image feature amount of movement of first tool 606 is added to an image feature amount of motion of the left hand, a left hand motion image feature amount becomes relatively small, and it becomes difficult to extract a difference in motion of the left hand. In particular, if tool 606 is large and second component 607 is extremely small in comparison, an image feature amount relating to motion of the left hand occupying image feature amounts of an entire frame in that time becomes still smaller, and it becomes still more difficult to extract a difference in motion of the left hand.

In this regard, motion analysis apparatus 300f applies a position weight that reflects a motion difference for each position to an image feature amount, as shown in FIG. 31C, enabling a small motion difference such as in (3) to be accentuated and easily extracted.

Figure 32:
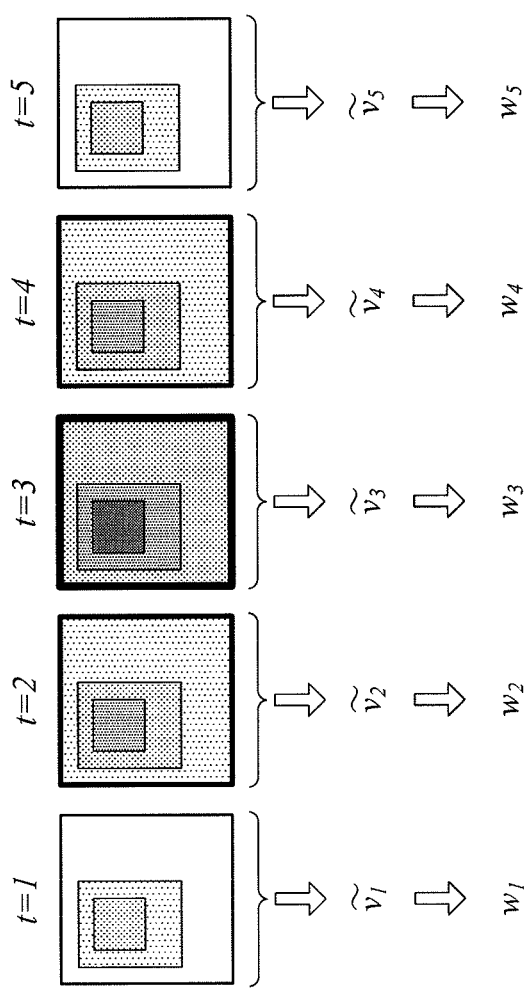
FIG. 32 is a drawing showing examples of position weight distribution (position weight maps) at various times in Embodiment 6.

FIG. 32 is a drawing showing examples of position weight $w_{x,y}$ distribution (position weight maps) at each of the times in the motions shown in FIG. 31. Here, the density of hatching indicates the size of a position weight, and the suffix of each symbol indicates corresponding time t. Times t=1 through 5 correspond respectively to motions (1) through (5) shown in FIG. 31. That is to say, a small differing motion occurs at time t=3.

As shown in FIG. 32, among the position weights, the value of position weight $w_{x,y}$ of a position corresponding to a small differing motion is larger. Image feature amounts $V_1$ (tilde) through $V_5$ (tilde) are large values at positions at which motions (1) through (5) are performed. That is to say, for a time t=3 frame, for example, image feature amount $V_{t,s,y}$ of a position at which motion (3) is performed (the range of movement of the left hand diagonally ahead) is a large value, and image feature amounts $V_{t,s,y}$ of other positions are relatively small values.

Therefore, when a small differing motion such as motion (3) is present, weighted time feature amount $V_t$ (tilde) of the time when that motion occurs is found as follows. As shown in FIG. 32, weighted time feature amount $V_t$ (tilde) is a relatively large value due to being calculated by integrating values obtained by multiplying image feature amount $V_{t,x,y}$ by position weight $w_{x,y}$ for each position. Also, when a small differing motion such as motion (3) is present, time weight $w_t$ of that time is also a large value even if a large motion is simultaneously included in the same frame.

When presenting only information of one interval, for example, display information generation section 350 generates a result display screen that highlights a position at which the value of position weight $w_{x,y}$ is large. For example, display information generation section 350 sets a coherent area that includes a position at which the value of position weight $w_{x,y}$ is large (hereinafter referred to as "significant area"). Then, the higher the average value of position weight $w_{x,y}$ of a significant area, the darker display information generation section 350 makes the color, or the greater the thickness, of a line enclosing the significant area. Also, for example, display information generation section 350 generates a result display screen in which only significant area video is displayed sharply, and video of other parts is displayed in a blurry fashion.

Figure 33:
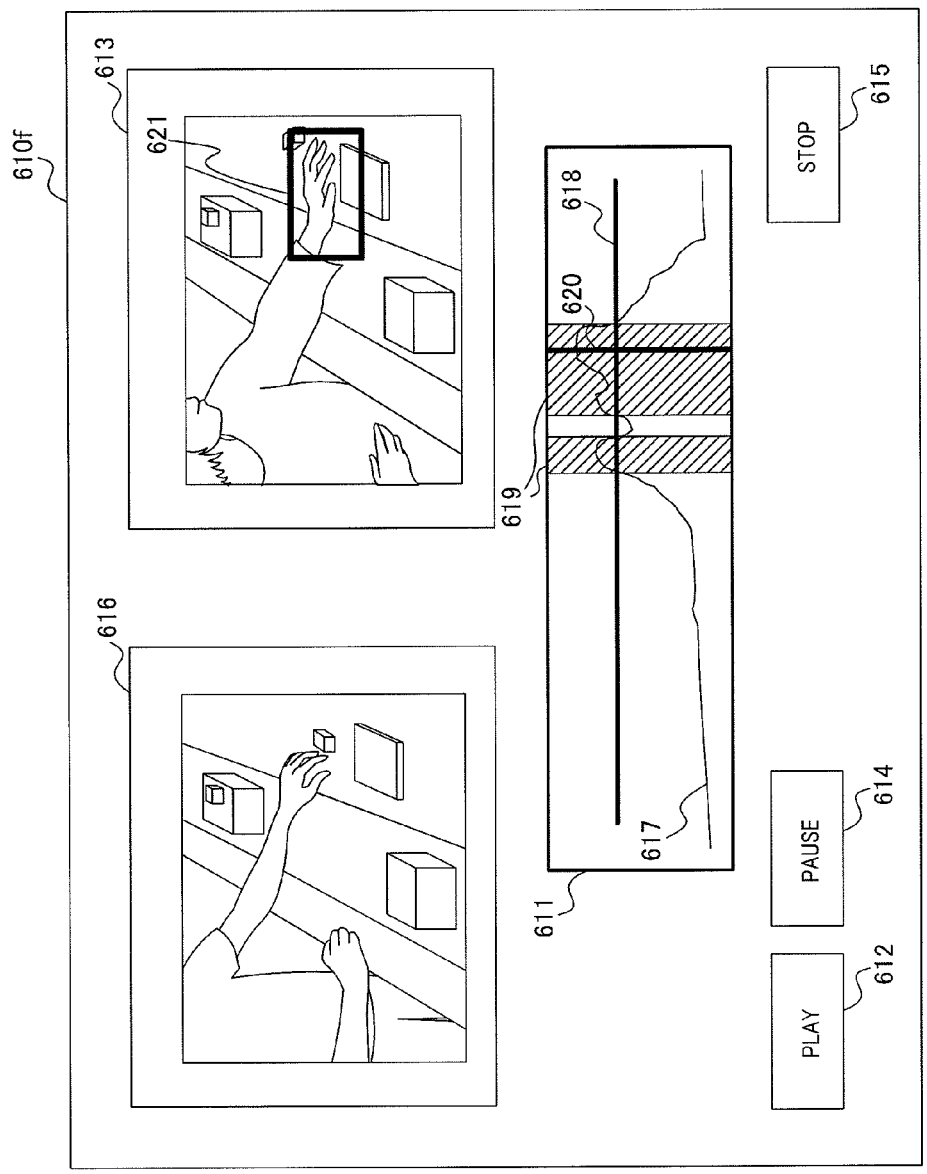
FIG. 33 is a drawing showing an example of a result display screen in Embodiment 6.

FIG. 33 is a drawing showing an example of a result display screen.

As shown in FIG. 33, result display screen 610f has analysis result display area 611, play button 612, compared motion display area 613, pause button 614, stop button 615, and standard motion display area 616.

In analysis result display area 611, result display screen 610f displays time weight time series data (weight map) 617, threshold value display line 618 indicating a predetermined threshold value, and markers 619 indicating intervals in which a time weight exceeds threshold value display line 618. Also, result display screen 610f displays playback location display line 620 that can be moved horizontally via input apparatuses 500.

When play button 612 is clicked, result display screen 610f plays back a captured image of motion subject to comparison in compared motion display area 613, and moves playback location display line 620 in accordance with the playback. When pause button 614 is clicked during image playback, result display screen 610f temporarily stops image playback. Standard motion display area 616 also plays back a standard motion captured image in synchronization with playback of the compared motion captured image in compared motion display area 613.

Result display screen 610f also displays frame 621f indicating a significant area, superimposed on the compared motion captured image. Frame 621f is, for example, darker in color in an interval in which a time weight exceeds threshold value display line 618, and lighter in color in other display intervals.

By means of result display screen 610f of this kind, a user can move playback location display line 620 to a marker 619 area and click play button 612. Then, by means of this operation, a user can rapidly identify and check video of a time when a difference in motion is large due to a small differing motion or the like. Also, since frame 621f indicating a significant area is displayed, a user can rapidly identify and check a location of a small differing motion or the like where a difference in motion is large and a degree of significance as an analysis target is high. That is to say, a user can easily grasp where he should focus his attention within an image. Moreover, since the density of frame 621f corresponds to a time weight, a user can check a difference in motion in the video while also checking the degree of significance.

The shape and size of frame 621f may be fixed, or frame 621f may be of a shape and size in line with the shape of a significant area. Also, result display screen 610f may display a standard motion data image and a comparison target motion data image simultaneously or by switching between the two. Result display screen 610f may also output other motion-related data, such as the motion data capture date and time, comparison object acceleration data, speech, or the like, for example.

Figure 34:
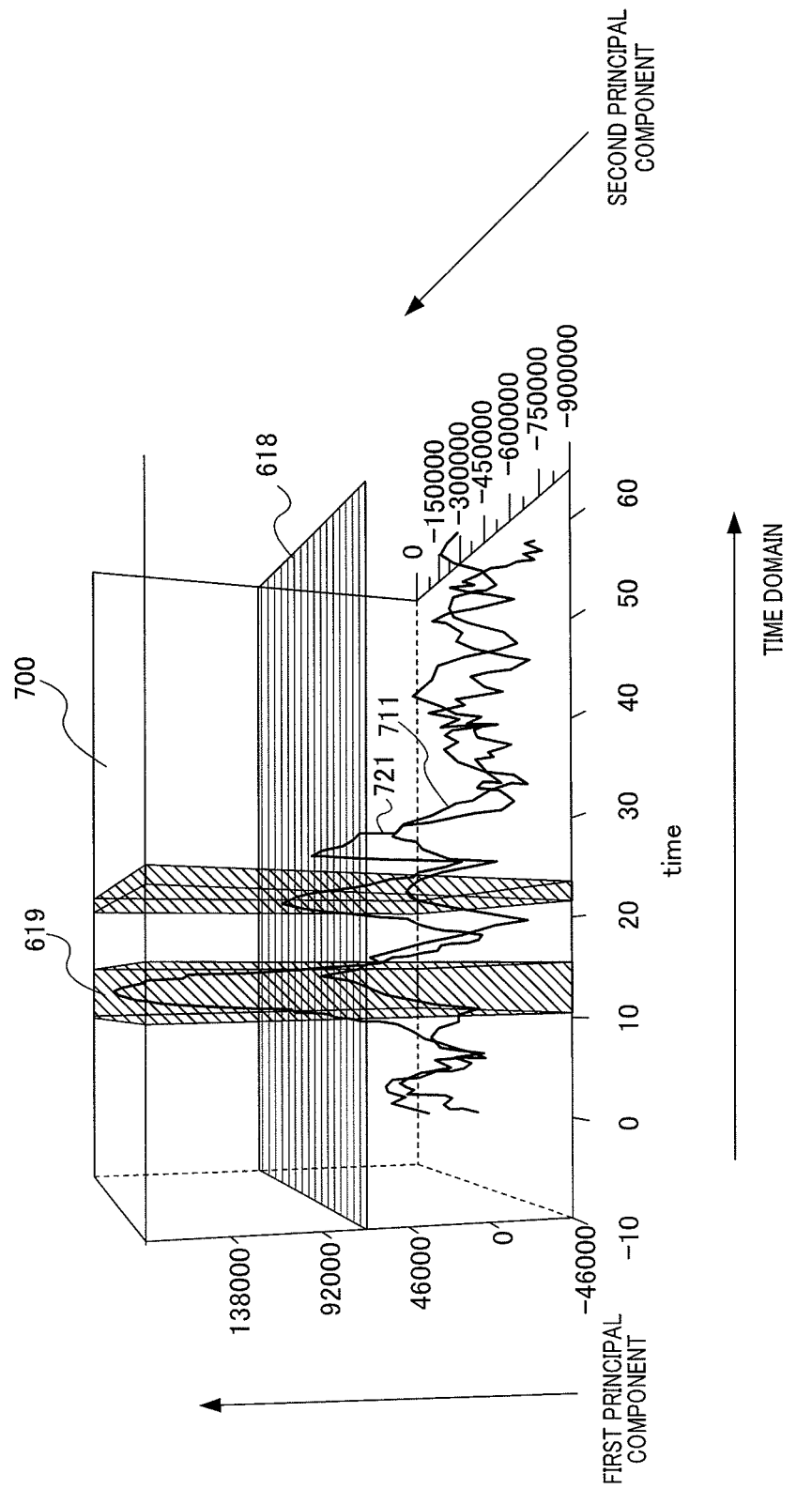
FIG. 34 is a drawing showing an example of a three-dimensional graph included in a result display screen in Embodiment 6.

Also, analysis result display area 611 of result display screen 610f may also output standard feature amount and compared feature amount principal component scores. For example, as shown in FIG. 34, analysis result display area 611 of result display screen 610f may include three-dimensional graph 700 with image feature amount principal component scores, and with time on the horizontal axis. In three-dimensional graph 700, for example, standard motion feature amounts are linked by line 711, and compared feature amounts by line 721. By performing three-dimensional display in this way, result display screen 610f can display not only time weights, but also changes in image feature amounts in line with motion, in an easily understandable fashion.

As described above, motion analysis apparatus 300f according to this embodiment calculates position weights, and then calculates time weights indicating the degree of significance of each video time from time feature amount data obtained by applying the position weights to feature amount data. By this means, motion analysis apparatus 300f according to this embodiment can easily extract small differing motions. That is to say, motion analysis apparatus 300f can exploit the benefits of CHLAC features, and extract small differing motions, without finely dividing a video surface.

Also, since motion analysis apparatus 300f displays a position for which the video position weight is large, a position for which a difference in motion is large can be presented to a user. Furthermore, since motion analysis apparatus 300f displays a time for which the video time weight is large, a time location where a difference in motion is large can be presented to a user. That is to say, motion analysis apparatus 300f enables a user to be presented with motion that should be checked in video.

In this embodiment, a position weight map applied to standard feature amount data and a position weight map applied to comparison-target feature amount data are the same, but the present invention is not limited to this. For example, a position weight map applied to standard feature amount data may also be a fixed distribution position weight map, or a position weight map with fixed values in all areas. A value of a position weight in the center of a video surface, the average position weight in a video surface, or the lowest position weight value in a video surface, for example, can be employed as a fixed value. Also, an upper limit may be set for a position weight. The average position weight in a video surface, for example, can be employed as an upper limit. By this means, a difference in weighted time feature amounts between standard motion and motion subject to comparison may become clearer.

A motion analysis apparatus may also first extract areas subject to presentation based on position weights, and calculate time weights for each extracted area. By this means, it is possible to calculate more appropriate time weights.

In this embodiment, temporal expansion and contraction is absorbed for time weights, based on a standard image, but a Fourier series expansion may also be introduced. With time weights for which a Fourier series is introduced, temporal expansion and contraction is absorbed for differences in feature amount data by the introduction of a Fourier series expansion. Time weights for which a Fourier series is introduced denote frequency weights in the time domain, optimized by means of Fisher discriminant criteria or the like, so as to maximize dispersion of a matrix in which d-dimension feature amount vectors of each pixel are arrayed. Optimized time weights are characterized by becoming larger the greater the difference in motion of a frame, and have an effect of absorbing differences in the lengths of motion data while performing time series evaluation of motion. Details of time weights are given in Non-Patent Literature 3, for example, and therefore a description thereof is omitted here.

In this embodiment, motion analysis apparatus 300f calculates a distance between a standard subspace of each time calculated from standard motion data, and an image feature amount calculated from corresponding comparison target motion data, and uses this as a time weight. Motion analysis apparatus 300f may also use a value after normalization or suchlike processing has been performed based on a calculated distance as a time weight. Furthermore, for a difference in time feature amount data, motion analysis apparatus 300f may also use a value optimized by means of Fisher discriminant criteria or the like so as to maximize dispersion of a matrix in which d-dimension feature amount vectors of each time are arrayed. Also, a time weight may simply be a difference in weighted time feature amounts of each frame.

In this embodiment, an image feature amount has been described as a CHLAC feature amount, but this is not a limitation. For example, high-order local feature amounts using an orientation histogram or the like can be used as image feature amounts. If such feature amounts are used, a motion analysis apparatus can find an image local orientation histogram from a concentration gradient image, and use the found orientation histogram as a feature vector. A time of a small differing motion can also be easily extracted when such image feature amounts are used.

In this embodiment, data acquired from the same sensor is used when performing time weight calculation and position weight calculation, but data acquired from different sensors may also be used. For example, in this embodiment, data acquired from camera sensors that are the same kind of sensors may also be used. In this case, standard data used in time weight calculation may be data acquired from somewhat diagonally ahead enabling not only horizontal but also vertical movement to be easily captured, and data used in position weight calculation may be data acquired from directly above. In this way, more appropriate time weights and position weights can be extracted for a particular purpose.

Provision may also be made, for example, for data acquired from an accelerometer to be used in time weight calculation, and for data captured by a camera sensor to be used in position weight calculation. In this embodiment, for example, position weights are calculated using data acquired from a camera sensor, and time weights are calculated using data acquired from an accelerometer. In this case, a shortcoming of a camera sensor can be compensated for even if there is a blind spot or error in a camera sensor's horizontal direction or vertical direction. When data acquired from an accelerometer is used, also, after local feature amounts are calculated, time weights are calculated in the same way as feature amounts calculated from an image. For example, if accelerometers are attached to both wrists of a worker, feature amounts of 21 dimensions, combining 6 dimensions of both arms and 15 dimensions of correlation between acceleration data, can be calculated as accelerometer local feature amounts. Also, attaching an accelerometer to a tool used in motion to be evaluated can also be considered. This makes it possible to perform motion evaluation that exploits the characteristics of different sensors without attaching accelerometers to a worker.

Embodiment 7

It is possible to combine above-described Embodiment 5 and Embodiment 6 with any of Embodiments 1 through 4. That is to say, in Embodiment 1 through Embodiment 4, a target of analysis can be made a differing-order motion described in Embodiment 5 or a small differing motion described in Embodiment 6. By this means, easy adjustment becomes possible for a differing-order motion extraction result presentation quantity or a small differing motion time extraction result presentation quantity. As Embodiment 7 of the present invention, a motion analysis apparatus will be described that combines Embodiment 1 with Embodiment 5 or Embodiment 6.

Here, it is assumed that a motion analysis apparatus performs motion analysis using image feature amounts that include at least a time component and a position component. Below, one of a time component or position component is designated a "first component," and the other is designated a "second component." Also, of differences between comparison-target feature amount data and standard feature amount data, a weight representing the size of a difference of each first component value is referred to as a "first weight," and a weight representing the size of a difference of each second component value is referred to as a "second weight."

That is to say, when a first component is a time component, a first weight is a time weight, and a second weight is a position weight. This case is referred to as a "first pattern." On the other hand, when a first component is a position component, a first weight is a position weight, and a second weight is a time weight. This case is referred to as a "second pattern."

Figure 35:
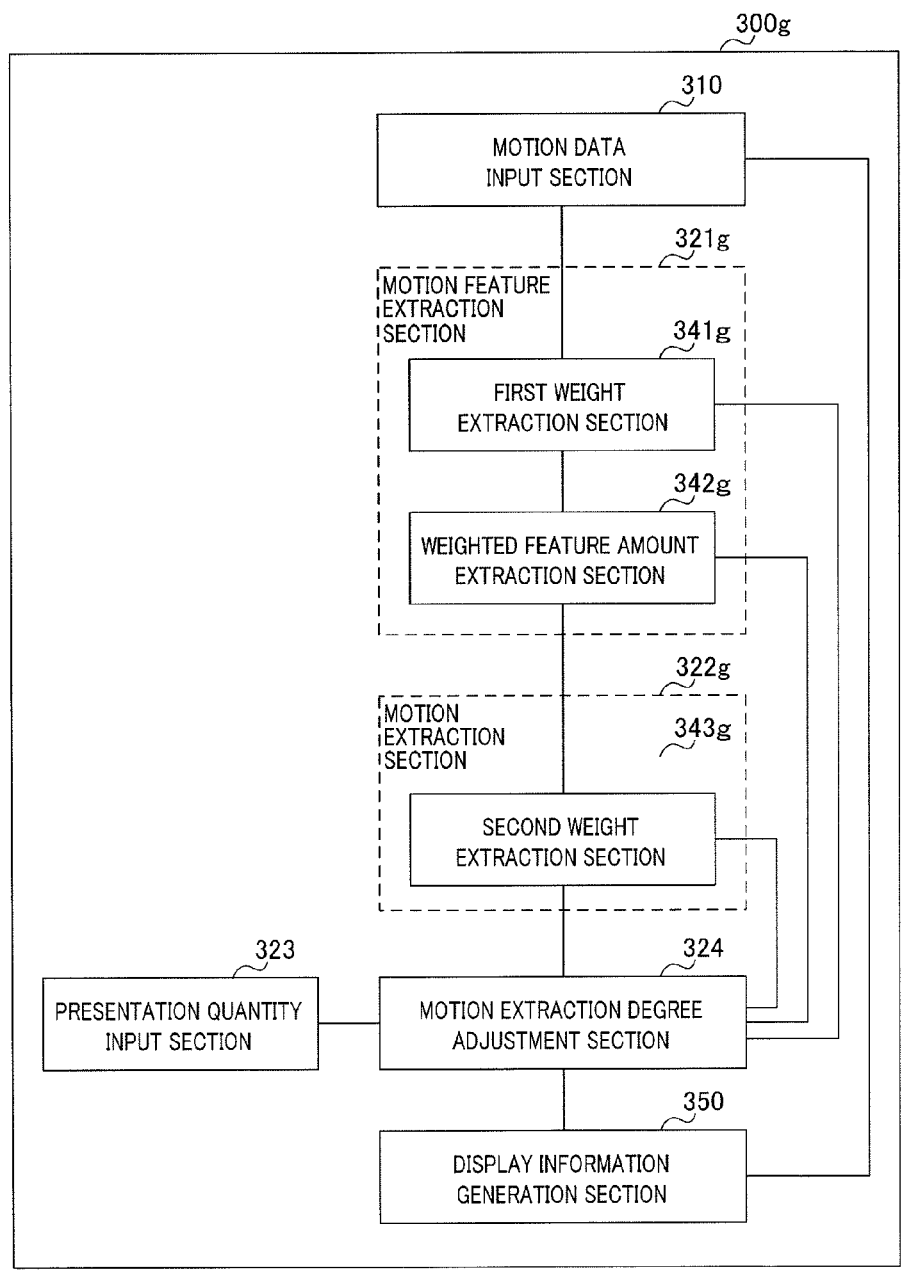
FIG. 35 is a block diagram showing an example of the configuration of a motion analysis apparatus according to Embodiment 7.

FIG. 35 is a block diagram showing an example of the configuration of a motion analysis apparatus according to this embodiment, and corresponds to FIG. 2 of Embodiment 1, FIG. 19 of Embodiment 5, and FIG. 28 of Embodiment 6.

In FIG. 35, motion analysis apparatus 300g has motion data input section 310, motion feature extraction section 321g, motion extraction section 322g, presentation quantity input section 323, motion extraction degree adjustment section 324, and motion extraction result presentation section 325. Motion feature extraction section 321g has first weight extraction section 341g and weighted feature amount extraction section 342g. Motion extraction section 322g has second weight extraction section 343g.

First, the function of each section in the case of the first pattern will be described.

First weight extraction section 341g has the same function as time weight extraction section 331e of Embodiment 5. However, parameter values used by first weight extraction section 341g are adjusted as appropriate by means of motion extraction degree adjustment section 324. Parameters whose values are adjusted here are, for example, the resolution, frame rate, pixel interval from a reference point of a CHLAC mask pattern, principal component analysis cumulative contribution degree, window size, number of basis functions, number of expansions, time weight threshold value, minimum (longest) continuous time, and so forth, among the above-mentioned first parameters.

Weighted feature amount extraction section 342g has the same function as weighted position feature amount extraction section 332e of Embodiment 5. However, parameter values used by weighted feature amount extraction section 342g are adjusted as appropriate by means of motion extraction degree adjustment section 324. Parameters whose values are adjusted here are, for example, the resolution, frame rate, pixel interval from a reference point of a CHLAC mask pattern, principal component analysis cumulative contribution degree, window size, and so forth, among the above-mentioned first parameters.

Second weight extraction section 343g has the same function as position weight extraction section 333e of Embodiment 5. However, parameter values used by second weight extraction section 343g are adjusted as appropriate by means of motion extraction degree adjustment section 324. Parameters whose values are adjusted here are, for example, the number of basis functions, number of expansions, position weight threshold value, minimum (maximum) continuous area, and so forth, among the above-mentioned second parameters and third parameters.

That is to say, the first pattern is a pattern combining Embodiment 5 and Embodiment 1.

Next, the function of each section in the case of the second pattern will be described.

First weight extraction section 341g has the same function as position weight extraction section 341f of Embodiment 6. However, parameter values used by first weight extraction section 341g are adjusted as appropriate by means of motion extraction degree adjustment section 324. Parameters whose values are adjusted here are, for example, the resolution, frame rate, pixel interval from a reference point of a CHLAC mask pattern, principal component analysis cumulative contribution degree, window size, number of basis functions, number of expansions, position weight threshold value, minimum (maximum) continuous area, and so forth, among the above-mentioned first parameters.

Weighted feature amount extraction section 342g has the same function as weighted time feature amount extraction section 342f of Embodiment 6. However, parameter values used by weighted feature amount extraction section 342g are adjusted as appropriate by means of motion extraction degree adjustment section 324. Parameters whose values are adjusted here are, for example, the resolution, frame rate, pixel interval from a reference point of a CHLAC mask pattern, principal component analysis cumulative contribution degree, window size, and so forth, among the above-mentioned first parameters.

Second weight extraction section 343g has the same function as time weight extraction section 343f of Embodiment 6. However, parameter values used by second weight extraction section 343g are adjusted as appropriate by means of motion extraction degree adjustment section 324. Parameters whose values are adjusted here are, for example, the number of basis functions, number of expansions, time weight threshold value, minimum (longest) continuous time, and so forth, among the above-mentioned second parameters and third parameters.

That is to say, the second pattern is a pattern combining Embodiment 6 and Embodiment 1.

In the operation of motion analysis apparatus 300g, of the operations described in Embodiment 1 only extraction processing of objects counted as extraction number A is replaced by analysis target extraction processing described in Embodiment 5 or Embodiment 6. Therefore, a description of motion analysis apparatus 300g operation will be omitted here.

Thus, motion analysis apparatus 300g according to this embodiment makes easy adjustment possible for a differing-order motion extraction result presentation quantity or a small differing motion time extraction result presentation quantity. Therefore, using motion analysis apparatus 300g enables motion analysis that matches particular needs to be performed in different applications.

In this embodiment, only a combination with Embodiment 1 has been described, but it is also possible to combine Embodiment 5 or Embodiment 6 with Embodiment 2 through Embodiment 4 in a similar way.

Also, provision may be made for both Embodiment 5 and Embodiment 6 to be combined in a switchable fashion. That is to say, whether a motion analysis apparatus makes an above first component a time component or a position component may be switched by means of a user directive. In this case, a motion analysis apparatus may, for example, have both a system comprising time weight extraction section 331e, weighted position feature amount extraction section 332e, and position weight extraction section 333e, and a system comprising position weight extraction section 341f, weighted time feature amount extraction section 342f, and time weight extraction section 343f.

Furthermore, provision may be made for only Embodiment 5 and Embodiment 6 to be combined in a switchable fashion. In this case, also, diversified motion analysis is possible, although a presentation quantity cannot be adjusted.

In above-described Embodiment 1 through Embodiment 7, an object of application of the present invention has been assumed to be an apparatus that analyzes work motion in a factory, but this is not a limitation. The present invention can also be applied to various other kinds of apparatus, such as apparatuses that analyze various kinds of motion, including driving, sports, cooking, and musical performances, for example.

As described above, a motion analysis apparatus according to a first aspect of the present invention performs analysis of motion subject to comparison by means of comparison with standard motion, and has: a motion difference extraction section that determines a location where a degree of difference between the motion subject to comparison and the standard motion satisfies a predetermined condition; a presentation quantity input section that receives a specification of a presentation quantity of a location that satisfies the predetermined condition; and a motion extraction degree adjustment section that adjusts the predetermined condition so that a quantity of locations satisfying the predetermined condition becomes the specified presentation quantity.

A motion analysis apparatus according to a second aspect of the present invention further has, in a motion analysis apparatus according to the first aspect, a motion data input section that inputs standard motion data that is motion data of a series of the standard motions, and comparison target motion data that is motion data of a series of the motions subject to comparison; wherein the motion difference extraction section extracts feature amounts of the standard motion data and the comparison target motion data using a first parameter, extracts a difference between feature amounts of the comparison target motion data and the standard motion data using a second parameter, and extracts a location where an extracted difference satisfies a condition set by a third parameter; and the motion extraction degree adjustment section adjusts at least one of the first parameter, the second parameter, and the third parameter.

A motion analysis apparatus according to a third aspect of the present invention is a motion analysis apparatus wherein, in a motion analysis apparatus according to the second aspect, the motion data is moving image data, and the feature amount is a CHLAC feature.

A motion analysis apparatus according to a fourth aspect of the present invention is a motion analysis apparatus wherein, in a motion analysis apparatus according to the second aspect, a condition set by the third parameter is that the difference is larger than the third parameter.

A motion analysis apparatus according to a fifth aspect of the present invention is a motion analysis apparatus wherein, in a motion analysis apparatus according to the second aspect, the presentation quantity is a number of locations that satisfy a condition set by the third parameter.

A motion analysis apparatus according to a sixth aspect of the present invention is a motion analysis apparatus wherein, in a motion analysis apparatus according to the second aspect, the presentation quantity is a proportion of a length of time of a location that satisfies a condition set by the third parameter.

A motion analysis apparatus according to a seventh aspect of the present invention is a motion analysis apparatus wherein, in a motion analysis apparatus according to the second aspect, a condition set by the third parameter is that the difference is smaller than the third parameter.

A motion analysis apparatus according to an eighth aspect of the present invention further has, in a motion analysis apparatus according to the first aspect, a motion data input section that inputs standard motion data that is moving image data of a series of the standard motions, and comparison target motion data that is moving image data of a series of the motions subject to comparison; wherein the motion difference extraction section extracts a time weight when introducing a time weight to a CHLAC feature and calculating a video feature as a feature amount indicating a difference between the motion subject to comparison and the standard motion using a fourth parameter, and extracts a location where the feature amount satisfies a condition set by a fifth parameter; and the motion extraction degree adjustment section adjusts at least one of the fourth parameter and the fifth parameter.

A motion analysis apparatus according to a ninth aspect of the present invention further has, in a motion analysis apparatus according to the first aspect, a motion analysis initial value setting section that sets an initial value of the predetermined condition and a target value of the presentation quantity, based on the standard motion data, according to a plurality of different presentation quantity levels; wherein the motion extraction degree adjustment section receives an initial value of the predetermined condition and a specification of the presentation quantity by means of a specification of the level.

A motion analysis method according to a tenth aspect of the present invention performs analysis of motion subject to comparison by means of comparison with standard motion, and has: a step of receiving a specification of a presentation quantity of results of the analysis; a step of determining a location where a degree of difference between the motion subject to comparison and the standard motion satisfies a predetermined condition; and a step of adjusting the predetermined condition when a quantity of locations satisfying the predetermined condition differs from a specified presentation quantity.

A motion analysis apparatus according to an eleventh aspect of the present invention performs analysis of motion subject to comparison by means of comparison with standard motion, and has: a time weight extraction section that extracts a time weight representing the size of a difference between the motion subject to comparison and the standard motion from comparison-target feature amount data that is data of an image feature amount of the motion subject to comparison, and standard feature amount data that is data of an image feature amount of the standard motion; a weighted position feature amount extraction section that calculates a weighted position feature amount that is a time integral of each position of a value to which the time weight is applied, for the comparison-target feature amount data and the standard feature amount data; and a position weight extraction section that extracts a position weight representing the size of a difference between the motion subject to comparison and the standard motion from compared position feature amount data that is data of the weighted position feature amount of the comparison-target feature amount data, and standard position feature amount data that is data of the weighted position feature amount of the standard feature amount data.

A motion analysis apparatus according to a twelfth aspect of the present invention further has, in a motion analysis apparatus according to the eleventh aspect, a display information generation section that generates information indicating a degree of significance of each position in video of the motion subject to comparison, based on the position weight.

A motion analysis apparatus according to a thirteenth aspect of the present invention further has, in a motion analysis apparatus according to the eleventh aspect, a display information generation section that generates information indicating a degree of significance of each position and a degree of significance of each time in video of the motion subject to comparison, based on the position weight and the time weight.

A motion analysis apparatus according to a fourteenth aspect of the present invention is a motion analysis apparatus wherein, in a motion analysis apparatus according to the eleventh aspect, the image feature amount is a CHLAC feature amount.

A motion analysis method according to a fifteenth aspect of the present invention performs analysis of motion subject to comparison by means of comparison with standard motion, and has: a step of extracting a time weight representing the size of a difference between the motion subject to comparison and the standard motion from comparison-target feature amount data that is data of an image feature amount of the motion subject to comparison, and standard feature amount data that is data of an image feature amount of the standard motion; a step of calculating a weighted position feature amount that is a time integral of each position of a value to which the time weight is applied, for the comparison-target feature amount data and the standard feature amount data; and a step of extracting a position weight representing the size of a difference between the motion subject to comparison and the standard motion from compared position feature amount data that is data of the weighted position feature amount of the comparison-target feature amount data, and standard position feature amount data that is data of the weighted position feature amount of the standard feature amount data.

A motion analysis apparatus according to a sixteenth aspect of the present invention performs analysis of motion subject to comparison by means of comparison with standard motion, and has: a position weight extraction section that extracts a position weight representing the size of a difference between the motion subject to comparison and the standard motion from comparison-target feature amount data that is data of an image feature amount of the motion subject to comparison, and standard feature amount data that is data of an image feature amount of the standard motion; a weighted time feature amount extraction section that calculates a weighted time feature amount that is a space integral of each time of a value to which the position weight is applied, for the comparison-target feature amount data and the standard feature amount data; and a time weight extraction section that extracts a time weight representing the size of a difference between the motion subject to comparison and the standard motion from compared time feature amount data that is data of the weighted time feature amount of the comparison-target feature amount data, and standard time feature amount data that is data of the weighted time feature amount of the standard feature amount data.

A motion analysis apparatus according to a seventeenth aspect of the present invention further has, in a motion analysis apparatus according to the sixteenth aspect, a display information generation section that generates information indicating a degree of significance of each time in video of the motion subject to comparison, based on the time weight.

A motion analysis apparatus according to an eighteenth aspect of the present invention further has, in a motion analysis apparatus according to the sixteenth aspect, a display information generation section that generates information indicating a degree of significance of each time and a degree of significance of each position in video of the motion subject to comparison, based on the time weight and the position weight.

A motion analysis apparatus according to a nineteenth aspect of the present invention is a motion analysis apparatus wherein, in a motion analysis apparatus according to the sixteenth aspect, the image feature amount is a CHLAC feature amount.

A motion analysis method according to a twentieth aspect of the present invention performs analysis of motion subject to comparison by means of comparison with standard motion, and has: a step of extracting a position weight representing the size of a difference between the motion subject to comparison and the standard motion from comparison-target feature amount data that is data of an image feature amount of the motion subject to comparison, and standard feature amount data that is data of an image feature amount of the standard motion; a step of calculating a weighted time feature amount that is a space integral of each time of a value to which the position weight is applied, for the comparison-target feature amount data and the standard feature amount data; and a step of extracting a time weight representing the size of a difference between the motion subject to comparison and the standard motion from compared time feature amount data that is data of the weighted time feature amount of the comparison-target feature amount data, and standard time feature amount data that is data of the weighted time feature amount of the standard feature amount data.

The disclosures of Japanese Patent Application No. 2009-291018, filed on Dec. 22, 2009, Japanese Patent Application No. 2010-70444, filed on Mar. 25, 2010, and Japanese Patent Application No. 2010-70445, filed on Mar. 25, 2010, including the specifications, drawings and abstracts, are incorporated herein by reference in their entirety.

INDUSTRIAL APPLICABILITY

A motion analysis apparatus and motion analysis method according to the present invention are suitable for use as a motion analysis apparatus and motion analysis method that enable an analysis result presentation quantity to be easily adjusted. Furthermore, a motion analysis apparatus and motion analysis method according to the present invention are suitable for use as a motion analysis apparatus and motion analysis method that enable a position of a differing-order motion to be easily extracted. Moreover, a motion analysis apparatus and motion analysis method according to the present invention are suitable for use as a motion analysis apparatus and motion analysis method that enable a time of a small differing motion to be easily extracted. That is to say, the present invention is suitable for use as an apparatus and method that analyze various kinds of motion, including work motion in a factory, driving, sports, cooking, musical performances, and so forth.

REFERENCE SIGNS LIST 100, 100e, 110f Motion analysis system
200 Sensor apparatus
300, 300b, 300c, 300d, 300e, 300f Motion analysis apparatus
310 Motion data input section
321, 321c, 321d Motion feature extraction section
322, 322b, 322c Motion extraction section
323, 323d Presentation quantity input section
324, 324b, 324d Motion extraction degree adjustment section
325 Motion extraction result presentation section
326b Extraction type input section
327d Motion analysis initial value setting section
331e Time weight extraction section
332e Weighted position feature amount extraction section
333e Position weight extraction section
341f Position weight extraction section
342f Weighted time feature amount extraction section
343f Time weight extraction section
400 Output apparatus
500 Input apparatus

The invention claimed is:

1. A motion analysis apparatus that performs analysis of motion subject to comparison by means of comparison with standard motion, the motion analysis apparatus comprising:
   a motion difference extraction section that determines a location where a degree of difference between the motion subject to comparison and the standard motion satisfies a predetermined condition;
   a presentation quantity input section that receives a specification of a presentation quantity of locations that satisfy the predetermined condition; and
   a motion extraction degree adjustment section that adjusts the predetermined condition so that a quantity of locations satisfying the predetermined condition becomes the specified presentation quantity.

2. The motion analysis apparatus according to claim 1, further comprising a motion data input section that inputs standard motion data that is motion data of a series of the standard motions, and comparison target motion data that is motion data of a series of the motions subject to comparison, wherein:
   the motion difference extraction section extracts feature amounts of the standard motion data and the comparison target motion data using a first parameter, extracts a difference between feature amounts of the comparison target motion data and the standard motion data using a second parameter, and extracts a location where an extracted difference satisfies a condition set by a third parameter; and
   the motion extraction degree adjustment section adjusts at least one of the first parameter, the second parameter, and the third parameter.

3. The motion analysis apparatus according to claim 2, wherein:
   the motion data is moving image data; and
   the feature amount is a cubic higher-order local auto-correlation feature.

4. The motion analysis apparatus according to claim 2, wherein a condition set by the third parameter is that the difference is larger than the third parameter.

5. The motion analysis apparatus according to claim 2, wherein the presentation quantity is a number of locations that satisfy a condition set by the third parameter.

6. The motion analysis apparatus according to claim 2, wherein the presentation quantity is a total of a length of time of a location that satisfies a condition set by the third parameter.

7. The motion analysis apparatus according to claim 2, wherein a condition set by the third parameter is that the difference is smaller than the third parameter.

8. The motion analysis apparatus according to claim 1, further comprising a motion data input section that inputs standard motion data that is moving image data of a series of the standard motions, and comparison target motion data that is moving image data of a series of the motions subject to comparison, wherein:
   the motion difference extraction section extracts a time weight when introducing a time weight to a cubic higher-order local auto-correlation feature and calculating a video feature as a feature amount indicating a difference between the motion subject to comparison and the standard motion using a fourth parameter, and extracts a location where the feature amount satisfies a condition set by a fifth parameter; and
   the motion extraction degree adjustment section adjusts at least one of the fourth parameter and fifth parameter.

9. The motion analysis apparatus according to claim 1, further comprising a motion analysis initial value setting section that sets initial values of the predetermined condition and target values of the presentation quantity in association with a plurality of different presentation quantity levels, respectively, based on the standard motion data,
   wherein the motion extraction degree adjustment section receives a specification of an initial value of the predetermined condition and the presentation quantity by means of a specification of a level.

10. A motion analysis method to perform analysis of motion subject to comparison by means of comparison with standard motion, the motion analysis method comprising:
   a step of receiving a specification of a presentation quantity of results of the analysis;
   a step of determining a location where a degree of difference between the motion subject to comparison and the standard motion satisfies a predetermined condition; and
   a step of adjusting the predetermined condition when a quantity of locations satisfying the predetermined condition differs from a specified presentation quantity.

11. The motion analysis apparatus according to claim 1, wherein the motion difference extraction section comprises:
   a first weight extraction section that extracts a first weight representing a size of a difference between the motion subject to comparison and the standard motion for each value of a first component that is one of a time component and a position component of the image feature amount, from comparison-target feature amount data that is data of an image feature amount of the motion subject to comparison, and standard feature amount data that is data of an image feature amount of the standard motion;
   a weighted position feature amount extraction section that calculates an integral value of the values of the first components of values to which the first weight is applied, with respect to each of the comparison-target feature amount data and the standard feature amount data; and
   a second weight extraction section that extracts a second weight representing a size of a difference between the motion subject to comparison and the standard motion for each value of a second component that is the other of a time component and a position component of the image feature amount, from the integral value calculated from the comparison-target feature amount data and the integral value calculated from the standard feature amount data.

12. The motion analysis apparatus according to claim 11, wherein:
   the first component is the time component;
   the first weight is a time weight representing a size of a per-time difference between the motion subject to comparison and the standard motion;
   the second component is the position component; and
   the second weight is a position weight representing a size of a per-position difference between the motion subject to comparison and the standard motion.

13. The motion analysis apparatus according to claim 12, further comprising a display information generation section that generates information indicating a degree of significance of each position in video of the motion subject to comparison, based on the position weight.

14. The motion analysis apparatus according to claim 12, further comprising a display information generation section that generates information indicating a degree of significance of each position and a degree of significance of each time in video of the motion subject to comparison, based on the position weight and the time weight.

15. The motion analysis apparatus according to claim 12, wherein the image feature amount is a cubic higher-order local auto-correlation feature amount.

16. The motion analysis apparatus according to claim 11, wherein:

the first component is the position component;

the first weight is a position weight representing a size of a per-position difference between the motion subject to comparison and the standard motion;

the second component is the time component; and the second weight is a time weight representing a size of a per-time difference between the motion subject to comparison and the standard motion.

17. The motion analysis apparatus according to claim 16, further comprising a display information generation section that generates information indicating a degree of significance of each time in video of the motion subject to comparison, based on the time weight.

18. The motion analysis apparatus according to claim 16, further comprising a display information generation section that generates information indicating a degree of significance of each time and a degree of significance of each position in video of the motion subject to comparison, based on the time weight and the position weight.

19. The motion analysis apparatus according to claim 16, wherein the image feature amount is a cubic higher-order local auto-correlation feature amount.

\* \* \* \* \*